(12) United States Patent
Morton et al.

(10) Patent No.: US 11,576,752 B2
(45) Date of Patent: Feb. 14, 2023

(54) DENTAL APPLIANCE HAVING SELECTIVE OCCLUSAL LOADING AND CONTROLLED INTERCUSPATION

(71) Applicant: Align Technology, Inc., San Jose, CA (US)

(72) Inventors: John Y. Morton, San Jose, CA (US); Bruce Cam, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 480 days.

(21) Appl. No.: 16/177,067

(22) Filed: Oct. 31, 2018

(65) Prior Publication Data
US 2019/0175304 A1 Jun. 13, 2019

Related U.S. Application Data

(60) Provisional application No. 62/579,519, filed on Oct. 31, 2017.

(51) Int. Cl.
| | | |
|---|---|---|
| *A61C 7/08* | (2006.01) | |
| *A61C 7/36* | (2006.01) | |
| *A61C 7/00* | (2006.01) | |
| *A61C 9/00* | (2006.01) | |

(52) U.S. Cl.
CPC .............. *A61C 7/08* (2013.01); *A61C 7/002* (2013.01); *A61C 7/36* (2013.01); *A61C 9/0006* (2013.01)

(58) Field of Classification Search
CPC .............. A61C 7/08; A61C 7/002; A61C 7/36
See application file for complete search history.

(56) References Cited

U.S. PATENT DOCUMENTS

| | | | |
|---|---|---|---|
| 2,171,695 | A | 9/1939 | Harper |
| 2,194,790 | A | 3/1940 | Gluck |
| 2,467,432 | A | 4/1949 | Kesling |
| 2,531,222 | A | 11/1950 | Kesling |

(Continued)

FOREIGN PATENT DOCUMENTS

| | | |
|---|---|---|
| AU | 517102 B | 11/1977 |
| AU | 3031677 A | 11/1977 |

(Continued)

OTHER PUBLICATIONS

US 8,553,966 B1, 10/2013, Alpern et al. (withdrawn)

(Continued)

*Primary Examiner* — Heidi M Eide
(74) *Attorney, Agent, or Firm* — Shay Glenn LLP

(57) ABSTRACT

Methods and apparatus for producing controlled tooth-moving forces are provided. An orthodontic appliance includes one or more occlusal surface features that modify bite forces between opposing teeth during intercuspation to aid in realignment of the teeth. The interception bite forces can be applied between appliance shells on opposing arches, or between an appliance shell and an opposing tooth. These modified bite forces can be used to supply or augment tooth-moving forces, and the tooth moving forces can produce moments to urge rotational movement of a tooth. Also described herein are orthodontic appliances having an occlusal outer surface contours that are distinct from the occlusal inner surface contour within the dental appliance and may be configured to selectively intercuspate.

23 Claims, 10 Drawing Sheets

(56) References Cited

U.S. PATENT DOCUMENTS

| | | |
|---|---|---|
| 3,089,487 A | 5/1963 | Enicks et al. |
| 3,092,907 A | 6/1963 | Traiger |
| 3,178,820 A | 4/1965 | Kesling |
| 3,211,143 A | 10/1965 | Grossberg |
| 3,379,193 A | 4/1968 | Monsghan |
| 3,385,291 A | 5/1968 | Martin |
| 3,407,500 A | 10/1968 | Kesling |
| 3,478,742 A | 11/1969 | Bohlmann |
| 3,496,936 A | 2/1970 | Gores |
| 3,533,163 A | 10/1970 | Kirschenbaum |
| 3,556,093 A | 1/1971 | Quick |
| 3,600,808 A | 8/1971 | Reeve |
| 3,660,900 A | 5/1972 | Andrews |
| 3,683,502 A | 8/1972 | Wallshein |
| 3,724,075 A | 4/1973 | Kesling |
| 3,738,005 A | 6/1973 | Cohen et al. |
| 3,797,115 A | 3/1974 | Silverman et al. |
| 3,860,803 A | 1/1975 | Levine |
| 3,885,310 A | 5/1975 | Northcutt |
| 3,916,526 A | 11/1975 | Schudy |
| 3,922,786 A | 12/1975 | Lavin |
| 3,949,477 A | 4/1976 | Cohen et al. |
| 3,950,851 A | 4/1976 | Bergersen |
| 3,955,282 A | 5/1976 | McNall |
| 3,983,628 A | 10/1976 | Acevedo |
| 4,014,096 A | 3/1977 | Dellinger |
| 4,055,895 A | 11/1977 | Huge |
| 4,094,068 A | 6/1978 | Schinhammer |
| 4,117,596 A | 10/1978 | Wallshein |
| 4,129,946 A | 12/1978 | Kennedy |
| 4,134,208 A | 1/1979 | Pearlman |
| 4,139,944 A | 2/1979 | Bergersen |
| 4,179,811 A | 12/1979 | Hinz |
| 4,179,812 A | 12/1979 | White |
| 4,183,141 A | 1/1980 | Dellinger |
| 4,195,046 A | 3/1980 | Kesling |
| 4,204,325 A | 5/1980 | Kaelble |
| 4,253,828 A | 3/1981 | Coles et al. |
| 4,255,138 A | 3/1981 | Frohn |
| 4,299,568 A | 11/1981 | Crowley |
| 4,324,546 A | 4/1982 | Heitlinger et al. |
| 4,324,547 A | 4/1982 | Arcan et al. |
| 4,348,178 A | 9/1982 | Kurz |
| 4,368,040 A | 1/1983 | Weissman |
| 4,419,992 A | 12/1983 | Chorbajian |
| 4,433,956 A | 2/1984 | Witzig |
| 4,433,960 A | 2/1984 | Garito et al. |
| 4,439,154 A | 3/1984 | Mayclin |
| 4,449,928 A | 5/1984 | von Weissenfluh |
| 4,478,580 A | 10/1984 | Barrut |
| 4,500,294 A | 2/1985 | Lewis |
| 4,505,672 A | 3/1985 | Kurz |
| 4,505,673 A | 3/1985 | Yoshii |
| 4,519,386 A | 5/1985 | Sullivan |
| 4,523,908 A | 6/1985 | Drisaldi et al. |
| 4,526,540 A | 7/1985 | Dellinger |
| 4,553,936 A | 11/1985 | Wang |
| 4,575,330 A | 3/1986 | Hull |
| 4,575,805 A | 3/1986 | Moermann et al. |
| 4,591,341 A | 5/1986 | Andrews |
| 4,608,021 A | 8/1986 | Barrett |
| 4,609,349 A | 9/1986 | Cain |
| 4,611,288 A | 9/1986 | Duret et al. |
| 4,629,424 A | 12/1986 | Lauks et al. |
| 4,638,145 A | 1/1987 | Sakuma et al. |
| 4,656,860 A | 4/1987 | Orthuber et al. |
| 4,663,720 A | 5/1987 | Duret et al. |
| 4,664,626 A | 5/1987 | Kesling |
| 4,665,621 A | 5/1987 | Ackerman et al. |
| 4,676,747 A | 6/1987 | Kesling |
| 4,755,139 A | 7/1988 | Abbatte et al. |
| 4,757,824 A | 7/1988 | Chaumet |
| 4,763,791 A | 8/1988 | Halverson et al. |
| 4,764,111 A | 8/1988 | Knierim |
| 4,790,752 A | 12/1988 | Cheslak |
| 4,793,803 A | 12/1988 | Martz |
| 4,798,534 A | 1/1989 | Breads |
| 4,830,612 A | 5/1989 | Bergersen |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,886,451 A | 12/1989 | Cetlin |
| 4,889,238 A | 12/1989 | Batchelor |
| 4,890,608 A | 1/1990 | Steer |
| 4,932,866 A | 6/1990 | Guis |
| 4,935,635 A | 6/1990 | O'Harra |
| 4,936,862 A | 6/1990 | Walker et al. |
| 4,937,928 A | 7/1990 | van der Zel |
| 4,941,826 A | 7/1990 | Loran et al. |
| 4,952,928 A | 8/1990 | Carroll et al. |
| 4,964,770 A | 10/1990 | Steinbichler et al. |
| 4,971,557 A | 11/1990 | Martin |
| 4,975,052 A | 12/1990 | Spencer et al. |
| 4,983,334 A | 1/1991 | Adell |
| 4,997,369 A | 3/1991 | Shafir |
| 5,002,485 A | 3/1991 | Aagesen |
| 5,011,405 A | 4/1991 | Lemchen |
| 5,015,183 A | 5/1991 | Fenick |
| 5,017,133 A | 5/1991 | Miura |
| 5,018,969 A | 5/1991 | Andreiko et al. |
| 5,027,281 A | 6/1991 | Rekow et al. |
| 5,035,613 A | 7/1991 | Breads et al. |
| 5,037,295 A | 8/1991 | Bergersen |
| 5,055,039 A | 10/1991 | Abbatte et al. |
| 5,061,839 A | 10/1991 | Matsuno et al. |
| 5,083,919 A | 1/1992 | Quachi |
| 5,094,614 A | 3/1992 | Wildman |
| 5,100,316 A | 3/1992 | Wildman |
| 5,103,838 A | 4/1992 | Yousif |
| 5,114,339 A | 5/1992 | Guis |
| 5,121,333 A | 6/1992 | Riley et al. |
| 5,123,425 A | 6/1992 | Shannon et al. |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,194,003 A | 3/1993 | Garay et al. |
| 5,204,670 A | 4/1993 | Stinton |
| 5,222,499 A | 6/1993 | Allen et al. |
| 5,224,049 A | 6/1993 | Mushabac |
| 5,238,404 A | 8/1993 | Andreiko |
| 5,242,304 A | 9/1993 | Truax et al. |
| 5,245,592 A | 9/1993 | Kuemmel et al. |
| 5,273,429 A | 12/1993 | Rekow et al. |
| 5,278,756 A | 1/1994 | Lemchen et al. |
| 5,306,144 A | 4/1994 | Hibst et al. |
| 5,314,335 A | 5/1994 | Fung |
| 5,324,186 A | 6/1994 | Bakanowski |
| 5,328,362 A | 7/1994 | Watson et al. |
| 5,335,657 A | 8/1994 | Terry et al. |
| 5,338,198 A | 8/1994 | Wu et al. |
| 5,340,309 A | 8/1994 | Robertson |
| 5,342,202 A | 8/1994 | Deshayes |
| 5,344,315 A | 9/1994 | Hanson |
| 5,368,478 A | 11/1994 | Andreiko et al. |
| 5,372,502 A | 12/1994 | Massen et al. |
| D354,355 S | 1/1995 | Hilgers |
| 5,382,164 A | 1/1995 | Stern |
| 5,395,238 A | 3/1995 | Andreiko et al. |
| 5,415,542 A | 5/1995 | Kesling |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,449,703 A | 9/1995 | Mitra et al. |
| 5,452,219 A | 9/1995 | Dehoff et al. |
| 5,454,717 A | 10/1995 | Andreiko et al. |

(56) References Cited

U.S. PATENT DOCUMENTS

| | | |
|---|---|---|
| 5,456,600 A | 10/1995 | Andreiko et al. |
| 5,474,448 A | 12/1995 | Andreiko et al. |
| 5,487,662 A | 1/1996 | Kipke et al. |
| RE35,169 E | 3/1996 | Lemchen et al. |
| 5,499,633 A | 3/1996 | Fenton |
| 5,522,725 A | 6/1996 | Jordan et al. |
| 5,528,735 A | 6/1996 | Strasnick et al. |
| 5,533,895 A | 7/1996 | Andreiko et al. |
| 5,540,732 A | 7/1996 | Testerman |
| 5,542,842 A | 8/1996 | Andreiko et al. |
| 5,543,780 A | 8/1996 | McAuley et al. |
| 5,549,476 A | 8/1996 | Stern |
| 5,562,448 A | 10/1996 | Mushabac |
| 5,570,182 A | 10/1996 | Nathel et al. |
| 5,575,655 A | 11/1996 | Darnell |
| 5,583,977 A | 12/1996 | Seidl |
| 5,587,912 A | 12/1996 | Andersson et al. |
| 5,588,098 A | 12/1996 | Chen et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,626,537 A | 5/1997 | Danyo et al. |
| 5,636,736 A | 6/1997 | Jacobs et al. |
| 5,645,420 A | 7/1997 | Bergersen |
| 5,645,421 A | 7/1997 | Slootsky |
| 5,651,671 A | 7/1997 | Seay et al. |
| 5,655,653 A | 8/1997 | Chester |
| 5,659,420 A | 8/1997 | Wakai et al. |
| 5,683,243 A | 11/1997 | Andreiko et al. |
| 5,683,244 A | 11/1997 | Truax |
| 5,691,539 A | 11/1997 | Pfeiffer |
| 5,692,894 A | 12/1997 | Schwartz et al. |
| 5,711,665 A | 1/1998 | Adam et al. |
| 5,711,666 A | 1/1998 | Hanson |
| 5,725,376 A | 3/1998 | Poirier |
| 5,725,378 A | 3/1998 | Wang |
| 5,730,151 A | 3/1998 | Summer et al. |
| 5,737,084 A | 4/1998 | Ishihara |
| 5,740,267 A | 4/1998 | Echerer et al. |
| 5,742,700 A | 4/1998 | Yoon et al. |
| 5,769,631 A | 6/1998 | Williams |
| 5,774,425 A | 6/1998 | Ivanov et al. |
| 5,790,242 A | 8/1998 | Stern et al. |
| 5,799,100 A | 8/1998 | Clarke et al. |
| 5,800,162 A | 9/1998 | Shimodaira et al. |
| 5,800,174 A | 9/1998 | Andersson |
| 5,813,854 A | 9/1998 | Nikodem |
| 5,816,800 A | 10/1998 | Brehm et al. |
| 5,818,587 A | 10/1998 | Devaraj et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,876,199 A | 3/1999 | Bergersen |
| 5,879,158 A | 3/1999 | Doyle et al. |
| 5,880,961 A | 3/1999 | Crump |
| 5,880,962 A | 3/1999 | Andersson et al. |
| 5,882,192 A | 3/1999 | Bergersen |
| 5,886,702 A | 3/1999 | Migdal et al. |
| 5,890,896 A | 4/1999 | Padial |
| 5,904,479 A | 5/1999 | Staples |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 5,975,906 A | 11/1999 | Knutson |
| 5,980,246 A | 11/1999 | Ramsay et al. |
| 5,989,023 A | 11/1999 | Summer et al. |
| 6,002,706 A | 12/1999 | Staver et al. |
| 6,018,713 A | 1/2000 | Coli et al. |
| 6,044,309 A | 3/2000 | Honda |
| 6,049,743 A | 4/2000 | Baba |
| 6,053,731 A | 4/2000 | Heckenberger |
| 6,068,482 A | 5/2000 | Snow |
| 6,070,140 A | 5/2000 | Tran |
| 6,099,303 A | 8/2000 | Gibbs et al. |
| 6,099,314 A | 8/2000 | Kopelman et al. |
| 6,102,701 A | 8/2000 | Engeron |
| 6,120,287 A | 9/2000 | Chen |
| 6,123,544 A | 9/2000 | Cleary |
| 6,152,731 A | 11/2000 | Jordan et al. |
| 6,154,676 A | 11/2000 | Levine |
| 6,183,248 B1 | 2/2001 | Chishti et al. |
| 6,183,249 B1 | 2/2001 | Brennan et al. |
| 6,186,780 B1 | 2/2001 | Hibst et al. |
| 6,190,165 B1 | 2/2001 | Andreiko et al. |
| 6,200,133 B1 | 3/2001 | Kittelsen |
| 6,201,880 B1 | 3/2001 | Elbaum et al. |
| 6,210,162 B1 | 4/2001 | Chishti et al. |
| 6,212,435 B1 | 4/2001 | Lattner et al. |
| 6,213,767 B1 | 4/2001 | Dixon et al. |
| 6,217,334 B1 | 4/2001 | Hultgren |
| 6,227,850 B1 | 5/2001 | Chishti et al. |
| 6,230,142 B1 | 5/2001 | Benigno et al. |
| 6,231,338 B1 | 5/2001 | de Josselin de Jong et al. |
| 6,239,705 B1 | 5/2001 | Glen |
| 6,243,601 B1 | 6/2001 | Wist |
| 6,263,234 B1 | 7/2001 | Engelhardt et al. |
| 6,283,761 B1 | 9/2001 | Joao |
| 6,288,138 B1 | 9/2001 | Yamamoto |
| 6,299,438 B1 | 10/2001 | Sahagian et al. |
| 6,309,215 B1 | 10/2001 | Phan et al. |
| 6,313,432 B1 | 11/2001 | Nagata et al. |
| 6,315,553 B1 | 11/2001 | Sachdeva et al. |
| 6,328,745 B1 | 12/2001 | Ascherman |
| 6,332,774 B1 | 12/2001 | Chikami |
| 6,334,073 B1 | 12/2001 | Levine |
| 6,350,120 B1 | 2/2002 | Sachdeva et al. |
| 6,364,660 B1 | 4/2002 | Durbin et al. |
| 6,382,975 B1 | 5/2002 | Poirier |
| 6,386,878 B1 | 5/2002 | Pavlovskaia et al. |
| 6,394,802 B1 | 5/2002 | Hahn |
| 6,402,510 B1 | 6/2002 | Williams |
| 6,402,707 B1 | 6/2002 | Ernst |
| 6,405,729 B1 | 6/2002 | Thornton |
| 6,406,292 B1 | 6/2002 | Chishti et al. |
| 6,409,504 B1 | 6/2002 | Jones et al. |
| 6,413,086 B1 | 7/2002 | Womack |
| 6,414,264 B1 | 7/2002 | von Falkenhausen |
| 6,414,708 B1 | 7/2002 | Carmeli et al. |
| 6,435,871 B1 | 8/2002 | Inman |
| 6,436,058 B1 | 8/2002 | Krahner et al. |
| 6,441,354 B1 | 8/2002 | Seghatol et al. |
| 6,450,167 B1 | 9/2002 | David et al. |
| 6,450,807 B1 | 9/2002 | Chishti et al. |
| 6,462,301 B1 | 10/2002 | Scott et al. |
| 6,470,338 B1 | 10/2002 | Rizzo et al. |
| 6,471,511 B1 | 10/2002 | Chishti et al. |
| 6,471,512 B1 | 10/2002 | Sachdeva et al. |
| 6,471,970 B1 | 10/2002 | Fanara et al. |
| 6,482,002 B2 | 11/2002 | Jordan et al. |
| 6,482,298 B1 | 11/2002 | Bhatnagar |
| 6,496,814 B1 | 12/2002 | Busche |
| 6,496,816 B1 | 12/2002 | Thiesson et al. |
| 6,499,026 B1 | 12/2002 | Rivette et al. |
| 6,499,995 B1 | 12/2002 | Schwartz |
| 6,507,832 B1 | 1/2003 | Evans et al. |
| 6,514,074 B1 | 2/2003 | Chishti et al. |
| 6,515,593 B1 | 2/2003 | Stark et al. |
| 6,516,288 B2 | 2/2003 | Bagne |
| 6,516,805 B1 | 2/2003 | Thornton |
| 6,520,772 B2 | 2/2003 | Williams |
| 6,523,009 B1 | 2/2003 | Wilkins |
| 6,523,019 B1 | 2/2003 | Borthwick |
| 6,524,101 B1 | 2/2003 | Phan et al. |
| 6,526,168 B1 | 2/2003 | Ornes et al. |
| 6,526,982 B1 | 3/2003 | Strong |
| 6,529,891 B1 | 3/2003 | Heckerman |
| 6,529,902 B1 | 3/2003 | Kanevsky et al. |
| 6,532,455 B1 | 3/2003 | Martin et al. |
| 6,535,865 B1 | 3/2003 | Skaaning et al. |
| 6,540,512 B1 | 4/2003 | Sachdeva et al. |

(56) References Cited

U.S. PATENT DOCUMENTS

| | | |
|---|---|---|
| 6,540,707 B1 | 4/2003 | Stark et al. |
| 6,542,593 B1 | 4/2003 | Bowman Amuah |
| 6,542,881 B1 | 4/2003 | Meidan et al. |
| 6,542,894 B1 | 4/2003 | Lee et al. |
| 6,542,903 B2 | 4/2003 | Hull et al. |
| 6,551,243 B2 | 4/2003 | Bocionek et al. |
| 6,554,837 B1 | 4/2003 | Hauri et al. |
| 6,556,659 B1 | 4/2003 | Bowman Amuah |
| 6,556,977 B1 | 4/2003 | Lapointe et al. |
| 6,560,592 B1 | 5/2003 | Reid et al. |
| 6,564,209 B1 | 5/2003 | Dempski et al. |
| 6,567,814 B1 | 5/2003 | Bankier et al. |
| 6,571,227 B1 | 5/2003 | Agrafiotis et al. |
| 6,572,372 B1 | 6/2003 | Phan et al. |
| 6,573,998 B2 | 6/2003 | Cohen Sabban |
| 6,574,561 B2 | 6/2003 | Alexander et al. |
| 6,578,003 B1 | 6/2003 | Camarda et al. |
| 6,580,948 B2 | 6/2003 | Haupert et al. |
| 6,587,529 B1 | 7/2003 | Staszewski et al. |
| 6,587,828 B1 | 7/2003 | Sachdeva |
| 6,592,368 B1 | 7/2003 | Weathers |
| 6,594,539 B1 | 7/2003 | Geng |
| 6,595,342 B1 | 7/2003 | Maritzen et al. |
| 6,597,934 B1 | 7/2003 | de Jong et al. |
| 6,598,043 B1 | 7/2003 | Baclawski |
| 6,599,250 B2 | 7/2003 | Webb et al. |
| 6,602,070 B2 | 8/2003 | Miller et al. |
| 6,604,527 B1 | 8/2003 | Palmisano |
| 6,606,744 B1 | 8/2003 | Mikurak |
| 6,607,382 B1 | 8/2003 | Kuo et al. |
| 6,611,783 B2 | 8/2003 | Kelly et al. |
| 6,611,867 B1 | 8/2003 | Bowman Amuah |
| 6,613,001 B1 | 9/2003 | Dworkin |
| 6,615,158 B2 | 9/2003 | Wenzel et al. |
| 6,616,447 B1 | 9/2003 | Rizoiu et al. |
| 6,616,579 B1 | 9/2003 | Reinbold et al. |
| 6,621,491 B1 | 9/2003 | Baumrind et al. |
| 6,623,698 B2 | 9/2003 | Kuo |
| 6,624,752 B2 | 9/2003 | Klitsgaard et al. |
| 6,626,180 B1 | 9/2003 | Kittelsen et al. |
| 6,626,569 B2 | 9/2003 | Reinstein et al. |
| 6,626,669 B2 | 9/2003 | Zegarelli |
| 6,633,772 B2 | 10/2003 | Ford et al. |
| 6,640,128 B2 | 10/2003 | Vilsmeier et al. |
| 6,643,646 B2 | 11/2003 | Su et al. |
| 6,647,383 B1 | 11/2003 | August et al. |
| 6,650,944 B2 | 11/2003 | Goedeke et al. |
| 6,671,818 B1 | 12/2003 | Mikurak |
| 6,675,104 B2 | 1/2004 | Paulse et al. |
| 6,678,669 B2 | 1/2004 | Lapointe et al. |
| 6,682,346 B2 | 1/2004 | Chishti et al. |
| 6,685,469 B2 | 2/2004 | Chishti et al. |
| 6,689,055 B1 | 2/2004 | Mullen et al. |
| 6,690,761 B2 | 2/2004 | Lang et al. |
| 6,691,110 B2 | 2/2004 | Wang et al. |
| 6,694,234 B2 | 2/2004 | Lockwood et al. |
| 6,697,164 B1 | 2/2004 | Babayoff et al. |
| 6,697,793 B2 | 2/2004 | McGreevy |
| 6,702,765 B2 | 3/2004 | Robbins et al. |
| 6,702,804 B1 | 3/2004 | Ritter et al. |
| 6,705,863 B2 | 3/2004 | Phan et al. |
| 6,729,876 B2 | 5/2004 | Chishti et al. |
| 6,733,289 B2 | 5/2004 | Manemann et al. |
| 6,736,638 B1 | 5/2004 | Sachdeva et al. |
| 6,739,869 B1 | 5/2004 | Taub et al. |
| 6,744,932 B1 | 6/2004 | Rubbert et al. |
| 6,749,414 B1 | 6/2004 | Hanson et al. |
| 6,769,913 B2 | 8/2004 | Hurson |
| 6,772,026 B2 | 8/2004 | Bradbury et al. |
| 6,790,036 B2 | 9/2004 | Graham |
| 6,802,713 B1 | 10/2004 | Chishti et al. |
| 6,814,574 B2 | 11/2004 | Abolfathi et al. |
| 6,830,450 B2 | 12/2004 | Knopp et al. |
| 6,832,912 B2 | 12/2004 | Mao |
| 6,832,914 B1 | 12/2004 | Bonnet et al. |
| 6,843,370 B2 | 1/2005 | Tuneberg |
| 6,845,175 B2 | 1/2005 | Kopelman et al. |
| 6,885,464 B1 | 4/2005 | Pfeiffer et al. |
| 6,890,285 B2 | 5/2005 | Rahman et al. |
| 6,951,254 B2 | 10/2005 | Morrison |
| 6,976,841 B1 | 12/2005 | Osterwalder |
| 6,978,268 B2 | 12/2005 | Thomas et al. |
| 6,983,752 B2 | 1/2006 | Garabadian |
| 6,984,128 B2 | 1/2006 | Breining et al. |
| 6,988,893 B2 | 1/2006 | Haywood |
| 7,016,952 B2 | 3/2006 | Mullen et al. |
| 7,020,963 B2 | 4/2006 | Cleary et al. |
| 7,036,514 B2 | 5/2006 | Heck |
| 7,040,896 B2 | 5/2006 | Pavlovskaia et al. |
| 7,106,233 B2 | 9/2006 | Schroeder et al. |
| 7,112,065 B2 | 9/2006 | Kopelman et al. |
| 7,121,825 B2 | 10/2006 | Chishti et al. |
| 7,134,874 B2 | 11/2006 | Chishti et al. |
| 7,137,812 B2 | 11/2006 | Cleary et al. |
| 7,138,640 B1 | 11/2006 | Delgado et al. |
| 7,140,877 B2 | 11/2006 | Kaza |
| 7,142,312 B2 | 11/2006 | Quadling et al. |
| 7,155,373 B2 | 12/2006 | Jordan et al. |
| 7,156,655 B2 | 1/2007 | Sachdeva et al. |
| 7,156,661 B2 | 1/2007 | Choi et al. |
| 7,166,063 B2 | 1/2007 | Rahman et al. |
| 7,184,150 B2 | 2/2007 | Quadling et al. |
| 7,191,451 B2 | 3/2007 | Nakagawa |
| 7,192,273 B2 | 3/2007 | McSurdy |
| 7,217,131 B2 | 5/2007 | Vuillemot |
| 7,220,122 B2 | 5/2007 | Chishti |
| 7,220,124 B2 | 5/2007 | Taub et al. |
| 7,229,282 B2 | 6/2007 | Andreiko et al. |
| 7,234,937 B2 | 6/2007 | Sachdeva et al. |
| 7,241,142 B2 | 7/2007 | Abolfathi et al. |
| 7,244,230 B2 | 7/2007 | Duggirala et al. |
| 7,245,753 B2 | 7/2007 | Squilla et al. |
| 7,257,136 B2 | 8/2007 | Mori et al. |
| 7,286,954 B2 | 10/2007 | Kopelman et al. |
| 7,292,759 B2 | 11/2007 | Boutoussov et al. |
| 7,294,141 B2 | 11/2007 | Bergersen |
| 7,302,842 B2 | 12/2007 | Blester et al. |
| 7,320,592 B2 | 1/2008 | Chishti et al. |
| 7,328,706 B2 | 2/2008 | Barach et al. |
| 7,329,122 B1 | 2/2008 | Scott |
| 7,338,327 B2 | 3/2008 | Sticker et al. |
| D565,509 S | 4/2008 | Fechner et al. |
| 7,351,116 B2 | 4/2008 | Dold |
| 7,354,270 B2 | 4/2008 | Abolfathi et al. |
| 7,357,637 B2 | 4/2008 | Liechtung |
| 7,435,083 B2 | 10/2008 | Chishti et al. |
| 7,450,231 B2 | 11/2008 | Johs et al. |
| 7,458,810 B2 | 12/2008 | Bergersen |
| 7,460,230 B2 | 12/2008 | Johs et al. |
| 7,462,076 B2 | 12/2008 | Walter et al. |
| 7,463,929 B2 | 12/2008 | Simmons |
| 7,476,100 B2 | 1/2009 | Kuo |
| 7,500,851 B2 | 3/2009 | Williams |
| D594,413 S | 6/2009 | Palka et al. |
| 7,543,511 B2 | 6/2009 | Kimura et al. |
| 7,544,103 B2 | 6/2009 | Walter et al. |
| 7,553,157 B2 | 6/2009 | Abolfathi et al. |
| 7,561,273 B2 | 7/2009 | Stautmeister et al. |
| 7,577,284 B2 | 8/2009 | Wong et al. |
| 7,596,253 B2 | 9/2009 | Wong et al. |
| 7,597,594 B2 | 10/2009 | Stadler et al. |
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B2 | 12/2009 | Woollam et al. |
| 7,637,262 B2 | 12/2009 | Bailey |
| 7,637,740 B2 | 12/2009 | Knopp |
| 7,641,473 B2 | 1/2010 | Sporbert et al. |
| 7,668,355 B2 | 2/2010 | Wong et al. |
| 7,670,179 B2 | 3/2010 | Müller |
| 7,695,327 B2 | 4/2010 | Bäuerle et al. |
| 7,698,068 B2 | 4/2010 | Babayoff |

(56) References Cited

U.S. PATENT DOCUMENTS

| | | |
|---|---|---|
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Körner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |
| 7,813,787 B2 | 10/2010 | de Josselin de Jong et al. |
| 7,824,180 B2 | 11/2010 | Abolfathi et al. |
| 7,828,601 B2 | 11/2010 | Pyczak |
| 7,841,464 B2 | 11/2010 | Cinader et al. |
| 7,845,969 B2 | 12/2010 | Stadler et al. |
| 7,854,609 B2 | 12/2010 | Chen et al. |
| 7,862,336 B2 | 1/2011 | Kopelman et al. |
| 7,869,983 B2 | 1/2011 | Raby et al. |
| 7,872,760 B2 | 1/2011 | Ertl |
| 7,874,836 B2 | 1/2011 | McSurdy |
| 7,874,837 B2 | 1/2011 | Chishti et al. |
| 7,874,849 B2 | 1/2011 | Sticker et al. |
| 7,878,801 B2 | 2/2011 | Abolfathi et al. |
| 7,878,805 B2 | 2/2011 | Moss et al. |
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,970,627 B2 | 6/2011 | Kuo et al. |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,029,277 B2 | 10/2011 | Imgrund et al. |
| 8,038,444 B2 | 10/2011 | Kitching et al. |
| 8,045,772 B2 | 10/2011 | Kosuge et al. |
| 8,054,556 B2 | 11/2011 | Chen et al. |
| 8,070,490 B1 | 12/2011 | Roetzer et al. |
| 8,075,306 B2 | 12/2011 | Kitching et al. |
| 8,077,949 B2 | 12/2011 | Liang et al. |
| 8,083,556 B2 | 12/2011 | Stadler et al. |
| D652,799 S | 1/2012 | Mueller |
| 8,092,215 B2 | 1/2012 | Stone-Collonge et al. |
| 8,095,383 B2 | 1/2012 | Arnone et al. |
| 8,099,268 B2 | 1/2012 | Kitching et al. |
| 8,099,305 B2 | 1/2012 | Kuo et al. |
| 8,118,592 B2 | 2/2012 | Tortorici |
| 8,126,025 B2 | 2/2012 | Takeda |
| 8,136,529 B2 | 3/2012 | Kelly |
| 8,144,954 B2 | 3/2012 | Quadling et al. |
| 8,160,334 B2 | 4/2012 | Thiel et al. |
| 8,172,569 B2 | 5/2012 | Matty et al. |
| 8,197,252 B1 | 6/2012 | Harrison |
| 8,201,560 B2 | 6/2012 | Dembro |
| 8,215,312 B2 | 7/2012 | Garabadian et al. |
| 8,240,018 B2 | 8/2012 | Walter et al. |
| 8,275,180 B2 | 9/2012 | Kuo |
| 8,279,450 B2 | 10/2012 | Oota et al. |
| 8,292,617 B2 | 10/2012 | Brandt et al. |
| 8,294,657 B2 | 10/2012 | Kim et al. |
| 8,296,952 B2 | 10/2012 | Greenberg |
| 8,297,286 B2 | 10/2012 | Smernoff |
| 8,306,608 B2 | 11/2012 | Mandelis et al. |
| 8,314,764 B2 | 11/2012 | Kim et al. |
| 8,332,015 B2 | 12/2012 | Ertl |
| 8,354,588 B2 | 1/2013 | Sticker et al. |
| 8,366,479 B2 | 2/2013 | Borst et al. |
| 8,401,826 B2 | 3/2013 | Cheng et al. |
| 8,419,428 B2 | 4/2013 | Lawrence |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,477,320 B2 | 7/2013 | Stock et al. |
| 8,488,113 B2 | 7/2013 | Thiel et al. |
| 8,517,726 B2 | 8/2013 | Kakavand et al. |
| 8,520,922 B2 | 8/2013 | Wang et al. |
| 8,520,925 B2 | 8/2013 | Duret et al. |
| 8,523,565 B2 | 9/2013 | Matty et al. |
| 8,545,221 B2 | 10/2013 | Stone-Collonge et al. |
| 8,556,625 B2 | 10/2013 | Lovely |
| 8,570,530 B2 | 10/2013 | Liang |
| 8,573,224 B2 | 11/2013 | Thornton |
| 8,577,212 B2 | 11/2013 | Thiel |
| 8,601,925 B1 | 12/2013 | Coto |
| 8,639,477 B2 | 1/2014 | Chelnokov et al. |
| 8,650,586 B2 | 2/2014 | Lee et al. |
| 8,675,706 B2 | 3/2014 | Seurin et al. |
| 8,723,029 B2 | 5/2014 | Pyczak et al. |
| 8,738,394 B2 | 5/2014 | Kuo |
| 8,743,923 B2 | 6/2014 | Geske et al. |
| 8,753,114 B2 | 6/2014 | Vuillemot |
| 8,767,270 B2 | 7/2014 | Curry et al. |
| 8,768,016 B2 | 7/2014 | Pan et al. |
| 8,771,149 B2 | 7/2014 | Rahman et al. |
| 8,839,476 B2 | 9/2014 | Adachi |
| 8,843,381 B2 | 9/2014 | Kuo et al. |
| 8,856,053 B2 | 10/2014 | Mah |
| 8,870,566 B2 | 10/2014 | Bergersen |
| 8,874,452 B2 | 10/2014 | Kuo |
| 8,878,905 B2 | 11/2014 | Fisker et al. |
| 8,899,976 B2 | 12/2014 | Chen et al. |
| 8,936,463 B2 | 1/2015 | Mason et al. |
| 8,944,812 B2 | 2/2015 | Kuo |
| 8,948,482 B2 | 2/2015 | Levin |
| 8,956,058 B2 | 2/2015 | Rösch |
| 8,992,216 B2 | 3/2015 | Karazivan |
| 9,004,915 B2 | 4/2015 | Moss et al. |
| 9,022,792 B2 | 5/2015 | Sticker et al. |
| 9,039,418 B1 | 5/2015 | Rubbert |
| 9,084,535 B2 | 7/2015 | Girkin et al. |
| 9,084,657 B2 | 7/2015 | Matty et al. |
| 9,108,338 B2 | 8/2015 | Sirovskiy et al. |
| 9,144,512 B2 | 9/2015 | Wagner |
| 9,192,305 B2 | 11/2015 | Levin |
| 9,204,952 B2 | 12/2015 | Lampalzer |
| 9,211,166 B2 | 12/2015 | Kuo et al. |
| 9,214,014 B2 | 12/2015 | Levin |
| 9,220,580 B2 | 12/2015 | Borovinskih et al. |
| 9,241,774 B2 | 1/2016 | Li et al. |
| 9,242,118 B2 | 1/2016 | Brawn |
| 9,261,358 B2 | 2/2016 | Atiya et al. |
| 9,277,972 B2 | 3/2016 | Brandt et al. |
| 9,336,336 B2 | 5/2016 | Deichmann et al. |
| 9,351,810 B2 | 5/2016 | Moon |
| 9,375,300 B2 | 6/2016 | Matov et al. |
| 9,403,238 B2 | 8/2016 | Culp |
| 9,408,743 B1 | 8/2016 | Wagner |
| 9,414,897 B2 | 8/2016 | Wu et al. |
| 9,433,476 B2 | 9/2016 | Khardekar et al. |
| 9,439,568 B2 | 9/2016 | Atiya et al. |
| 9,444,981 B2 | 9/2016 | Bellis et al. |
| 9,463,287 B1 | 10/2016 | Lorberbaum et al. |
| 9,492,243 B2 | 11/2016 | Kuo |
| 9,500,635 B2 | 11/2016 | Islam |
| 9,506,808 B2 | 11/2016 | Jeon et al. |
| 9,510,918 B2 | 12/2016 | Sanchez |
| 9,545,331 B2 | 1/2017 | Ingemarsson-Matzen |
| 9,566,132 B2 | 2/2017 | Stone-Collonge et al. |
| 9,584,771 B2 | 2/2017 | Mandelis et al. |
| 9,589,329 B2 | 3/2017 | Levin |
| 9,675,427 B2 | 6/2017 | Kopelman |

(56) References Cited

U.S. PATENT DOCUMENTS

| | | |
|---|---|---|
| 9,675,430 B2 | 6/2017 | Verker et al. |
| 9,693,839 B2 | 7/2017 | Atiya et al. |
| 9,730,769 B2 | 8/2017 | Chen et al. |
| 9,744,006 B2 | 8/2017 | Ross |
| 9,820,829 B2 | 11/2017 | Kuo |
| 9,830,688 B2 | 11/2017 | Levin |
| 9,844,421 B2 | 12/2017 | Moss et al. |
| 9,848,985 B2 | 12/2017 | Yang et al. |
| 9,861,451 B1 | 1/2018 | Davis |
| 9,936,186 B2 | 4/2018 | Jesenko et al. |
| 10,123,706 B2 | 11/2018 | Elbaz et al. |
| 10,123,853 B2 | 11/2018 | Moss et al. |
| 10,154,889 B2 | 12/2018 | Chen et al. |
| 10,159,541 B2 | 12/2018 | Bindayel |
| 10,172,693 B2 | 1/2019 | Brandt et al. |
| 10,195,690 B2 | 2/2019 | Culp |
| 10,231,801 B2 | 3/2019 | Korytov et al. |
| 10,238,472 B2 | 3/2019 | Levin |
| 10,258,432 B2 | 4/2019 | Webber |
| 2001/0002310 A1 | 5/2001 | Chishti et al. |
| 2001/0032100 A1 | 10/2001 | Mahmud et al. |
| 2001/0038705 A1 | 11/2001 | Rubbert et al. |
| 2001/0041320 A1 | 11/2001 | Phan et al. |
| 2002/0004727 A1 | 1/2002 | Knaus et al. |
| 2002/0007284 A1 | 1/2002 | Schurenberg et al. |
| 2002/0010568 A1 | 1/2002 | Rubbert et al. |
| 2002/0015934 A1 | 2/2002 | Rubbert et al. |
| 2002/0025503 A1 | 2/2002 | Chapoulaud et al. |
| 2002/0026105 A1 | 2/2002 | Drazen |
| 2002/0028417 A1 | 3/2002 | Chapoulaud et al. |
| 2002/0035572 A1 | 3/2002 | Takatori et al. |
| 2002/0064747 A1* | 5/2002 | Chishti .................. A61C 9/00 433/24 |
| 2002/0064752 A1 | 5/2002 | Durbin et al. |
| 2002/0064759 A1 | 5/2002 | Durbin et al. |
| 2002/0087551 A1 | 7/2002 | Hickey et al. |
| 2002/0107853 A1 | 8/2002 | Hofmann et al. |
| 2002/0188478 A1 | 12/2002 | Breeland et al. |
| 2002/0192617 A1 | 12/2002 | Phan et al. |
| 2003/0000927 A1 | 1/2003 | Kanaya et al. |
| 2003/0009252 A1 | 1/2003 | Pavlovskaia et al. |
| 2003/0019848 A1 | 1/2003 | Nicholas et al. |
| 2003/0021453 A1 | 1/2003 | Weise et al. |
| 2003/0035061 A1 | 2/2003 | Iwaki et al. |
| 2003/0049581 A1 | 3/2003 | Deluke |
| 2003/0057192 A1 | 3/2003 | Patel |
| 2003/0059736 A1 | 3/2003 | Lai et al. |
| 2003/0060532 A1 | 3/2003 | Subelka et al. |
| 2003/0068598 A1 | 4/2003 | Vallittu et al. |
| 2003/0095697 A1 | 5/2003 | Wood et al. |
| 2003/0101079 A1 | 5/2003 | McLaughlin |
| 2003/0103060 A1 | 6/2003 | Anderson et al. |
| 2003/0120517 A1 | 6/2003 | Eida et al. |
| 2003/0139834 A1 | 7/2003 | Nikolskiy et al. |
| 2003/0144886 A1 | 7/2003 | Taira |
| 2003/0172043 A1 | 9/2003 | Guyon et al. |
| 2003/0190575 A1 | 10/2003 | Hilliard |
| 2003/0192867 A1 | 10/2003 | Yamazaki et al. |
| 2003/0207224 A1 | 11/2003 | Lotte |
| 2003/0215764 A1 | 11/2003 | Kopelman et al. |
| 2003/0224311 A1 | 12/2003 | Cronauer |
| 2003/0224313 A1 | 12/2003 | Bergersen |
| 2003/0224314 A1 | 12/2003 | Bergersen |
| 2004/0002873 A1 | 1/2004 | Sachdeva |
| 2004/0009449 A1 | 1/2004 | Mah et al. |
| 2004/0013994 A1 | 1/2004 | Goldberg et al. |
| 2004/0019262 A1 | 1/2004 | Perelgut |
| 2004/0029078 A1 | 2/2004 | Marshall |
| 2004/0038168 A1 | 2/2004 | Choi et al. |
| 2004/0054304 A1 | 3/2004 | Raby |
| 2004/0054358 A1 | 3/2004 | Cox et al. |
| 2004/0058295 A1 | 3/2004 | Bergersen |
| 2004/0068199 A1 | 4/2004 | Echauz et al. |
| 2004/0078222 A1 | 4/2004 | Khan et al. |
| 2004/0080621 A1 | 4/2004 | Fisher et al. |
| 2004/0094165 A1 | 5/2004 | Cook |
| 2004/0107118 A1 | 6/2004 | Harnsberger et al. |
| 2004/0133083 A1 | 7/2004 | Comaniciu et al. |
| 2004/0152036 A1 | 8/2004 | Abolfathi |
| 2004/0158194 A1 | 8/2004 | Wolff et al. |
| 2004/0166463 A1 | 8/2004 | Wen et al. |
| 2004/0167646 A1 | 8/2004 | Jelonek et al. |
| 2004/0170941 A1 | 9/2004 | Phan et al. |
| 2004/0193036 A1 | 9/2004 | Zhou et al. |
| 2004/0197728 A1 | 10/2004 | Abolfathi et al. |
| 2004/0214128 A1 | 10/2004 | Sachdeva et al. |
| 2004/0219479 A1 | 11/2004 | Malin et al. |
| 2004/0220691 A1 | 11/2004 | Hofmeister et al. |
| 2004/0229185 A1 | 11/2004 | Knopp |
| 2004/0259049 A1 | 12/2004 | Kopelman et al. |
| 2005/0003318 A1 | 1/2005 | Choi et al. |
| 2005/0023356 A1 | 2/2005 | Wiklof et al. |
| 2005/0031196 A1 | 2/2005 | Moghaddam et al. |
| 2005/0037312 A1 | 2/2005 | Uchida |
| 2005/0038669 A1 | 2/2005 | Sachdeva et al. |
| 2005/0040551 A1 | 2/2005 | Biegler et al. |
| 2005/0042569 A1 | 2/2005 | Plan et al. |
| 2005/0042577 A1 | 2/2005 | Kvitrud et al. |
| 2005/0048433 A1 | 3/2005 | Hilliard |
| 2005/0074717 A1 | 4/2005 | Cleary et al. |
| 2005/0089822 A1 | 4/2005 | Geng |
| 2005/0100333 A1 | 5/2005 | Kerschbaumer et al. |
| 2005/0108052 A1 | 5/2005 | Omaboe |
| 2005/0131738 A1 | 6/2005 | Morris |
| 2005/0144150 A1 | 6/2005 | Ramamurthy et al. |
| 2005/0171594 A1 | 8/2005 | Machan et al. |
| 2005/0171630 A1 | 8/2005 | Dinauer et al. |
| 2005/0181333 A1 | 8/2005 | Karazivan et al. |
| 2005/0186524 A1 | 8/2005 | Abolfathi et al. |
| 2005/0186526 A1 | 8/2005 | Stewart et al. |
| 2005/0216314 A1 | 9/2005 | Secor |
| 2005/0233276 A1 | 10/2005 | Kopelman et al. |
| 2005/0239013 A1 | 10/2005 | Sachdeva |
| 2005/0244781 A1 | 11/2005 | Abels et al. |
| 2005/0244791 A1 | 11/2005 | Davis et al. |
| 2005/0271996 A1 | 12/2005 | Sporbert et al. |
| 2006/0056670 A1 | 3/2006 | Hamadeh |
| 2006/0057533 A1 | 3/2006 | McGann |
| 2006/0063135 A1 | 3/2006 | Mehl |
| 2006/0078842 A1 | 4/2006 | Sachdeva et al. |
| 2006/0084024 A1 | 4/2006 | Farrell |
| 2006/0093982 A1 | 5/2006 | Wen |
| 2006/0098007 A1 | 5/2006 | Rouet et al. |
| 2006/0099545 A1 | 5/2006 | Lia et al. |
| 2006/0099546 A1 | 5/2006 | Bergersen |
| 2006/0110698 A1 | 5/2006 | Robson |
| 2006/0111631 A1 | 5/2006 | Kelliher et al. |
| 2006/0115785 A1 | 6/2006 | Li et al. |
| 2006/0137813 A1 | 6/2006 | Robrecht et al. |
| 2006/0147872 A1 | 7/2006 | Andreiko |
| 2006/0154198 A1 | 7/2006 | Durbin et al. |
| 2006/0154207 A1 | 7/2006 | Kuo |
| 2006/0173715 A1 | 8/2006 | Wang |
| 2006/0183082 A1 | 8/2006 | Quadling et al. |
| 2006/0188834 A1 | 8/2006 | Hilliard |
| 2006/0188848 A1 | 8/2006 | Tricca et al. |
| 2006/0194163 A1 | 8/2006 | Tricca et al. |
| 2006/0199153 A1 | 9/2006 | Liu et al. |
| 2006/0204078 A1 | 9/2006 | Orth et al. |
| 2006/0223022 A1 | 10/2006 | Solomon |
| 2006/0223023 A1 | 10/2006 | Lai et al. |
| 2006/0223032 A1 | 10/2006 | Fried et al. |
| 2006/0223342 A1 | 10/2006 | Borst et al. |
| 2006/0234179 A1 | 10/2006 | Wen et al. |
| 2006/0257815 A1 | 11/2006 | De Dominicis |
| 2006/0275729 A1 | 12/2006 | Fornoff |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1 | 2/2007 | Andreiko |
| 2007/0046865 A1 | 3/2007 | Umeda et al. |
| 2007/0053048 A1 | 3/2007 | Kumar et al. |

(56) References Cited

U.S. PATENT DOCUMENTS

| | | |
|---|---|---|
| 2007/0054237 A1 | 3/2007 | Neuschafer |
| 2007/0065768 A1 | 3/2007 | Nadav |
| 2007/0087300 A1 | 4/2007 | Willison et al. |
| 2007/0087302 A1 | 4/2007 | Reising et al. |
| 2007/0106138 A1 | 5/2007 | Beiski et al. |
| 2007/0122592 A1 | 5/2007 | Anderson et al. |
| 2007/0128574 A1 | 6/2007 | Kuo et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1 | 7/2007 | Matov et al. |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0215582 A1 | 9/2007 | Roeper et al. |
| 2007/0218422 A1 | 9/2007 | Ehrenfeld |
| 2007/0231765 A1 | 10/2007 | Phan et al. |
| 2007/0238065 A1 | 10/2007 | Sherwood et al. |
| 2007/0239488 A1 | 10/2007 | DeRosso |
| 2007/0263226 A1 | 11/2007 | Kurtz et al. |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0057461 A1 | 3/2008 | Cheng et al. |
| 2008/0057467 A1 | 3/2008 | Gittelson |
| 2008/0057479 A1 | 3/2008 | Grenness |
| 2008/0059238 A1 | 3/2008 | Park et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118882 A1 | 5/2008 | Su |
| 2008/0118886 A1 | 5/2008 | Liang et al. |
| 2008/0141534 A1 | 6/2008 | Hilliard |
| 2008/0169122 A1 | 7/2008 | Shiraishi et al. |
| 2008/0171934 A1 | 7/2008 | Greenan et al. |
| 2008/0176448 A1 | 7/2008 | Muller et al. |
| 2008/0233530 A1 | 9/2008 | Cinader |
| 2008/0242144 A1 | 10/2008 | Dietz |
| 2008/0248443 A1 | 10/2008 | Chishti et al. |
| 2008/0254403 A1 | 10/2008 | Hilliard |
| 2008/0268400 A1 | 10/2008 | Moss et al. |
| 2008/0306724 A1 | 12/2008 | Kitching et al. |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kumada et al. |
| 2009/0087050 A1 | 4/2009 | Gandyra |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kassayan et al. |
| 2009/0130620 A1 | 5/2009 | Yazdi et al. |
| 2009/0136890 A1 | 5/2009 | Kang et al. |
| 2009/0136893 A1 | 5/2009 | Zegarelli |
| 2009/0148809 A1 | 6/2009 | Kuo et al. |
| 2009/0170050 A1 | 7/2009 | Marcus |
| 2009/0181346 A1 | 7/2009 | Orth |
| 2009/0191502 A1 | 7/2009 | Cao et al. |
| 2009/0210032 A1 | 8/2009 | Beiski et al. |
| 2009/0218514 A1 | 9/2009 | Klunder et al. |
| 2009/0246726 A1 | 10/2009 | Chelnokov et al. |
| 2009/0281433 A1 | 11/2009 | Saadat et al. |
| 2009/0286195 A1 | 11/2009 | Sears et al. |
| 2009/0298017 A1 | 12/2009 | Boerjes et al. |
| 2009/0305540 A1 | 12/2009 | Stadler et al. |
| 2009/0316966 A1 | 12/2009 | Marshall et al. |
| 2009/0317757 A1 | 12/2009 | Lemchen |
| 2010/0015565 A1 | 1/2010 | Carrillo Gonzalez et al. |
| 2010/0019170 A1 | 1/2010 | Hart et al. |
| 2010/0028825 A1 | 2/2010 | Lemchen |
| 2010/0045902 A1 | 2/2010 | Ikeda et al. |
| 2010/0062394 A1 | 3/2010 | Jones et al. |
| 2010/0068676 A1 | 3/2010 | Mason et al. |
| 2010/0086890 A1 | 4/2010 | Kuo |
| 2010/0138025 A1 | 6/2010 | Morton et al. |
| 2010/0142789 A1 | 6/2010 | Chang et al. |
| 2010/0145664 A1 | 6/2010 | Hultgren et al. |
| 2010/0145898 A1 | 6/2010 | Malfliet et al. |
| 2010/0152599 A1 | 6/2010 | DuHamel et al. |
| 2010/0165275 A1 | 7/2010 | Tsukamoto et al. |
| 2010/0167225 A1 | 7/2010 | Kuo |
| 2010/0179789 A1 | 7/2010 | Sachdeva et al. |
| 2010/0193482 A1 | 8/2010 | Ow et al. |
| 2010/0196837 A1 | 8/2010 | Farrell |
| 2010/0216085 A1 | 8/2010 | Kopelman |
| 2010/0217130 A1 | 8/2010 | Weinlaender |
| 2010/0231577 A1 | 9/2010 | Kim et al. |
| 2010/0268363 A1 | 10/2010 | Karim et al. |
| 2010/0268515 A1 | 10/2010 | Vogt et al. |
| 2010/0279243 A1 | 11/2010 | Cinader et al. |
| 2010/0280798 A1 | 11/2010 | Pattijn |
| 2010/0281370 A1 | 11/2010 | Rohaly et al. |
| 2010/0303316 A1 | 12/2010 | Bullis et al. |
| 2010/0312484 A1 | 12/2010 | DuHamel et al. |
| 2010/0327461 A1 | 12/2010 | Co et al. |
| 2011/0007920 A1 | 1/2011 | Abolfathi et al. |
| 2011/0012901 A1 | 1/2011 | Kaplanyan |
| 2011/0045428 A1 | 2/2011 | Boltunov et al. |
| 2011/0056350 A1 | 3/2011 | Gale et al. |
| 2011/0065060 A1 | 3/2011 | Teixeira et al. |
| 2011/0081625 A1 | 4/2011 | Fuh |
| 2011/0091832 A1 | 4/2011 | Kim et al. |
| 2011/0102549 A1 | 5/2011 | Takahashi |
| 2011/0102566 A1 | 5/2011 | Zakian et al. |
| 2011/0104630 A1 | 5/2011 | Matov et al. |
| 2011/0136072 A1 | 6/2011 | Li et al. |
| 2011/0136090 A1 | 6/2011 | Kazemi |
| 2011/0143300 A1 | 6/2011 | Villaalba |
| 2011/0143673 A1 | 6/2011 | Landesman et al. |
| 2011/0159452 A1 | 6/2011 | Huang |
| 2011/0164810 A1 | 7/2011 | Zang et al. |
| 2011/0207072 A1 | 8/2011 | Schiemann |
| 2011/0212420 A1 | 9/2011 | Vuillemot |
| 2011/0220623 A1 | 9/2011 | Beutler |
| 2011/0235045 A1 | 9/2011 | Koerner et al. |
| 2011/0269092 A1 | 11/2011 | Kuo et al. |
| 2011/0316994 A1 | 12/2011 | Lemchen |
| 2012/0028210 A1 | 2/2012 | Hegyi et al. |
| 2012/0029883 A1 | 2/2012 | Heinz et al. |
| 2012/0040311 A1 | 2/2012 | Nilsson |
| 2012/0064477 A1 | 3/2012 | Schmitt |
| 2012/0081786 A1 | 4/2012 | Mizuyama et al. |
| 2012/0086681 A1 | 4/2012 | Kim et al. |
| 2012/0115107 A1 | 5/2012 | Adams |
| 2012/0129117 A1 | 5/2012 | McCance |
| 2012/0147912 A1 | 6/2012 | Moench et al. |
| 2012/0150494 A1 | 6/2012 | Anderson et al. |
| 2012/0166213 A1 | 6/2012 | Arnone et al. |
| 2012/0172678 A1 | 7/2012 | Logan et al. |
| 2012/0281293 A1 | 11/2012 | Gronenborn et al. |
| 2012/0295216 A1 | 11/2012 | Dykes et al. |
| 2012/0322025 A1 | 12/2012 | Ozawa et al. |
| 2013/0029284 A1 | 1/2013 | Teasdale |
| 2013/0081272 A1 | 4/2013 | Johnson et al. |
| 2013/0089828 A1 | 4/2013 | Borovinskih et al. |
| 2013/0095446 A1 | 4/2013 | Andreiko et al. |
| 2013/0103176 A1 | 4/2013 | Kopelman et al. |
| 2013/0110469 A1 | 5/2013 | Kopelman |
| 2013/0150689 A1 | 6/2013 | Shaw-Klein |
| 2013/0163627 A1 | 6/2013 | Seurin et al. |
| 2013/0201488 A1 | 8/2013 | Ishihara |
| 2013/0204599 A1 | 8/2013 | Matov et al. |
| 2013/0209952 A1 | 8/2013 | Kuo et al. |
| 2013/0235165 A1 | 9/2013 | Gharib et al. |
| 2013/0252195 A1 | 9/2013 | Popat |

(56) References Cited

U.S. PATENT DOCUMENTS

| | | |
|---|---|---|
| 2013/0266326 A1 | 10/2013 | Joseph et al. |
| 2013/0278396 A1 | 10/2013 | Kimmel |
| 2013/0280671 A1 | 10/2013 | Brawn et al. |
| 2013/0286174 A1 | 10/2013 | Urakabe |
| 2013/0293824 A1 | 11/2013 | Yoneyama et al. |
| 2013/0323664 A1 | 12/2013 | Parker |
| 2013/0323671 A1 | 12/2013 | Dillon et al. |
| 2013/0323674 A1 | 12/2013 | Hakomori et al. |
| 2013/0325431 A1 | 12/2013 | See et al. |
| 2013/0337412 A1 | 12/2013 | Kwon |
| 2014/0061974 A1 | 3/2014 | Tyler |
| 2014/0081091 A1 | 3/2014 | Abolfathi et al. |
| 2014/0093160 A1 | 4/2014 | Porikli et al. |
| 2014/0106289 A1 | 4/2014 | Kozlowski |
| 2014/0122027 A1 | 5/2014 | Andreiko et al. |
| 2014/0136222 A1 | 5/2014 | Arnone et al. |
| 2014/0142902 A1 | 5/2014 | Chelnokov et al. |
| 2014/0178829 A1 | 6/2014 | Kim |
| 2014/0265034 A1 | 9/2014 | Dudley |
| 2014/0272774 A1 | 9/2014 | Dillon et al. |
| 2014/0280376 A1 | 9/2014 | Kuo |
| 2014/0294273 A1 | 10/2014 | Jaisson |
| 2014/0313299 A1 | 10/2014 | Gebhardt et al. |
| 2014/0326253 A1* | 11/2014 | Baratier ................. A61F 5/566 128/848 |
| 2014/0329194 A1 | 11/2014 | Sachdeva et al. |
| 2014/0342301 A1 | 11/2014 | Fleer et al. |
| 2014/0350354 A1 | 11/2014 | Stenzler et al. |
| 2014/0363778 A1 | 12/2014 | Parker |
| 2015/0002649 A1 | 1/2015 | Nowak et al. |
| 2015/0004553 A1 | 1/2015 | Li et al. |
| 2015/0021210 A1 | 1/2015 | Kesling |
| 2015/0079531 A1* | 3/2015 | Heine ..................... A61C 7/08 433/19 |
| 2015/0094564 A1 | 4/2015 | Tashman et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0132708 A1 | 5/2015 | Kuo |
| 2015/0140502 A1 | 5/2015 | Brawn et al. |
| 2015/0150501 A1 | 6/2015 | George et al. |
| 2015/0164335 A1 | 6/2015 | Van Der Poel et al. |
| 2015/0173856 A1 | 6/2015 | Lowe et al. |
| 2015/0182303 A1 | 7/2015 | Abraham et al. |
| 2015/0216626 A1 | 8/2015 | Ranjbar |
| 2015/0216716 A1 | 8/2015 | Anitua Aldecoa |
| 2015/0230885 A1 | 8/2015 | Wucher |
| 2015/0238280 A1 | 8/2015 | Wu et al. |
| 2015/0238283 A1 | 8/2015 | Tanugula et al. |
| 2015/0306486 A1 | 10/2015 | Logan et al. |
| 2015/0320320 A1 | 11/2015 | Kopelman et al. |
| 2015/0320532 A1 | 11/2015 | Matty et al. |
| 2015/0325044 A1 | 11/2015 | Lebovitz |
| 2015/0338209 A1 | 11/2015 | Knüttel |
| 2015/0351638 A1 | 12/2015 | Amato |
| 2015/0374469 A1 | 12/2015 | Konno et al. |
| 2016/0000332 A1 | 1/2016 | Atiya et al. |
| 2016/0003610 A1 | 1/2016 | Lampert et al. |
| 2016/0022185 A1 | 1/2016 | Agarwal et al. |
| 2016/0042509 A1 | 2/2016 | Andreiko et al. |
| 2016/0051345 A1 | 2/2016 | Levin |
| 2016/0064898 A1 | 3/2016 | Atiya et al. |
| 2016/0067013 A1 | 3/2016 | Morton et al. |
| 2016/0081768 A1 | 3/2016 | Kopelman et al. |
| 2016/0081769 A1 | 3/2016 | Kimura et al. |
| 2016/0095668 A1 | 4/2016 | Kuo et al. |
| 2016/0100924 A1 | 4/2016 | Wilson et al. |
| 2016/0106520 A1 | 4/2016 | Borovinskih et al. |
| 2016/0120621 A1 | 5/2016 | Li et al. |
| 2016/0135924 A1 | 5/2016 | Choi et al. |
| 2016/0135925 A1 | 5/2016 | Mason et al. |
| 2016/0163115 A1 | 6/2016 | Furst |
| 2016/0217708 A1 | 7/2016 | Levin et al. |
| 2016/0220105 A1 | 8/2016 | Durent |
| 2016/0220200 A1 | 8/2016 | Sandholm et al. |
| 2016/0225151 A1 | 8/2016 | Cocco et al. |
| 2016/0228213 A1 | 8/2016 | Tod et al. |
| 2016/0242871 A1 | 8/2016 | Morton et al. |
| 2016/0246936 A1 | 8/2016 | Kahn |
| 2016/0287358 A1 | 10/2016 | Nowak et al. |
| 2016/0296303 A1 | 10/2016 | Parker |
| 2016/0302885 A1 | 10/2016 | Matov et al. |
| 2016/0328843 A1 | 11/2016 | Graham et al. |
| 2016/0338799 A1 | 11/2016 | Wu et al. |
| 2016/0346063 A1 | 12/2016 | Schulhof et al. |
| 2016/0367188 A1 | 12/2016 | Malik et al. |
| 2016/0367339 A1 | 12/2016 | Khardekar et al. |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0020633 A1 | 1/2017 | Stone-Collonge et al. |
| 2017/0049311 A1 | 2/2017 | Borovinskih et al. |
| 2017/0049326 A1 | 2/2017 | Alfano et al. |
| 2017/0056131 A1 | 3/2017 | Alauddin et al. |
| 2017/0071705 A1 | 3/2017 | Kuo |
| 2017/0086943 A1 | 3/2017 | Mah |
| 2017/0100209 A1 | 4/2017 | Wen |
| 2017/0100212 A1 | 4/2017 | Sherwood et al. |
| 2017/0100213 A1 | 4/2017 | Kuo |
| 2017/0100214 A1 | 4/2017 | Wen |
| 2017/0105815 A1 | 4/2017 | Matov et al. |
| 2017/0135792 A1 | 5/2017 | Webber |
| 2017/0135793 A1 | 5/2017 | Webber et al. |
| 2017/0156821 A1 | 6/2017 | Kopelman et al. |
| 2017/0165032 A1 | 6/2017 | Webber et al. |
| 2017/0215739 A1 | 8/2017 | Miyasato |
| 2017/0251954 A1 | 9/2017 | Lotan et al. |
| 2017/0258555 A1 | 9/2017 | Kopelman |
| 2017/0265970 A1 | 9/2017 | Verker |
| 2017/0319054 A1 | 11/2017 | Miller et al. |
| 2017/0319296 A1 | 11/2017 | Webber et al. |
| 2017/0325690 A1 | 11/2017 | Salah et al. |
| 2017/0340411 A1 | 11/2017 | Akselrod |
| 2017/0340415 A1 | 11/2017 | Choi et al. |
| 2018/0000563 A1 | 1/2018 | Shanjani et al. |
| 2018/0000565 A1 | 1/2018 | Shanjani et al. |
| 2018/0028064 A1 | 2/2018 | Elbaz et al. |
| 2018/0028065 A1 | 2/2018 | Elbaz et al. |
| 2018/0055602 A1 | 3/2018 | Kopelman et al. |
| 2018/0071054 A1 | 3/2018 | Ha |
| 2018/0071055 A1 | 3/2018 | Kuo |
| 2018/0085059 A1 | 3/2018 | Lee |
| 2018/0096465 A1 | 4/2018 | Levin |
| 2018/0125610 A1 | 5/2018 | Carrier et al. |
| 2018/0153648 A1 | 6/2018 | Shanjani et al. |
| 2018/0153649 A1 | 6/2018 | Wu et al. |
| 2018/0153733 A1 | 6/2018 | Kuo |
| 2018/0168788 A1 | 6/2018 | Fernie |
| 2018/0192877 A1 | 7/2018 | Atiya et al. |
| 2018/0228359 A1 | 8/2018 | Meyer et al. |
| 2018/0280118 A1 | 10/2018 | Cramer |
| 2018/0284727 A1 | 10/2018 | Cramer et al. |
| 2018/0303582 A1* | 10/2018 | Hung ..................... A61C 7/08 |
| 2018/0318043 A1 | 11/2018 | Li et al. |
| 2018/0368944 A1 | 12/2018 | Sato et al. |
| 2019/0026599 A1 | 1/2019 | Salah et al. |
| 2019/0046296 A1 | 2/2019 | Kopelman et al. |
| 2019/0046297 A1 | 2/2019 | Kopelman et al. |
| 2019/0069975 A1 | 3/2019 | Cam et al. |
| 2019/0076216 A1 | 3/2019 | Moss et al. |
| 2019/0090983 A1 | 3/2019 | Webber et al. |

FOREIGN PATENT DOCUMENTS

| | | |
|---|---|---|
| AU | 5598894 A | 6/1994 |
| CA | 1121955 A1 | 4/1982 |
| CN | 1655732 A | 8/2005 |
| CN | 1655733 A | 8/2005 |
| CN | 102017658 A | 4/2011 |
| CN | 103889364 A | 6/2014 |
| CN | 204092220 U | 1/2015 |
| CN | 105496575 A | 4/2016 |
| CN | 105997274 A | 10/2016 |

(56) References Cited

FOREIGN PATENT DOCUMENTS

| | | |
|---|---|---|
| CN | 106063732 A | 11/2016 |
| CN | 106137416 A | 11/2016 |
| CN | 106264757 A | 1/2017 |
| CN | 107126275 A | 9/2017 |
| DE | 2749802 A1 | 5/1978 |
| DE | 3526198 A1 | 2/1986 |
| DE | 4207169 A1 | 9/1993 |
| DE | 69327661 T2 | 7/2000 |
| DE | 102005043627 A1 | 3/2007 |
| DE | 202010017014 U1 | 3/2011 |
| DE | 102011051443 A1 | 1/2013 |
| DE | 202012011899 U1 | 1/2013 |
| DE | 102014225457 A1 | 6/2016 |
| EP | 0428152 A1 | 5/1991 |
| EP | 490848 A2 | 6/1992 |
| EP | 541500 A1 | 5/1993 |
| EP | 714632 B1 | 5/1997 |
| EP | 774933 B1 | 12/2000 |
| EP | 731673 B1 | 5/2001 |
| EP | 1941843 A2 | 7/2008 |
| EP | 2437027 A2 | 4/2012 |
| EP | 2447754 A1 | 5/2012 |
| EP | 1989764 B1 | 7/2012 |
| EP | 2332221 B1 | 11/2012 |
| EP | 2596553 B1 | 12/2013 |
| EP | 2612300 B1 | 2/2015 |
| EP | 2848229 A1 | 3/2015 |
| ES | 463897 A1 | 1/1980 |
| ES | 2455066 A1 | 4/2014 |
| FR | 2369828 A1 | 6/1978 |
| FR | 2867377 A1 | 9/2005 |
| FR | 2930334 A1 | 10/2009 |
| GB | 1550777 A | 8/1979 |
| JP | 53-058191 A | 5/1978 |
| JP | 4028359 A | 1/1992 |
| JP | 08-508174 A | 9/1996 |
| JP | 09-19443 A | 1/1997 |
| JP | 2003245289 A | 9/2003 |
| JP | 2000339468 A | 9/2004 |
| JP | 2005527320 A | 9/2005 |
| JP | 2005527321 A | 9/2005 |
| JP | 2006043121 A | 2/2006 |
| JP | 2007151614 A | 6/2007 |
| JP | 2007260158 A | 10/2007 |
| JP | 2007537824 A | 12/2007 |
| JP | 2008067732 A | 3/2008 |
| JP | 2008523370 A | 7/2008 |
| JP | 04184427 B1 | 11/2008 |
| JP | 2009000412 A | 1/2009 |
| JP | 2009018173 A | 1/2009 |
| JP | 2009078133 A | 4/2009 |
| JP | 2009101386 A | 5/2009 |
| JP | 2009205330 A | 9/2009 |
| JP | 2010017726 A | 1/2010 |
| JP | 2011087733 A | 5/2011 |
| JP | 2012045143 A | 3/2012 |
| JP | 2013007645 A | 1/2013 |
| JP | 2013192865 A | 9/2013 |
| JP | 201735173 A | 2/2017 |
| KR | 10-20020062793 A | 7/2002 |
| KR | 10-20070108019 A | 11/2007 |
| KR | 10-20090065778 A | 6/2009 |
| KR | 10-1266966 B1 | 5/2013 |
| KR | 10-2016-041632 A | 4/2016 |
| KR | 10-2016-0071127 A | 6/2016 |
| KR | 10-1675089 B1 | 11/2016 |
| TW | 480166 B | 3/2002 |
| WO | WO91/004713 A1 | 4/1991 |
| WO | WO92/03102 A1 | 3/1992 |
| WO | WO94/010935 A1 | 5/1994 |
| WO | WO96/23452 A1 | 8/1996 |
| WO | WO98/032394 A1 | 7/1998 |
| WO | WO98/044865 A1 | 10/1998 |
| WO | WO01/08592 A1 | 2/2001 |
| WO | WO01/85047 A2 | 11/2001 |
| WO | WO02/017776 A2 | 3/2002 |
| WO | WO02/062252 A1 | 8/2002 |
| WO | WO02/095475 A1 | 11/2002 |
| WO | WO03/003932 A2 | 1/2003 |
| WO | WO2006/096558 A2 | 9/2006 |
| WO | WO2006/100700 A1 | 9/2006 |
| WO | WO2006/133548 A1 | 12/2006 |
| WO | WO2007/019709 A2 | 2/2007 |
| WO | WO2007/071341 A1 | 6/2007 |
| WO | WO2007/103377 A2 | 9/2007 |
| WO | WO2008/115654 A1 | 9/2008 |
| WO | WO2009/016645 A2 | 2/2009 |
| WO | WO2009/085752 A2 | 7/2009 |
| WO | WO2009/089129 A1 | 7/2009 |
| WO | WO2009/146788 A1 | 12/2009 |
| WO | WO2009/146789 A1 | 12/2009 |
| WO | WO2010/059988 A1 | 5/2010 |
| WO | WO2010/123892 A2 | 10/2010 |
| WO | WO2012/007003 A1 | 1/2012 |
| WO | WO2012/064684 A2 | 5/2012 |
| WO | WO2012/074304 A2 | 6/2012 |
| WO | WO2012/078980 A2 | 6/2012 |
| WO | WO2012/083968 A1 | 6/2012 |
| WO | WO2012/140021 A2 | 10/2012 |
| WO | WO2013/058879 A2 | 4/2013 |
| WO | WO2014/068107 A1 | 5/2014 |
| WO | WO2014/091865 A1 | 6/2014 |
| WO | WO2014/143911 A1 | 9/2014 |
| WO | WO2015/015289 A2 | 2/2015 |
| WO | WO2015/063032 A1 | 5/2015 |
| WO | WO2015/112638 A1 | 7/2015 |
| WO | WO2015/176004 A1 | 11/2015 |
| WO | WO2016/004415 A1 | 1/2016 |
| WO | WO2016/042393 A1 | 3/2016 |
| WO | WO2016/061279 A1 | 4/2016 |
| WO | WO2016/084066 A1 | 6/2016 |
| WO | WO2016/099471 A1 | 6/2016 |
| WO | WO2016/113745 A1 | 7/2016 |
| WO | WO2016/116874 A1 | 7/2016 |
| WO | WO2016/200177 A1 | 12/2016 |
| WO | WO2017/006176 A1 | 1/2017 |
| WO | WO2017/182654 A1 | 10/2017 |
| WO | WO2018/057547 A1 | 3/2018 |
| WO | WO2018/085718 A2 | 5/2018 |
| WO | WO2018/232113 A1 | 12/2018 |
| WO | WO2019/018784 A1 | 1/2019 |

OTHER PUBLICATIONS

Arakawa et al; Mouthguard biosensor with telemetry system for monitoring of saliva glucose: A novel cavitas sensor; Biosensors and Bioelectronics; 84; pp. 106-111; Oct. 2016.
O'Leary et al.; U.S. Appl. No. 16/195,701 entitled "Orthodontic retainers," filed Nov. 19, 2018.
Shanjani et al., U.S. Appl. No. 16/206,894 entitled "Sensors for monitoring oral appliances," filed Nov. 28, 2019.
Shanjani et al., U.S. Appl. No. 16/231,906 entitled "Augmented reality enhancements for dental practitioners." filed Dec. 24, 2018.
Kopleman et al., U.S. Appl. No. 16/220,381 entitled "Closed loop adaptive orthodontic treatment methods and apparatuses," filed Dec. 14, 2018.
Farooq et al.; Relationship between tooth dimensions and malocclusion; JPMA: The Journal of the Pakistan Medical Association; 64(6); pp. 670-674; Jun. 2014.
Newcombe; Dtam: Dense tracking and mapping in real-time; 8 pages; retrieved from the internet (http://www.doc.ic.ac.uk/?ajd/Publications/newcombe_etal_iccv2011.pdf; on Dec. 2011.
ormco.com; Increasing clinical performance with 3D interactive treatment planning and patient-specific appliances; 8 pages; retrieved from the internet (http://www.konsident.com/wp-content/files_mf/1295385693http__ormco.com_index_cmsfilesystemaction_fileOrmcoPDF_whitepapers.pdf) on Feb. 27, 2019.
Video of DICOM to Surgical Guides; [Copy Not Enclosed], Can be viewed at <URL:https://youtu.be/47KtOmCEFQk; Published Apr. 4, 2016.

(56) References Cited

OTHER PUBLICATIONS

Sabina et al., U.S. Appl. No. 16/258,516 entitled "Diagnostic intraoral scanning" filed Jan. 25, 2019.
Sabina et al., U.S. Appl. No. 16/258,523 entitled "Diagnostic intraoral tracking" filed Jan. 25, 2019.
Sabina et al., U.S. Appl. No. 16/258,527 entitled "Diagnostic intraoral methods and apparatuses" filed Jan. 25, 2019.
Li et al.; U.S. Appl. No. 16/171,159 entitled "Alternative bite adjustment structures," filed Oct. 25, 2018.
Culp; U.S. Appl. No. 16/236,220 entitled "Laser cutting," filed Dec. 28, 2018.
Culp; U.S. Appl. No. 16/265,287 entitled "Laser cutting," filed Feb. 1, 2019.
Bernabe et al.; Are the lower incisors the best predictors for the unerupted canine and premolars sums? An analysis of Peruvian sample; The Angle Orthodontist; 75(2); pp. 202-207; Mar. 2005.
Collins English Dictionary; Teeth (definition); 9 pages; retrieved from the internet (https:www.collinsdictionary.com/us/dictionary/english/teeth) on May 13, 2019.
Dental Monitoring; Basics: How to put the cheek retractor?; 1 page (Screenshot); retrieved from the interenet (https://www.youtube.com/watch?v=6K1HXw4Kq3c); May 27, 2016.
Dental Monitoring; Dental monitoring tutorial; 1 page (Screenshot); retrieved from the internet (https:www.youtube.com/watch?v=Dbe3udOf9_c); Mar. 18, 2015.
dictionary.com; Plural (definition); 6 pages; retrieved from the internet ( https://www.dictionary.com/browse/plural#) on May 13, 2019.
dictionary.com; Quadrant (definition); 6 pages; retrieved from the internet ( https://www.dictionary.com/browse/quadrant?s=t) on May 13, 2019.
Ecligner Selfie; Change your smile; 1 page (screenshot); retrieved from the internet (https:play.google.com/store/apps/details?id=parklict.ecligner); on Feb. 13, 2018.
Martinelli et al.; Prediction of lower permanent canine and premolars width by correlation methods; The Angle Orthodontist; 75(5); pp. 805-808; Sep. 2005.
Nourallah et al.; New regression equations for prediciting the size of unerupted canines and premolars in a contemporary population; The Angle Orthodontist; 72(3); pp. 216-221; Jun. 2002.
Paredes et al.; A new, accurate and fast digital method to predict unerupted tooth size; The Angle Orthodontist; 76(1); pp. 14-19; Jan. 2006.
Sobral De Agular et al.; The gingival crevicular fluid as a source of biomarkers to enhance efficiency of orthodontic and functional treatment of growing patients; Bio. Med. Research International; vol. 2017; pp. 1-7; Article ID 3257235; (year of pub. sufficiently earlier than effective US filing date and any foreign priority date) 2017.
Levin; U.S. Appl. No. 16/282,431 entitled "Estimating a surface texture of a tooth," filed Feb. 2, 2019.
Chen et al.; U.S. Appl. No. 16/223,019 entitled "Release agent receptacle," filed Dec. 17, 2018.
Bandodkar et al.; All-printed magnetically self-healing electrochemical devices; Science Advances; 2(11); 11 pages; e1601465; Nov. 2016.
Bandodkar et al.; Self-healing inks for autonomous repair of printable electrochemical devices; Advanced Electronic Materials; 1(12); 5 pages; 1500289; Dec. 2015.
Bandodkar et al.; Wearable biofuel cells: a review; Electroanalysis; 28(6); pp. 1188-1200; Jun. 2016.
Bandodkar et al.; Wearable chemical sensors: present challenges and future prospects; Acs Sensors; 1(5); pp. 464-482; May 11, 2016.
Imani et al.; A wearable chemical-electrophysiological hybrid biosensing system for real-time health and fitness monitoring; Nature Communications; 7; 11650. doi 1038/ncomms11650; 7 pages; May 23, 2016.
Jia et al.; Epidermal biofuel cells: energy harvesting from human perspiration; Angewandle Chemie International Edition; 52(28); pp. 7233-7236; Jul. 8, 2013.
Jia et al.; Wearable textile biofuel cells for powering electronics; Journal of Materials Chemistry A; 2(43); pp. 18184-18189; Oct. 14, 2014.
Jeerapan et al.; Stretchable biofuel cells as wearable textile-based self-powered sensors; Journal of Materials Chemistry A; 4(47); pp. 18342-18353; Dec. 21, 2016.
Kim et al.; Advanced materials for printed wearable electrochemical devices: A review; Advanced Electronic Materials; 3(1); 15 pages; 1600260; Jan. 2017.
Kim et al.; Noninvasive alcohol monitoring using a wearable tatto-based iontophoretic-biosensing system; Acs Sensors; 1(8); pp. 1011-1019; Jul. 22, 2016.
Kim et al.; Non-invasive mouthguard biosensor for continuous salivary monitoring of metabolites; Analyst; 139(7); pp. 1632-1636; Apr. 7, 2014.
Kim et al.; A wearable fingernail chemical sensing platform: pH sensing at your fingertips; Talanta; 150; pp. 622-628; Apr. 2016.
Kim et al.; Wearable salivary uric acid mouthguard biosensor with integrated wireless electronics; Biosensors and Bioelectronics; 74; pp. 1061-1068; 19 pages; (Author Manuscript); Dec. 2015.
Kumar et al.; All-printed, stretchable Zn—Ag2o rechargeable battery via, hyperelastic binder for self-powering wearable electronics; Advanced Energy Materials; 7(8); 8 pages; 1602096; Apr. 2017.
Kumar et al.; Biomarkers in orthodontic tooth movement; Journal of Pharmacy Bioallied Sciences; 7(Suppl 2); pp. S325-S330; 12 pages; (Author Manuscript); Aug. 2015.
Parrilla et al.; A textile-based stretchable multi-ion potentiometric sensor; Advanced Healthcare Materials; 5(9); pp. 996-1001; May 2016.
Windmiller et al.; Wearable electrochemical sensors and biosensors: a review; Electroanalysis; 25(1); pp. 29-46; Jan. 2013.
Zhou et al.; Bio-logic analysis of injury biomarker patterns in human serum samples; Talanta; 83(3); pp. 955-959; Jan. 15, 2011.
Zhou et al.; Biofuel cells for self-powered electrochemical biosensing and logic biosensing: A review; Electroanalysis; 24(2); pp. 197-209; Feb. 2012.
Elbaz et al.; U.S. Appl. No. 16/188,262 entitled "Intraoral scanner with dental diagnostics capabilities," filed Nov. 12, 2018.
Elbaz et al.; U.S. Appl. No. 16/198,488 entitled "Intraoral scanner with dental diagnostics capabilities," filed Nov. 21, 2018.
Akopov et al.; U.S. Appl. No. 16/178,491 entitled "Automatic treatment planning," filed Nov. 1, 2018.
AADR. American Association for Dental Research; Summary of Activities; Los Angeles, CA; p. 195; Mar. 20-23,(year of pub. sufficiently earlier than effective US filing date and any foreign priority date) 1980.
Alcaniz et al.; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.
Alexander et al.; The DigiGraph Work Station Part 2 Clinical Management; J. Clin. Orthod.; pp. 402-407; (Author Manuscript); Jul. 1990.
Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.
Allesee Orthodontic Appliance: Important Tip About Wearing the Red White & Blue Active Clear Retainer System; Allesee Orthodontic Appliances—Pro Lab; 1 page; (year of pub. sufficiently earlier than effective US filing date and any foreign priority date); 1998.
Allesee Orthodontic Appliances: DuraClearTM; Product information; 1 page; (year of pub. sufficiently earlier than effective US filing date and any foreign priority date) 1997.
Allesee Orthodontic Appliances; The Choice Is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.
Allesee Orthodontic Appliances; The Choice Is Clear: Red, White & Blue . . . The Simple, Affordable, No-Braces Treatment; (product

(56) References Cited

OTHER PUBLICATIONS information), 6 pages; (year of pub. sufficiently earlier than effective US filing date and any foreign priority date) 2003.
Allesee Orthodontic Appliances; The Choice is Clear: Red, White & Blue . . . The Simple, Affordable, No-Braces Treatment; (Patient Information); retrieved from the internet (http://ormco.com/aoa/appliancesservices/RWB/patients.html); 2 pages on May 19, 2003.
Allesee Orthodontic Appliances; The Red, White & Blue Way to Improve Your Smile; (information for patients), 2 pages; (year of pub. sufficiently earlier than effective US filing date and any foreign priority date) 1992.
Allesee Orthodontic Appliances; You may be a candidate for this invisible no-braces treatment; product information for patients; 2 pages; (year of pub. sufficiently earlier than effective US filing date and any foreign priority date) 2002.
Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979-Apr. 1, 1979, New Orleans Marriot; Journal of Dental Research; vol. 58, Special Issue A, p. 221; Jan. 1979.
Altschuler et al.; Laser Electro-Optic System for Rapid Three-Dimensional (3D) Topographic Mapping of Surfaces; Optical Engineering; 20(6); pp. 953-961; Dec. 1981.
Altschuler et al.; Measuring Surfaces Space-Coded by a Laser-Projected Dot Matrix; SPIE Imaging q Applications for Automated Industrial Inspection and Assembly; vol. 182; pp. 187-191; Oct. 10, 1979.
Altschuler; 3D Mapping of Maxillo-Facial Prosthesis; AADR Abstract #607; 2 pages total, (year of pub. sufficiently earlier than effective US filing date and any foreign priority date) 1980.
Alves et al.; New trends in food allergens detection: toward biosensing strategies; Critical Reviews in Food Science and Nutrition; 56(14); pp. 2304-2319; doi: 10.1080/10408398.2013.831026; Oct. 2016.
Andersson et al.; Clinical Results with Titanium Crowns Fabricated with Machine Duplication and Spark Erosion; Acta Odontologica Scandinavica; 47(5); pp. 279-286; Oct. 1989.
Andrews, The Six Keys to Optimal Occlusion Straight Wire, Chapter 3, L.A. Wells; pp. 13-24; (year of pub. sufficiently earlier than effective US filing date and any foreign priority date) 1989.
Barone et al.; Creation of 3D multi-body orthodontic models by using independent imaging sensors; Sensors; 13(2); pp. 2033-2050; Feb. 5, 2013.
Bartels et al.; An Introduction to Splines for Use in Computer Graphics and Geometric Modeling; Morgan Kaufmann Publishers; pp. 422-425 Jan. 1, 1987.
Baumrind et al., "Mapping the Skull in 3-D," reprinted from J. Calif. Dent. Assoc, 48(2), 11 pages; (year of pub. sufficiently earlier than effective US filing date and any foreign priority date) Fall Issue 1972.
Baumrind et al.; A Stereophotogrammetric System for the Detection of Prosthesis Loosening in Total Hip Arthroplasty; NATO Symposium on Applications of Human Biostereometrics; SPIE; vol. 166; pp. 112-123; Jul. 9-13, 1978.
Baumrind; A System for Cranio facial Mapping Through the integration of Data from Stereo X-Ray Films and Stereo Photographs; an invited paper submitted to the 1975 American Society of Photogram Symposium on Close-Range Photogram Systems; University of Illinois; pp. 142-166; Aug. 26-30, 1975.
Baumrind; Integrated Three-Dimensional Craniofacial Mapping: Background, Principles, and Perspectives; Seminars in Orthodontics; 7(4); pp. 223-232; Dec. 2001.
Begole et al.; A Computer System for the Analysis of Dental Casts; The Angle Orthodontist; 51(3); pp. 252-258; Jul. 1981.
Bernard et al; Computerized Diagnosis in Orthodontics for Epidemiological Studies: A ProgressReport; (Abstract Only), J. Dental Res. Special Issue, vol. 67, p. 169, paper presented at International Association for Dental Research 66th General Session, Montreal Canada; Mar. 9-13, 1988.

Bhatia et al.; A Computer-Aided Design for Orthognathic Surgery; British Journal of Oral and Maxillofacial Surgery; 22(4); pp. 237-253; Aug. 1, 1984.
Biggerstaff et al.; Computerized Analysis of Occlusion in the Postcanine Dentition; American Journal of Orthodontics; 61(3); pp. 245-254; Mar. 1972.
Biggerstaff; Computerized Diagnostic Setups and Simulations; Angle Orthodontist; 40(I); pp. 28-36; Jan. 1970.
Biostar Operation & Training Manual. Great Lakes Orthodontics, Ltd. 199 Fire Tower Drive,Tonawanda, New York. 14150-5890, 20 pages; (year of pub. sufficiently earlier than effective US filing date and any foreign priority date) 1990.
Blu et al.; Linear interpolation revitalized; IEEE Transactions on Image Processing; 13(5); pp. 710-719; May 2004.
Bourke, Coordinate System Transformation; 1 page; retrived from the internet (http://astronomy.swin.edu.au/' pbourke/prolection/coords) on Nov. 5, 2004; Jun. 1996.
Boyd et al.; Three Dimensional Diagnosis and Orthodontic Treatment of Complex Malocclusions With the Invisalipn Appliance; Seminars in Orthodontics; 7(4); pp. 274-293; Dec. 2001.
Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.
Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.
Burstone et al.; Precision Adjustment of the Transpalatal Lingual Arch: Computer Arch Form Predetermination; American Journal of Orthodontics; 79(2);pp. 115-133; Feb. 1981.
Burstone; Dr. Charles J. Burstone on The Uses of the Computer in Orthodontic Practice (Part 1); Journal of Clinical Orthodontics; 13(7); pp. 442-453; (interview); Jul. 1979.
Burstone; Dr. Charles J. Burstone on The Uses of the Computer in Orthodontic Practice (Part 2); journal of Clinical Orthodontics; 13(8); pp. 539-551 (interview); Aug. 1979.
Cardinal Industrial Finishes; Powder Coatings; 6 pages; retrieved from the internet (http://www.cardinalpaint.com) on Aug. 25, 2000.
Carnaghan, An Alternative to Holograms for the Portrayal of Human Teeth; 4th Int'l. Conf. on Holographic Systems, Components and Applications; pp. 228-231; Sep. 15, 1993.
Chaconas et al,; The DigiGraph Work Station, Part 1, Basic Concepts; Journal of Clinical Orthodontics; 24(6); pp. 360-367; (Author Manuscript); Jun. 1990.
Chafetz et al.; Subsidence of the Femoral Prosthesis, A Stereophotogrammetric Evaluation; Clinical Orthopaedics and Related Research; No. 201; pp. 60-67; Dec. 1985.
Chiappone; Constructing the Gnathologic Setup and Positioner; Journal of Clinical Orthodontics; 14(2); pp. 121-133; Feb. 1980.
Chishti et al.; U.S. Appl. No. 60/050,342 entitled "Procedure for moving teeth using a seires of retainers," filed Jun. 20, 1997.
CSI Computerized Scanning and Imaging Facility; What is a maximum/minimum intensity projection (MIP/MinIP); 1 page; retrived from the internet (http://csi.whoi.edu/content/what-maximumminimum-intensity-projection-mipminip); Jan. 4, 2010.
Cottingham; Gnathologic Clear Plastic Positioner; American Journal of Orthodontics; 55(1); pp. 23-31; Jan. 1969.
Crawford; CAD/CAM in the Dental Office: Does It Work?; Canadian Dental Journal; 57(2); pp. 121-123 Feb. 1991.
Crawford; Computers in Dentistry: Part 1: CAD/CAM: The Computer Moves Chairside, Part 2: F. Duret ' A Man With A Vision, Part 3: The Computer Gives New Vision—Literally, Part 4: Bytes 'N Bites the Computer Moves From the Front Desk to the Operatory; Canadian Dental Journal; 54(9); pp. 661-666 Sep. 1988.
Crooks; CAD/CAM Comes to USC; USC Dentistry; pp. 14-17; (year of pub. sufficiently earlier than effective US filing date and any foreign priority date) Spring 1990.
Cureton; Correcting Malaligned Mandibular Incisors with Removable Retainers; Journal of Clinical Orthodontics; 30(7); pp. 390-395; Jul. 1996.

(56) References Cited

OTHER PUBLICATIONS

Curry et al.; Integrated Three-Dimensional Craniofacial Mapping at the Craniofacial Research InstrumentationLaboratory/University of the Pacific; Seminars in Orthodontics; 7(4); pp. 258-265; Dec. 2001.
Cutting et al.; Three-Dimensional Computer-Assisted Design of Craniofacial Surgical Procedures: Optimization and Interaction with Cephalometric and CT-Based Models; Plastic and Reconstructive Surgery; 77(6); pp. 877-885; Jun. 1986.
DCS Dental AG; The CAD/CAM 'DCS Titan System' for Production of Crowns/Bridges; DSC Production; pp. 1-7; Jan. 1992.
Defranco et al.; Three-Dimensional Large Displacement Analysis of Orthodontic Appliances; Journal of Biomechanics; 9(12); pp. 793-801; Jan. 1976.
Dental Institute University of Zurich Switzerland; Program for International Symposium on Computer Restorations: State of the Art of the CEREC-Method; 2 pages; May 1991.
Dentrac Corporation; Dentrac document; pp. 4-13; (year of pub. sufficiently earlier than effective US filing date and any foreign priority date) 1992.
Dent-x; Dentsim . . . Dent-x's virtual reality 3-D training simulator . . . A revolution in dental education; 6 pages; retrieved from the internet (http://www.dent-x.com/DentSim.htm); on Sep. 24, 1998.
Di Muzio et al.; Minimum intensity projection (MinIP); 6 pages; retrieved from the internet (https://radiopaedia.org/articles/minimum-intensity-projection-minip) on Sep. 6, 2018.
Doruk et al.; The role of the headgear timer in extraoral co-operation; European Journal of Orthodontics; 26; pp. 289-291; Jun. 1, 2004.
Doyle; Digital Dentistry; Computer Graphics World; pp. 50-52 andp. 54; Oct. 2000.
Dummer et al.; Computed Radiography Imaging Based on High-Density 670 nm VCSEL Arrays; International Society for Optics and Photonics; vol. 7557; p. 75570H; 7 pages; (Author Manuscript); Feb. 24, 2010.
Duret et al.; CAD/CAM Imaging in Dentistry; Current Opinion in Dentistry; 1(2); pp. 150-154; Apr. 1991.
Duret et al.; CAD-CAM in Dentistry; Journal of the American Dental Association; 117(6); pp. 715-720; Nov. 1988.
Duret; The Dental CAD/CAM, General Description of the Project; Hennson International Product Brochure, 18 pages; Jan. 1986.
Duret; Vers Une Prosthese Informatisee; Tonus; 75(15); pp. 55-57; (English translation attached); 23 pages; Nov. 15, 1985.
Economides; The Microcomputer in the Orthodontic Office; Journal of Clinical Orthodontics; 13(11); pp. 767-772; Nov. 1979.
Ellias et al.; Proteomic analysis of saliva identifies potential biomarkers for orthodontic tooth movement; The Scientific World Journal; vol. 2012; Article ID 647240; dio:10.1100/2012/647240; 7 pages; (year of pub. sufficiently earlier than effective US filing date and any foreign priority date) 2012.
Elsasser; Some Observations on the History and Uses of the Kesling Positioner; American Journal of Orthodontics; 36(5); pp. 368-374; May 1, 1950.
English translation of Japanese Laid-Open Publication No. 63-11148 to inventor T. Ozukuri (Laid-Open on Jan. 18, 1998) pp. 1-7.
Faber et al.; Computerized Interactive Orthodontic Treatment Planning; American Journal of Orthodontics; 73(1); pp. 36-46; Jan. 1978.
Felton et al.; A Computerized Analysis of the Shape and Stability of Mandibular Arch Form; American Journal of Orthodontics and Dentofacial Orthopedics; 92(6); pp. 478-483; Dec. 1987.
Florez-Moreno; Time-related changes in salivary levels of the osteotropic factors sRANKL and OPG through orthodontic tooth movement; American Journal of Orthodontics and Dentofacial Orthopedics; 143(1); pp. 92-100; Jan. 2013.
Friede et al.; Accuracy of Cephalometric Prediction in Orthognathic Surgery; Journal of Oral and Maxillofacial Surgery; 45(9); pp. 754-760; Sep. 1987.
Friedrich et al; Measuring system for in vivo recording of force systems in orthodontic treatment—concept and analysis of accuracy; J. Biomech.; 32(1); pp. 81-85; (Abstract Only) Jan. 1999.
Futterling et al.; Automated Finite Element Modeling of a Human Mandible with Dental Implants; JS WSCG '98—Conference Program; 8 pages; retrieved from the Internet (https://dspace5.zcu.cz/bitstream/11025/15851/1/Strasser_98.pdf); on Aug. 21, 2018.
Gao et al.; 3-D element Generation for Multi-Connected Complex Dental and Mandibular Structure; IEEE Proceedings International Workshop in Medical Imaging and Augmented Reality; pp. 267-271; Jun. 12, 2001.
Gim-Alldent Deutschland, "Das DUX System: Die Technik," 3 pages; (English Translation Included); (year of pub. sufficiently earlier than effective US filing date and any foreign priority date); 2002.
Gottleib et al.; JCO Interviews Dr. James A. McNamura, Jr., on the Frankel Appliance: Part 2: Clinical 1-1 Management; Journal of Clinical Orthodontics; 16(6); pp. 390-407; retrieved from the internet (http://www.jco-online.com/archive/print_article.asp?Year=1982&Month=06&ArticleNum+); 21 pages; Jun. 1982.
Grayson; New Methods for Three Dimensional Analysis of Craniofacial Deformity, Symposium: Computerized Facial Imaging in Oral and Maxillofacial Surgery; American Association of Oral and Maxillofacial Surgeons; 48(8) suppl 1; pp. 5-6; Sep. 13, 1990.
Grest, Daniel; Marker-Free Human Motion Capture in Dynamic Cluttered Environments from a Single View-Point, PhD Thesis; 171 pages; Dec. 2007.
Guess et al.; Computer Treatment Estimates In Orthodontics and Orthognathic Surgery; Journal of Clinical Orthodontics; 23(4); pp. 262-268; 11 pages; (Author Manuscript); Apr. 1989.
Heaven et al.; Computer-Based Image Analysis of Artificial Root Surface Caries; Abstracts of Papers #2094; Journal of Dental Research; 70:528; (Abstract Only); Apr. 17-21, 1991.
Highbeam Research; Simulating stress put on jaw. (ANSYS Inc.'s finite element analysis software); 2 pages; retrieved from the Internet (http://static.highbeam.eom/t/toolingampproduction/november011996/simulatingstressputonfa..); on Nov. 5, 2004.
Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Included); Feb. 1987.
Hoffmann et al.; Role of Cephalometry for Planning of Jaw Orthopedics and Jaw Surgery Procedures; Informatbnen, pp. 375-396; (English Abstract Included); Mar. 1991.
Hojjatie et al.; Three-Dimensional Finite Element Analysis of Glass-Ceramic Dental Crowns; Journal of Biomechanics; 23(11); pp. 1157-1166; Jan. 1990.
Huckins; CAD-CAM Generated Mandibular Model Prototype from MRI Data; AAOMS, p. 96; (Abstract Only); (year of pub. sufficiently earlier than effective US filing date and any foreign priority date) 1999.
Invisalign; You were made to move. There's never been a better time to straighten your teeth with the most advanced clear aligner in the world; Product webpage; 2 pages; retrieved from the internet (www.invisalign.com/) on Dec. 28, 2017.
JCO Interviews; Craig Andreiko , DDS, MS on the Elan and Orthos Systems; Interview by Dr. Larry W. White; Journal of Clinical Orthodontics; 28(8); pp. 459-468; 14 pages; (Author Manuscript); Aug. 1994.
JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.
Jerrold; The Problem, Electronic Data Transmission and the Law; American Journal of Orthodontics and Dentofacial Orthopedics; 113(4); pp. 478-479; 5 pages; (Author Manuscript); Apr. 1998.
Jones et al.; An Assessment of the Fit of a Parabolic Curve to Pre- and Post-Treatment Dental Arches; British Journal of Orthodontics; 16(2); pp. 85-93; May 1989.
Kamada et.al.; Case Reports on Tooth Positioners Using LTV Vinyl Silicone Rubber; J. Nihon University School of Dentistry; 26(1); pp. 11-29; (year of pub. sufficiently earlier than effective US filing date and any foreign priority date) 1984.
Kamada et.al.; Construction of Tooth Positioners with LTV Vinyl Silicone Rubber and Some Case KJ Reports; J. Nihon University

(56) References Cited

OTHER PUBLICATIONS

School of Dentistry; 24(1); pp. 1-27; (year of pub. sufficiently earlier than effective US filing date and any foreign priority date) 1982.
Kanazawa et al.; Three-Dimensional Measurements of the Occlusal Surfaces of Upper Molars in a Dutch Population; Journal of Dental Research; 63(11); pp. 1298-1301; Nov. 1984.
Kesling et al.; The Philosophy of the Tooth Positioning Appliance; American Journal of Orthodontics and Oral surgery; 31(6); pp. 297-304; Jun. 1945.
Kesling; Coordinating the Predetermined Pattern and Tooth Positioner with Conventional Treatment; American Journal of Orthodontics and Oral Surgery; 32(5); pp. 285-293; May 1946.
Kleeman et al.; The Speed Positioner; J. Clin. Orthod.; 30(12); pp. 673-680; Dec. 1996.
Kochanek; Interpolating Splines with Local Tension, Continuity and Bias Control; Computer Graphics; 18(3); pp. 33-41; Jan. 1, 1984.
Kumar et al.; Rapid maxillary expansion: A unique treatment modality in dentistry; J. Clin. Diagn. Res.; 5(4); pp. 906-911; Aug. 2011.
Kunii et al.; Articulation Simulation for an Intelligent Dental Care System; Displays; 15(3); pp. 181-188; Jul. 1994.
Kuroda et al.; Three-Dimensional Dental Cast Analyzing System Using Laser Scanning; American Journal of Orthodontics and Dentofacial Orthopedics; 110(4); pp. 365-369; Oct. 1996.
Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.
Leinfelder et al.; A New Method for Generating Ceramic Restorations: a CAD-CAM System; Journal of the American Dental Association; 118(6); pp. 703-707; Jun. 1989.
Manetti et al.; Computer-Aided Cefalometry and New Mechanics in Orthodontics; Fortschr Kieferorthop; 44; pp. 370-376; 8 pages; (English Article Summary Included); (year of pub. sufficiently earlier than effective US filing date and any foreign priority date) 1983.
McCann; Inside the ADA; J. Amer. Dent. Assoc, 118:286-294; Mar. 1989.
McNamara et al.; Invisible Retainers; J. Clin Orthod.; pp. 570-578; 11 pages; (Author Manuscript); Aug. 1985.
McNamara et al.; Orthodontic and Orthopedic Treatment in the Mixed Dentition; Needham Press; pp. 347-353; Jan. 1993.
Moermann et al, Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.
Moles; Correcting Mild Malalignments—As Easy as One, Two, Three; AOA/Pro Corner; 11(2); 2 pages; (year of pub. sufficiently earlier than effective US filing date and any foreign priority date) 2002.
Mormann et al.; Marginale Adaptation von adhasuven Porzellaninlays in vitro; Separatdruck aus:Schweiz. Mschr. Zahnmed.; 95; pp. 1118-1129; 8 pages; (Machine Translated English Abstract); (year of pub. sufficiently earlier than effective US filing date and any foreign priority date); 1985.
Nahoum; The Vacuum Formed Dental Contour Appliance; N. Y. State Dent. J.; 30(9); pp. 385-390; Nov. 1964.
NASH; CEREC CAD/CAM Inlays: Aesthetics and Durability in a Single Appointment; Dentistry Today; 9(8); pp. 20, 22-23 and 54; Oct. 1990.
Nedelcu et al.; "Scanning Accuracy and Precision in 4 Intraoral Scanners: An In Vitro Comparison Based on 3-Dimensional Analysis"; J. Prosthet. Dent.; 112(6); pp. 1461-1471; Dec. 2014.
Nishiyama et al.; A New Construction of Tooth Repositioner by LTV Vinyl Silicone Rubber; The Journal of Nihon University School of Dentistry; 19(2); pp. 93-102 (year of pub. sufficiently earlier than effective US filing date and any foreign priority date) 1977.
Ogawa et al.; Mapping, profiling and clustering of pressure pain threshold (PPT) in edentulous oral muscosa; Journal of Dentistry; 32(3); pp. 219-228; Mar. 2004.
Ogimoto et al.; Pressure-pain threshold determination in the oral mucosa; Journal of Oral Rehabilitation; 29(7); pp. 620-626; Jul. 2002.
Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.
Pinkham; Foolish Concept Propels Technology; Dentist, 3 pages , Jan./Feb. 1989.
Pinkham; Inventor's CAD/CAM May Transform Dentistry; Dentist; pp. 1 and 35, Sep. 1990.
Ponitz; Invisible retainers; Am. J. Orthod.; 59(3); pp. 266-272; Mar. 1971.
Procera Research Projects; Procera Research Projects 1993 ' Abstract Collection; 23 pages; (year of pub. sufficiently earlier than effective US filing date and any foreign priority date) 1993.
Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.
Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.
Raintree Essix & Ars Materials, Inc., Raintree Essix, Technical Magazine Table of contents and Essix Appliances, 7 pages; retrieved from the internet (http://www.essix.com/magazine/defaulthtml) on Aug. 13, 1997.
Redmond et al.; Clinical Implications of Digital Orthodontics; American Journal of Orthodontics and Dentofacial Orthopedics; 117(2); pp. 240-242; Feb. 2000.
Rekow et al.; CAD/CAM for Dental Restorations—Some of the Curious Challenges; IEEE Transactions on Biomedical Engineering; 38(4); pp. 314-318; Apr. 1991.
Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.
Rekow; A Review of the Developments in Dental CAD/CAM Systems; Current Opinion in Dentistry; 2; pp. 25-33; Jun. 1992.
Rekow; CAD/CAM in Dentistry: A Historical Perspective and View of the Future; Journal Canadian Dental Association; 58(4); pp. 283, 287-288; Apr. 1992.
Rekow; Computer-Aided Design and Manufacturing in Dentistry: A Review of the State of the Art; Journal of Prosthetic Dentistry; 58(4); pp. 512-516; Dec. 1987.
Rekow; Dental CAD-CAM Systems: What is the State of the Art?; The Journal of the American Dental Association; 122(12); pp. 43-48; Dec. 1991.
Rekow; Feasibility of an Automated System for Production of Dental Restorations, Ph.D. Thesis; Univ. of Minnesota, 250 pages, Nov. 1988.
Richmond et al.; The Development of the PAR Index (Peer Assessment Rating): Reliability and Validity.; The European Journal of Orthodontics; 14(2); pp. 125-139; Apr. 1992.
Richmond et al.; The Development of a 3D Cast Analysis System; British Journal of Orthodontics; 13(1); pp. 53-54; Jan. 1986.
Richmond; Recording the Dental Cast in Three Dimensions; American Journal of Orthodontics and Dentofacial Orthopedics; 92(3); pp. 199-206; Sep. 1987.
Rudge; Dental Arch Analysis: Arch Form, A Review of the Literature; The European Journal of Orthodontics; 3(4); pp. 279-284; Jan. 1981.
Sahm et al.; "Micro-Electronic Monitoring of Functional Appliance Wear"; Eur J Orthod.; 12(3); pp. 297-301; Aug. 1990.
Sahm; Presentation of a wear timer for the clarification of scientific questions in orthodontic orthopedics; Fortschritte der Kieferorthopadie; 51 (4); pp. 243-247; (Translation Included) Jul. 1990.

(56) References Cited

OTHER PUBLICATIONS

Sakuda et al.; Integrated Information-Processing System In Clinical Orthodontics: An Approach with Use of a Computer Network System; American Journal of Orthodontics and Dentofacial Orthopedics; 101(3); pp. 210-220; 20 pages; (Author Manuscript) Mar. 1992.

Schafer et al.; "Quantifying patient adherence during active orthodontic treatment with removable appliances using microelectronic wear-time documentation"; Eur J Orthod.; 37(1)pp. 1-8; doi:10.1093/ejo/cju012; Jul. 3, 2014.

Schellhas et al.; Three-Dimensional Computed Tomography in Maxillofacial Surgical Planning; Archives of Otolaryngology—Head and Neck Surgery; 114(4); pp. 438-442; Apr. 1988.

Schroeder et al.; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.

Shilliday; Minimizing finishing problems with the mini-positioner; American Journal of Orthodontics; 59(6); pp. 596-599; Jun. 1971.

Shimada et al.; Application of optical coherence tomography (OCT) for diagnosis of caries, cracks, and defects of restorations; Current Oral Health Reports; 2(2); pp. 73-80; Jun. 2015.

Siemens; CEREC—Computer-Reconstruction, High Tech in der Zahnmedizin; 15 pagesI; (Includes Machine Translation); (year of pub. sufficiently earlier than effective US filing date and any foreign priority date); 2004.

Sinclair; The Readers' Corner; Journal of Clinical Orthodontics; 26(6); pp. 369-372; 5 pages; retrived from the internet (http://www.jco-online.com/archive/print_article.asp?Year=1992&Month=06&ArticleNum=); Jun. 1992.

Sirona Dental Systems GmbH, CEREC 3D, Manuel utiiisateur, Version 2.0X (in French); 114 pages; (English translation of table of contents included); (year of pub. sufficiently earlier than effective US filing date and any foreign priority date); 2003.

Stoll et al.; Computer-aided Technologies in Dentistry; Dtsch Zahna'rztl Z 45, pp. 314-322; (English Abstract Included); (year of pub. sufficiently earlier than effective US filing date and any foreign priority date) 1990.

Sturman; Interactive Keyframe Animation of 3-D Articulated Models; Proceedings Graphics Interface '84; vol. 86; pp. 35-40; May-Jun. 1984.

The American Heritage, Stedman's Medical Dictionary; Gingiva; 3 pages; retrieved from the interent (http://reference.com/search/search?q=gingiva) on Nov. 5, 2004.

The Dental Company Sirona: Cerc omnicam and cerec bluecam brochure: The first choice in every case; 8 pages; (year of pub. sufficiently earlier than effective US filing date and any foreign priority date) 2014.

Thera Mon; "Microsensor"; 2 pages; retrieved from the internet (www.english.thera-mon.com/the-product/transponder/index.html); on Sep. 19, 2016.

Thorlabs; Pellin broca prisms; 1 page; retrieved from the internet (www.thorlabs.com); Nov. 30, 2012.

Tiziani et al.; Confocal principle for macro and microscopic surface and defect analysis; Optical Engineering; 39(1); pp. 32-39; Jan. 1, 2000.

Truax; Truax Clasp-Less(TM) Appliance System; The Functional Orthodontist; 9(5); pp. 22-24, 26-28; Sep.-Oct. 1992.

Tru-Tatn Orthodontic & Dental Supplies, Product Brochure, Rochester, Minnesota 55902, 16 pages; (year of pub. sufficiently earlier than effective US filing date and any foreign priority date) 1996.

U.S. Department of Commerce, National Technical Information Service, Holodontography: An Introduction to Dental Laser Holography; School of Aerospace Medicine Brooks AFB Tex; Mar. 1973, 40 pages; Mar. 1973.

U.S. Department of Commerce, National Technical Information Service; Automated Crown Replication Using Solid Photography SM; Solid Photography Inc., Melville NY,; 20 pages; Oct. 1977.

Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.

Van Der Linden et al.; Three-Dimensional Analysis of Dental Casts by Means of the Optocom; Journal of Dental Research; 51(4); p. 1100; Jul.-Aug. 1972.

Van Der Linden; A New Method to Determine Tooth Positions and Dental Arch Dimensions; Journal of Dental Research; 51(4); p. 1104; Jul.-Aug. 1972.

Van Der Zel; Ceramic-Fused-to-Metal Restorations with a New CAD/CAM System; Quintessence International; 24(A); pp. 769-778; (year of pub. sufficiently earlier than effective US filing date and any foreign priority date); 1993.

Van Hilsen et al.; Comparing potential early caries assessment methods for teledentistry; BMC Oral Health; 13(16); doi: 10.1186/1472-6831-13-16; 9 pages; Mar. 2013.

Varady et al.; Reverse Engineering of Geometric Models' An Introduction; Computer-Aided Design; 29(4); pp. 255-268; 20 pages; (Author Manuscript); Apr. 1997.

Verstreken et al.; An Image-Guided Planning System for Endosseous Oral Implants; IEEE Transactions on Medical Imaging; 17(5); pp. 842-852; Oct. 1998.

Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.

Warunek et.al.; Clinical Use of Silicone Elastomer Applicances; JCO; 23(10); pp. 694-700; Oct. 1989.

Watson et al.; Pressures recorded at te denture base-mucosal surface interface in complete denture wearers; Journal of Oral Rehabilitation 14(6); pp. 575-589; Nov. 1987.

Wells; Application of the Positioner Appliance in Orthodontic Treatment; American Journal of Orthodontics; 58(4); pp. 351-366; Oct. 1970.

Wikipedia; Palatal expansion; 3 pages; retrieved from the internet (https://en.wikipedia.org/wiki/Palatal_expansion) on Mar. 5, 2018.

Williams; Dentistry and CAD/CAM: Another French Revolution; J. Dent. Practice Admin.; 4(1); pp. 2-5 Jan./Mar. 1987.

Williams; The Switzerland and Minnesota Developments in CAD/CAM; Journal of Dental Practice Administration; 4(2); pp. 50-55; Apr./Jun. 1987.

Wireless Sensor Networks Magazine; Embedded Teeth for Oral Activity Recognition; 2 pages; retrieved on Sep. 19, 2016 from the internet (www.wsnmagazine.com/embedded-teeth/); Jul. 29, 2013.

Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.

Witt et al.; The wear-timing measuring device in orthodontics-cui bono? Reflections on the state-of-the-art in wear-timing measurement and compliance research in orthodontics; Fortschr Kieferorthop.; 52(3); pp. 117-125; (Translation Included) Jun. 1991.

Wolf; Three-dimensional structure determination of semi-transparent objects from holographic data; Optics Communications; 1(4); pp. 153-156; Sep. 1969.

WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.

Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.

Yamada et al.; Simulation of fan-beam type optical computed-tomography imaging of strongly scattering and weakly absorbing media; Applied Optics; 32(25); pp. 4808-4814; Sep. 1, 1993.

Yamamoto et al.; Optical Measurement of Dental Cast Profile and Application to Analysis of Three-Dimensional Tooth Movement in Orthodontics; Front. Med. Biol. Eng., 1(2); pp. 119-130; (year of pub. sufficiently earlier than effective US filing date and any foreign priority date); 1988.

(56) References Cited

OTHER PUBLICATIONS

Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.
Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998.
Yoshii; Research on a New Orthodontic Appliance: The Dynamic Positioner (D.P.); 111. The General Concept of the D.P. Method and Its Therapeutic Effect, Part 1, Dental and Functional Reversed Occlusion Case Reports; Nippon Dental Review; 457; pp. 146-164; 43 pages; (Author Manuscript); Nov. 1980.
Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.
Yoshii; Research on a New Orthodontic Appliance: The Dynamic Positioner (D.P.); II. The D.P. Manufacturing Procedure and Clinical Applications; Nippon Dental Review; 454; pp. 107-130; 48 pages; (Author Manuscript); Aug. 1980.
Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.
Grove et al.; U.S. Appl. No. 15/726,243 entitled "Interproximal reduction templates," filed Oct. 5, 2017.
Riley et al.; U.S. Appl. No. 16/003,841 entitled Palatal expander with skeletal anchorage devices, filed Jun. 8, 2018.
Shanjani et al.; U.S. Appl. No. 16/019,037 entitled "Biosensor performance indicator for intraoral appliances," filed Jun. 26, 2018.
Sato et al.; U.S. Appl. No. 16/041,606 entitled "Palatal contour anchorage," filed Jul. 20, 2018.
Xue et al.; U.S. Appl. No. 16/010,087 entitled "Automatic detection of tooth type and eruption status," filed Jun. 15, 2018.
Sato et al.; U.S. Appl. No. 16/048,054 entitled "Optical coherence tomography for orthodontic aligners," filed Jul. 27, 2018.
Miller et al.; U.S. Appl. No. 16/038,088 entitled "Method and apparatuses for interactive ordering of dental aligners," filed Jul. 17, 2018.
Moalem et al.; U.S. Appl. No. 16/046,897 entitled Tooth shading, transparency and glazing, filed Jul. 26, 2018.
Nyukhtikov et al.; U.S. Appl. No. 15/998,883 entitled "Buccal corridor assessment and computation," filed Aug. 15, 2018.
Kopelman et al.; U.S. Appl. No. 16/152,281 entitled "Intraoral appliances for sampling soft-tissue," filed Oct. 4, 2018.
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
Berland; The use of smile libraries for cosmetic dentistry; Dental Tribunne: Asia pacfic Edition; pp. 16-18; Mar. 29, 2006.
Bookstein; Principal warps: Thin-plate splines and decomposition of deformations; IEEE Transactions on pattern analysis and machine intelligence; 11(6); pp. 567-585; Jun. 1989.
Cadent Inc.; OrthoCAD ABO user guide; 38 pages; Dec. 21, 2005.
Cadent Inc.; Reviewing and modifying an orthoCAD case; 4 pages; Feb. 14, 2005.
Daniels et al.; The development of the index of complexity outcome and need (ICON); British Journal of Orthodontics; 27(2); pp. 149-162; Jun. 2000.
Dentrix; Dentrix G3, new features; 2 pages; retrieved from the internet (http://www.dentrix.com/g3/new_features/index.asp); on Jun. 6, 2008.
Di Giacomo et al.; Clinical application of sterolithographic surgical guides for implant placement: Preliminary results; Journal Periodontolgy; 76(4); pp. 503-507; Apr. 2005.
Gansky; Dental data mining: potential pitfalls and practical issues; Advances in Dental Research; 17(1); pp. 109-114; Dec. 2003.
Geomagic; Dental reconstruction; 1 page; retrieved from the internet (http://geomagic.com/en/solutions/industry/detal_desc.php) on Jun. 6, 2008.
Gottschalk et al.; OBBTree: A hierarchical structure for rapid interference detection; 12 pages; (http://www.cs.unc.edu/?geom/OBB/OBBT.html); relieved from te internet (https://www.cse.iitk.ac.in/users/amit/courses/RMP/presentations/dslamba/presentation/sig96.pdf) on Apr. 25, 2019.
gpsdentaire.com; Get a realistic smile simulation in 4 steps with GPS; a smile management software; 10 pages; retrieved from the internet (http://www.gpsdentaire.com/en/preview/) on Jun. 6, 2008.
Karaman et al.; A practical method of fabricating a lingual retainer; Am. Journal of Orthodontic and Dentofacial Orthopedics; 124(3); pp. 327-330; Sep. 2003.
Mantzikos et al.; Case report: Forced eruption and implant site development; The Angle Orthodontist; 68(2); pp. 179-186; Apr. 1998.
Methot; Get the picture with a gps for smile design in 3 steps; Spectrum; 5(4); pp. 100-105; (year of pub. sufficiently earlier than effective US filing date and any foreign priority date) 2006.
OrthoCAD downloads; retrieved Jun. 27, 2012 from the internet (www.orthocad.com/download/downloads.asp); 2 pages; Feb. 14, 2005.
Page et al.; Validity and accuracy of a risk calculator in predicting periodontal disease; Journal of the American Dental Association; 133(5); pp. 569-576; May 2002.
Patterson Dental; Cosmetic imaging; 2 pages retrieved from the internet (http://patterson.eaglesoft.net/cnt_di_cosimg.html) on Jun. 6, 2008.
Rose et al.; The role of orthodontics in implant dentistry; British Dental Journal; 201(12); pp. 753-764; Dec. 23, 2006.
Rubin et al.; Stress analysis of the human tooth using a three-dimensional finite element model; Journal of Dental Research; 62(2); pp. 82-86; Feb. 1983.
Sarment et al.; Accuracy of implant placement with a sterolithographic surgical guide; journal of Oral and Maxillofacial Implants; 118(4); pp. 571-577; Jul. 2003.
Smalley; Implants for tooth movement: Determining implant location and orientation: Journal of Esthetic and Restorative Dentistry; 7(2); pp. 62-72; Mar. 1995.
Smart Technology; Smile library II; 1 page; retrieved from the internet (http://smart-technology.net/) on Jun. 6, 2008.
Smile-Vision_The smile-vision cosmetic imaging system; 2 pages; retrieved from the internet (http://www.smile-vision.net/cos_imaging.php) on Jun. 6, 2008.
Szeliski; Introduction to computer vision: Structure from motion; 64 pages; retrieved from the internet (http://robots.stanford.edu/cs223b05/notes/CS%20223-B%20L10%structurefrommotion1b.ppt, on Feb. 3, 2005.
Vevin et al.; Pose estimation of teeth through crown-shape matching; In Medical Imaging: Image Processing of International Society of Optics and Photonics; vol. 4684; pp. 955-965; May 9, 2002.
Virtual Orthodontics; Our innovative software; 2 pages; (http://www.virtualorthodontics.com/innovativesoftware.html); retrieved from the internet (https://web.archive.org/web/20070518085145/http://www.virtualorthodontics.com/innovativesoftware.html); (year of pub. sufficiently earlier than effective US filing date and any foreign priority date) 2005.
Wiedmann; According to the laws of harmony to find the right tooth shape with assistance of the computer; Digital Dental News; 2nd vol.; pp. 0005-0008; (English Version Included); Apr. 2008.
Wong et al.; Computer-aided design/computer-aided manufacturing surgical guidance for placement of dental implants: Case report; Implant Dentistry; 16(2); pp. 123-130; Sep. 2007.
Wong et al.; The uses of orthodontic study models in diagnosis and treatment planning; Hong Knog Dental Journal; 3(2); pp. 107-115; Dec. 2006.
Yaltara Software; Visual planner; 1 page; retrieved from the internet (http://yaltara.com/vp/) on Jun. 6, 2008.
Zhang et al.; Visual speech features extraction for improved speech recognition; 2002 IEEE International conference on Acoustics, Speech and Signal Processing; vol. 2; 4 pages; May 13-17, 2002.

(56) References Cited

OTHER PUBLICATIONS

Arnone et al.; U.S. Appl. No. 16/235,449 entitled "Method and system for providing indexing and cataloguing of orthodontic related treatment profiles and options," filed Dec. 28, 2018.
Mason et al.; U.S. Appl. No. 16/374,648 entitled "Dental condition evaluation and treatment," filed Apr. 3, 2019.
Brandt et al.; U.S. Appl. No. 16/235,490 entitled "Dental wire attachment," filed Dec. 28, 2018.
Kou; U.S. Appl. No. 16/270,891 entitled "Personal data file," filed Feb. 8, 2019.
"Clinical Stomatology Thought and Practice; Chapter Four Non-carious Disease of Tooth; Section One Chronic Injury of Tooth; pp. 1-14; the year of publication is sufficiently earlier than the effective U.S. filing date and any foreign priority date so that the particular month of publication is not in issue".

* cited by examiner

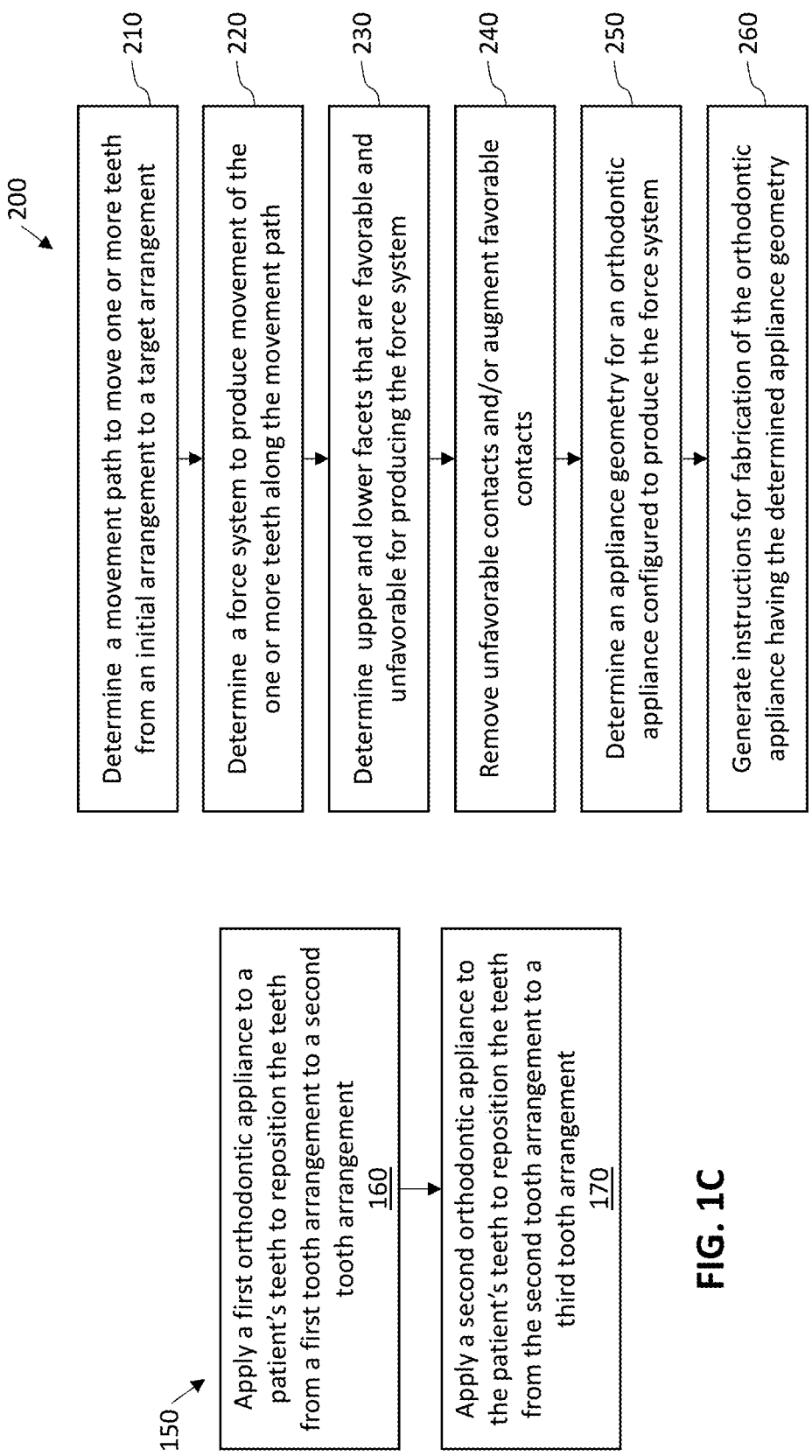

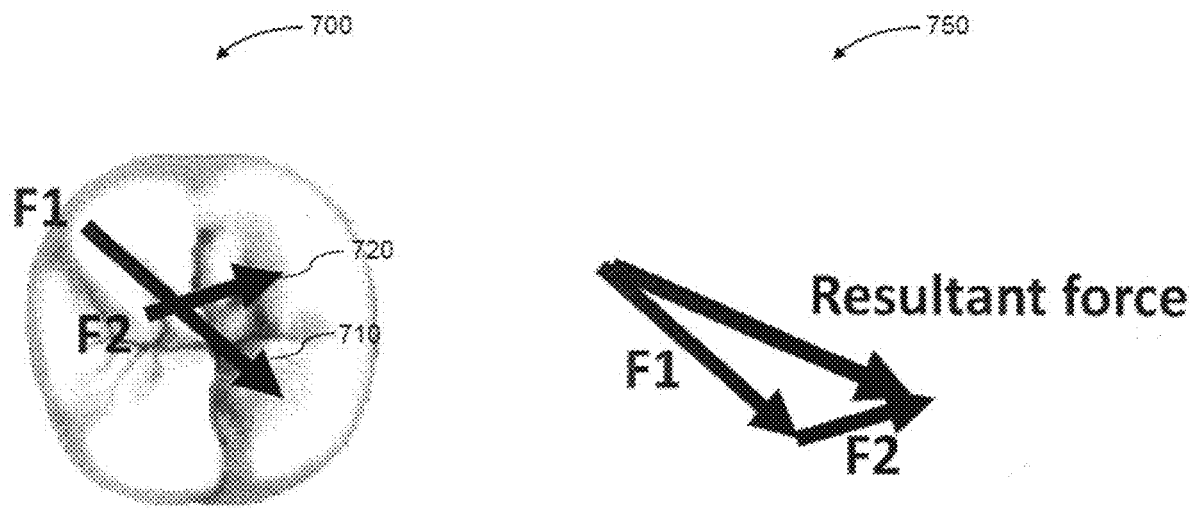
FIG. 7A  FIG. 7B
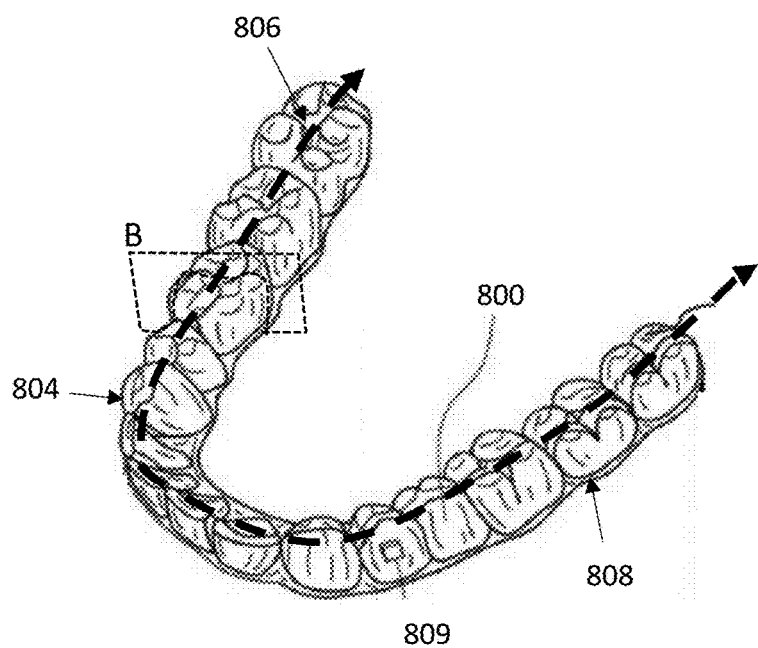
FIG. 8A

DENTAL APPLIANCE HAVING SELECTIVE OCCLUSAL LOADING AND CONTROLLED INTERCUSPATION

CROSS REFERENCE TO RELATED APPLICATIONS

This patent application claims priority to U.S. Provisional Patent Application No. 62/579,519, filed Oct. 31, 2017, titled "SELECTIVE OCCLUSAL LOADING FOR ORTHODONTIC TREATMENT," which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

Prior methods and apparatus for moving teeth can be less than ideal in at least some respects. Although transparent shell appliances can be effective in moving teeth, the amount of tooth-moving force that can be applied can be limited. For example, the amount of tooth-moving force applied by a transparent shell appliance may depend on the elasticity of the appliance shell and the amount of displacement of a tooth-moving cavity relative to a patient's tooth. Manufacturing transparent shell appliances to apply large tooth-moving forces can be impractical, as the required positions of teeth-receiving cavities may involve a displacement relative to the positions of the patient's teeth such that the appliance may become somewhat difficult or uncomfortable to wear in some instances. While using different materials for a shell appliance can reduce this effect to some degree, the ability to apply force to teeth can be somewhat limited. It may be helpful to exploit additional forces within the patient's mouth, in order to enhance the tooth-moving forces applied by transparent shell appliances.

A source of additional force in a patient's mouth that may have been less than ideally utilized with prior methods and apparatus is the bite force. The bite force of a healthy individual can be strong when compared with that applied by an orthodontic appliance such as a transparent shell appliance in at least some instances. Prior approaches to addressing bite force have suggested that bite forces cannot be effectively exploited for orthodontic adjustments of teeth in at least some instances. For example, prior work has suggested that tooth loading between occlusal surfaces can produce undesirable loading on the opposing tooth. Prior approaches have less than ideally addressed the complex relationships between the loads on the teeth and crown-crown occlusal contacts. Some authors have pointed to difficulties controlling tooth loading, such as Thomas Katona in "An engineering analysis of dental occlusion principles," for example. The prior methods and apparatus have not fully addressed occlusal forces, which can reduce the ability of an orthodontic appliance to control the movement of teeth, in some cases rendering such appliances less effective.

Patients with different skeletal structures exhibit different levels of bite force. In general, patients with brachycephalic skeletal structures (jaws with large width and flat mandibular plane angles) typically have very high bite forces. Traditional orthodontic treatment can be more difficult to achieve with these patients than those presenting with a dolichofacial skeletal structure (narrow, long face with high mandibular plane angle). This can be related to the orientation of the jaw muscles applying the force to the movement direction of the jaw and the hinge axis, which can impede tooth movement required for orthodontic treatment in at least some instances.

The forces of occlusion are the result of contact between the occlusal surfaces of teeth in the opposing arch and the force applied by the facial musculature when the jaws are closed (occluded). Prior shell appliances have not adequately controlled such forces essentially in at least some instances. Orthodontic treatment with fixed appliances (brackets bonded to the teeth and wires engaged in the bracket to apply force) also may fail to control the occurrence of these contacts (e.g., contacts between facets of opposing teeth), and the magnitude and direction of the force can be an uncontrolled variable in at least some instances. In a typical shell appliance, the occlusal surface can be formed to mimic the shape of the occlusal surfaces of the teeth, adding a thin layer of material while offsetting these occlusal surfaces, which can also result in a less than ideally controlled magnitude and direction of bite forces.

In addition, many shell aligners do not adjust or account for intercuspation with the occlusive surface of the opposite jaws. Thus, the patient may experience uncomfortable intercuspation, particularly at early stages in the alignment.

In light of the above, improved methods and apparatus are needed that overcome at least some of the aforementioned limitations of the prior art. Ideally, these improved methods and apparatus would exploit occlusal forces in a controlled manner to provide and enhance tooth-moving forces applied to the teeth.

SUMMARY OF THE DISCLOSURE

Methods and apparatus are provided for improved orthodontic treatment that can use bite forces to produce tooth movement, such as with transparent polymeric shell appliances. In some embodiments, a structure on a shell appliance modifies an occlusal surface of a patient's teeth with the appliance placed thereon. Individual facets of a patient's teeth can be identified and selected for modification based on the occlusion forces provided when a patient bites. An appliance can be constructed with a feature at a location on the appliance sized and shaped to provide beneficial forces to the tooth when the patient bites. Facets with favorable occlusion forces can have the corresponding shell surface locally augmented, and the greater amount of protrusion can increase the applied bite force for those facets. Facets with unfavorable occlusion forces can have the corresponding shell surface configured to reduce these unfavorable forces, and can be configured to shift forces away from the facet over a wider area. While this can be achieved in many ways, in some embodiments the appliance comprises a bubble structure that decreases local forces for that facet. For example, the bubble structure can comprise a portion of a shell shaped to provide a gap between the inner surface of the shell and parts of the patient's tooth, thereby decreasing the occlusal forces applied to those parts of the patient's tooth. These surface modifications can be used to redirect bite forces to provide force along a desired movement direction, so as to urge teeth more effectively along a trajectory from an initial position to a final position of a planned treatment with a plurality of appliances. The forces can optionally be combined with other orthodontic forces to increase total available tooth-moving force for an appliance, such as an appliance among a plurality of appliances of a planned treatment. The size, shape and location of the features can be adjusted among the plurality of appliances as the treatment progresses in order to appropriately adjust amounts of occlusal forces applied to the teeth.

Thus, any of the apparatuses (e.g., devices or systems, including dental/orthodontic devices or systems, such as dental/orthodontic aligners) described herein may be configured to selectively intercuspate with the patient's teeth on a jaw (e.g., dental arch) that is opposite to the jaw on which the aligner is worn or a second aligner worn on the patient's teeth of the opposite jaw.

In some variations, the selective intercuspation may be configured to maximally intercuspate. In some variations, the selective intercuspation may apply a force (referred to herein as a bite force) when the patient wearing the apparatus bites and intercuspates; the bite force is typically configured to complement, modify, amplify, adjust, etc. the force applied to reposition one or more of the patient's teeth. In this manner, the selective intercuspation, by adjusting the patient's intercuspation, may make use of the force of biting to enhance the alignment of the patient's teeth; without the apparatuses and methods described herein the bite force may instead oppose the alignment of the patient's teeth and/or may lead to undesirable forces that may move or retard movement of the patient's teeth in an undesirable manner.

For example, described herein are apparatuses such as dental aligner devices (which may be referred to as orthodontic devices, orthodontic aligners, or simply aligners) to be worn on a patient's teeth, the device comprising: a shell body having a lingual side, an occlusal side, and a buccal side, wherein the shell body comprises an inner tooth-receiving region configured to fit over the patient's teeth and to apply a force to move one or more of the patient's teeth to a predetermined configuration when the shell body is worn on the patient's teeth, the inner tooth-receiving region comprising: an occlusal inner surface contour in the inner tooth-receiving region, the occlusal inner surface having an arrangement of chambers configured to conform to a first arrangement of cusps corresponding to an occlusal surface of the patient's teeth, and an occlusal outer surface contour that is opposite the occlusal inner surface contour, the occlusal outer surface contour forming a second arrangement of cusps, wherein the second arrangement of cusps of the occlusal outer surface contour does not align with the first arrangement of cusps when the occlusal inner surface is worn over the first arrangement of cusps, so that intercuspation of the patient's teeth when wearing the dental aligner device produces a bite force to move the one or more of the patient's teeth to the predetermined configuration.

The shell aligners described herein may fit over the patient's teeth so that force may be applied to and against one or more of the patient's teeth to move the one or more teeth (translation, rotation, etc.) toward a predetermined configuration. In addition, the shell aligner may include spaces (e.g., gaps) between the inner surface of the shell aligner and the teeth to guide the tooth movement, providing a lower-resistance path for movement. Thus, the apparatuses (e.g., shell aligners) described herein may be configured to apply a force to move one or more of the patient's teeth to a predetermined configuration.

The bite force may be configured to apply force in the same or a complementary direction as the force applied by the aligner when worn over the teeth (e.g., without intercuspation/biting). For example, the bite force may be oriented to urge the one or more of the patient's teeth along a vector with a vector component in a plane orthogonal to a second tooth's coronoapical axis, wherein the second tooth is opposite from the one or more of the patient's teeth and on a dental arch that is opposite from the dental arch of the one or more of the patient's teeth in the patient's mouth.

The dental aligner of claim 1, wherein the occlusal outer surface is configured to selectively intercuspate with the opposite jaw (or a second aligner worn on the opposite dental arch/jaw). For example, in some variations the dental aligner may be configured to maximally intercuspate with an occlusal surface the patient's opposite jaw, such as the teeth on the opposite jaw or a second dental aligner worn on the opposite jaw. Alternatively or additionally, in some variations, the dental aligner may be configured to selectively intercuspate so that the occlusal outer surface is configured to intercuspate with over more than 90% of the occlusal surface of the patient's opposite jaw.

As mentioned, the occlusal surface on the patient's opposite jaw may be a dental appliance configured to be worn on teeth of the patient's opposite jaw, or it may be the teeth of the patient's opposite jaw (without an aligner worn on them).

In some variations, the second arrangement of cusps of the occlusal outer surface contour may correspond to a target final arrangement of an occlusal surface of a treatment plan. This may allow the patient the feel and/or look of the final intercuspation position of the teeth, as will be described in more detail below.

In some variations, one or more regions of the occlusal outer surface contour is laterally offset in an occlusal plane relative to the occlusal inner surface contour.

Any of the apparatuses described herein may include an occlusal surface feature protruding from the occlusal outer surface in a direction away from the inner tooth-receiving region, wherein the occlusal surface feature is positioned to be apply the bite force. Thus, in general, the occlusal outer surface of the individual teeth may not be identical to the occlusal outer surface of the patient's teeth, but may include additional protrusions and/or gaps to apply force (bite force).

Any of the dental aligners and/or methods described herein may be configured so that intercuspation of the patient's teeth when wearing the dental aligner device produces a bite force to move the one or more of the patient's teeth to the predetermined configuration to maintain the relationship between the upper and lower jaws (e.g., to increase contact between cusps of the patient's upper jaw and lower jaw).

Alternatively or additionally, any of the devices and methods described herein may be configured so that intercuspation of the patient's teeth when wearing the dental aligner device produces a bite force to move the one or more of the patient's teeth to the predetermined configuration to modify condylar loading of the temporomandibular joint (TMJ). For example, any of these methods may be configured to decrease condylar loading; alternatively in some variations the methods may be configured to increase condylar loading.

Also described herein are methods of moving (e.g., aligning and/or realigning) a patient's teeth using an orthodontic/dental apparatus including those having selective intercuspation. For example, described herein are methods of aligning a patient's teeth using one or more a dental aligners, wherein each dental aligner includes a shell body having a lingual side, an occlusal side, and a buccal side, wherein the shell body comprises an inner tooth-receiving region. These methods may include: applying a first force to move one or more of the patient's teeth to a predetermined configuration when the shell body is worn on the patient's teeth so that patient's teeth are received in an inner tooth-receiving region of the shell body having an occlusal inner surface contour configured to fit a first arrangement of cusps corresponding to an occlusal surface of the patient's teeth; and applying a bite force to move the one or more of the patient's teeth to the predetermined configuration when the patient bites on the shell body to intercuspate against an occlusal outer surface contour that is opposite the occlusal inner surface contour, wherein the occlusal outer surface contour forms a second arrangement of cusps that does not align with the first arrangement of cusps when the occlusal inner surface is worn over the first arrangement of cusps.

Applying the bite force may comprise applying the bite force which is oriented to urge the one or more of the patient's teeth along a vector with a vector component in a plane orthogonal to a second tooth's coronoapical axis, wherein the second tooth is opposite from the one or more of the patient's teeth and on a dental arch that is opposite from the dental arch of the one or more of the patient's teeth in the patient's mouth. In some variations applying the first force comprises attaching the shell body to the patient's teeth using one or more attachments bonded to the patient's teeth. Applying the bite force may comprise intercuspating against a second shell aligner worn on a dental arch opposite to a dental arch on which the shell body is worn.

In some variations applying the bite force comprises intercuspating against a second group of the patient's teeth on a dental arch opposite to a dental arch on which the shell body is worn. Applying the bite force may comprise intercuspating against a protrusion on the occlusal outer surface contour. In some variations applying the bite force comprises intercuspating with over more than 90% of the occlusal surface of the patient's opposite jaw.

Also described herein are methods and apparatuses having selective intercuspation that may or may not adjust the bite force. For example, described herein are dental aligner systems to be worn on a patient's teeth as part of a treatment plan to align the patient's teeth that include: a plurality of dental aligners configured to be worn in a sequence defined by the treatment plan; wherein each dental aligner comprises a shell body having an inner tooth-receiving region configured to fit over the patient's teeth and apply force to move one or more of the patients teeth when worn, wherein the inner tooth-receiving region comprises an occlusal inner surface contour, and wherein each dental aligner further comprises an occlusal outer surface contour that is opposite the occlusal inner surface contour; wherein all of the dental aligners in the plurality of dental aligners have different occlusal inner surface contours, but two or more of the dental aligners in the plurality of dental aligners have identical occlusal outer surface contours.

The two or more of the dental aligners in the plurality of dental aligners may have identical occlusal outer surface contours are configured so that the occlusal outer surfaces maximally intercuspate with an occlusal surface the patient's opposite jaw. The two or more of the dental aligners in the plurality of dental aligners that have identical occlusal outer surface contours may be configured so that the occlusal outer surfaces intercuspate with over more than 90% of the occlusal surface of the patient's opposite jaw. In some variations, the two or more of the dental aligners in the plurality of dental aligners may have identical occlusal outer surface contours correspond to a target final arrangement of an occlusal surface of a treatment plan. The two or more of the dental aligners in the plurality of dental aligners may comprise one or more regions of the occlusal outer surface contour that is laterally offset in an occlusal plane relative to the occlusal inner surface contour.

The two or more of the dental aligners in the plurality of dental aligners may further comprise an occlusal surface feature protruding from the occlusal outer surface in a direction away from the inner tooth-receiving region, wherein the occlusal surface feature is positioned to be apply a bite force to a first tooth received by the inner tooth-receiving region and to a second tooth, wherein the second tooth is opposite from the one or more of the patient's teeth and on a dental arch that is opposite from the dental arch of the one or more of the patient's teeth in the patient's mouth.

An appliance for applying tooth moving forces to teeth of a patient may include: a first shell having a plurality of teeth-receiving cavities shaped to receive the teeth of a patient; and a first occlusal surface feature disposed on an occlusal surface of a first tooth-receiving cavity of the plurality of teeth receiving cavities and protruding from the occlusal surface in a direction away from the first tooth-receiving cavity, wherein said first occlusal surface feature is positioned to apply a force to a first tooth received by the first tooth-receiving cavity and a second tooth opposite the first tooth-receiving cavity in the patient's mouth.

The first occlusal surface feature may be positioned to apply the force when the patient bites while wearing the appliance.

In general, a plurality of appliances configured to move the teeth of the patient from an initial arrangement to a target arrangement when worn in sequence may include any of appliances as described above. The first appliance may be configured to receive the teeth of the patient in the initial arrangement. A second appliance of the plurality of appliances may comprise a second shell configured to receive at least the first tooth when the teeth of the patient are in an intermediate arrangement subsequent to the initial arrangement, said second shell may comprise a second occlusal surface feature positioned to apply a second force to the first tooth and the second tooth, said second force differing from the first force in at least one of magnitude, direction, location on the first tooth, or location on the second tooth. The second occlusal surface feature may differ in shape from the first occlusal surface feature. The first occlusal surface feature may be located on the occlusal surface of the first tooth-receiving cavity at a position corresponding to a facet of the first tooth. For example, the first occlusal surface may comprise a solid protrusion positioned to cover at least a portion of the facet of the first tooth. The first occlusal surface may comprise pinched or folded shell material positioned to cover at least a portion of the facet of the first tooth. The first occlusal surface feature may be arranged to directly contact the second tooth when the appliance is worn and the patient bites, thereby applying a bite force to the second tooth.

The bite force applied to the second tooth may be oriented to urge a tooth movement along a vector with a vector component in a plane orthogonal to the second tooth's coronoapical axis.

Any of these apparatuses (e.g., systems) may include a second shell with a second plurality of tooth-receiving cavities configured to receive a plurality of teeth, said second plurality of tooth-receiving cavities may include a second tooth-receiving cavity configured to receive the second tooth.

Any of these apparatuses may include a second occlusal surface feature on an occlusal surface of the second tooth-receiving cavity, said second occlusal surface feature configured to apply a force to the first tooth-receiving cavity when the patient bites while wearing the appliance. The first and second occlusal surface features may be configured to contact each other when the patient bites while wearing the appliance.

The occlusal surface of the first tooth-receiving cavity may comprises a bubble structure disposed to receive at least one facet of the first tooth, and shaped to provide a space between the first tooth and the first tooth-receiving cavity when the appliance is worn, thereby reducing bite force applied to at least part of the at least one facet.

The first and second teeth may be posterior teeth (e.g., molars, pre-molars). The occlusal surface of a first tooth-receiving cavity may comprise a plurality of occlusal surface features including the first occlusal feature, said plurality of occlusal surface features may be configured to provide a plurality of forces to the second tooth when the patient bites, said plurality of forces may provide a net force on the second tooth to urge the second tooth along a desired movement path.

Also described herein are methods of orthodontic treatment and/or methods of designing a treatment plan (e.g., orthodontic treatment plan) that may include: obtaining a representation of a patient's dentition, said representation including bite information for a plurality of the patient's teeth; determining a movement path to move one or more teeth from an initial arrangement to a target arrangement; determining a first facet on a first tooth of a first arch and a second facet on a second tooth of a second arch, wherein said bite information indicates that said first tooth and second tooth come into occlusion when the patient bites; and determining an appliance geometry for an orthodontic appliance configured to move the one or more teeth along the movement path, wherein the appliance geometry includes a first shell including a first tooth-receiving cavity to receive the first tooth, said first tooth-receiving cavity comprising an occlusal surface feature at a location corresponding to the first facet of the first tooth and protruding away from the first tooth-receiving cavity.

Obtaining a representation of a patient's dentition may comprise scanning the teeth of the patient, and/or obtaining a mold of the patient's dentition.

Any of these methods may include outputting instructions to fabricating an appliance based on the appliance geometry, and/or fabricating the appliance. For example, fabricating the appliance may comprise thermoforming over a positive or negative mold. Fabricating the appliance may include using direct fabrication to manufacture the appliance.

The methods may include generating a plurality of appliance geometries for a plurality of appliances, said appliances configured to be worn by the patient in sequence to move the teeth of the patient from an initial configuration to a final configuration. The appliance geometry may further comprise a second shell, said second shell comprising a second tooth receiving cavity to receive the second tooth. For example, the second tooth receiving cavity may comprise a second occlusal surface feature a location corresponding to the second facet of the second tooth and protruding away from the second tooth-receiving cavity, said second occlusal surface feature configured to apply a force to the first tooth-receiving cavity when the patient bites while wearing the appliance. The first tooth-receiving cavity may further comprise a bubble structure disposed to receive at least one facet of the first tooth other than the first facet, and shaped to provide a space between the first tooth and the first tooth-receiving cavity when the appliance is worn, thereby reducing bite force applied to at least part of the at least one facet.

Any of the methods described herein may be configured as a system for use in orthodontic treatment that includes one or more processors and non-transitory memory containing instructions that, when executed, cause the processor to perform the method.

The dental appliances described herein, e.g., dental aligners, typically fit over a patient's teeth and include an occlusal outer surface contour that at least partially matches and selectively intercuspates with the outer occlusal outer surface contour of the opposite jaw. In particular, described herein are dental appliances having an occlusal outer surface contours that are distinct, and in some cases laterally (e.g., in the plane of the occlusal surface) offset from, the occlusal inner surface contour within the dental appliance. This may result in a "faux" occlusal outer surface contour of the appliance that does not match the occlusal outer surface contour of the patient's teeth when not wearing the appliance. Thus, the occlusal outer surface contour of the appliance may be configured to intercuspate with the opposite jaw, e.g., the occlusal surface of the patient's teeth and/or the occlusal outer surface contour of an appliance worn on the patient's teeth on the opposite jaw. In some cases the occlusal outer surface contour of the appliance may be configured to provide a target intercuspation with the opposite jaw, even during initial or intermediate stages of a dental (e.g., orthodontic) treatment. The target intercuspation may be a maximal (or near maximal) intercuspation. The target intercuspation may be the intended final intercuspation position from a pre-defined treatment plant. This may enhance the comfort for the patient, and may allow the patient to acclimate to the final (or near-final) intercuspation earlier in treatment. For example, the occlusal outer surface contour of all or some of the appliance in a series of appliances may be configured to match the target occlusal outer surface contour at the final stages of the treatment defined by the treatment plan; the occlusal inner surface contour, which is worn against the teeth, may therefore be different for the dental appliances, and may change across different stage of the treatment plan.

In general, rather than following the contours of the occlusal surface(s) of the teeth over which the dental appliance is configured to fit onto, the dental appliance described herein may have a different occlusal outer surface contour (e.g., having cusps and fossae/grooves) compared to the occlusal surface contour of the teeth the appliance is covering. The occlusal outer surface contour may be rearranged to form a new configuration, and/or some portions may be laterally offset (in the plane of the occlusal surface) compared to patient's teeth.

As used here "intercuspation" may refer to the cusp-to-fossa relationship of the outer surfaces of the teeth, and particularly the maxillary and mandibular posterior teeth to each other. This may also be referred to as the interlocking or fitting together of the occlusal eminences (e.g., cusps) on the outer surfaces of the teeth with the opposite outer surfaces on the teeth (e.g., between opposite cusp regions and into opposite fossae. Intercuspation may refer to the relationship between the outer (occlusive) surfaces of one or more dental appliance(s) worn on the teeth and either their relationship with an opposite outer (occlusive) surface of one or more dental appliance(s) worn on the opposite jaw, and/or with the patient's teeth on the opposite jaw. Thus, in general, intercuspation may refer to the interlocking or fitting together of the opposing occlusal outer surface contours of an appliance worn on the teeth and another appliance and/or the patient's occlusal surface on the opposite jaw. Selective intercuspation may refer to the modification of the intercuspation in order to direct and/or adjust the bite force selectively to enhance movement (e.g., alignment/ realignment which may include translation and/or rotation) of one (or in some cases more than one) of the patient's teeth. This movement may be according to a predetermined treatment plan for achieving a final or intermediate configuration of the patient's teeth that has desirable clinical and/or aesthetic properties.

The occlusal outer surface contour of a dental appliance, which may be referred to as the outward-facing occlusal surface contour or as the outward-facing occlusal surface of the dental appliance, may refer to the outermost contour of the appliance, and may be distinguished from the inward-facing occlusal surface contour (or inward-facing occlusal surface) of the dental appliance. The inward-facing occlusal surface contour of the dental appliance may face the occlusal surface of the teeth onto which the appliance is worn. In some variation the inward-facing occlusal surface contour of the appliance is offset from the outward-facing occlusal surface contour. Thus, the thickness of the occlusal surface may vary across the cross-section along the occlusal portion for the appliance. In some variations, the inward-facing occlusal surface contour is configured so that applies a force or moment to one or more tooth/teeth to modify the position of the tooth/teeth. As described herein, in some variations the outward-facing occlusal surface contour may be configured to apply a force or moment to one or more teeth on the opposite jaw. Alternatively or additionally, the outward-facing occlusal surface contour may be configured to maximally intercuspate with the occlusal surface on the opposite jaw.

Maximal or maximum intercuspation may refer to an arrangement in which all or virtually all (e.g., >85%, >87%, >90%, >92%, >95%, >97%, >99%) of the outward-facing occlusal outer surface contours on the teeth (e.g., the occlusal eminences and fossae of a dental apparatus worn on the teeth) fully interpose with the outermost protruding surface contours on the teeth (e.g., of the teeth or of a dental appliance worn on the teeth) of the opposing arch. Maximal intercuspation may be important for jaw position and patient comfort, as it may help define both the anterior-posterior and lateral relationships of the mandible and the maxilla, as well as the superior-inferior relationship (e.g., the vertical dimension of occlusion).

For example, described herein are dental aligner device to be worn on a patient's teeth, the device comprising: a shell body having a lingual side, an occlusal side, and a buccal side, wherein the shell body comprises an inner tooth-receiving region configured to fit over the patient's teeth, the inner tooth-receiving region comprising: an occlusal inner surface contour in the inner tooth-receiving region, the occlusal inner surface having an arrangement of cavities configured to conform to a first arrangement of cusps on an occlusal surface of the patient's teeth, and an occlusal outer surface contour that is opposite the occlusal inner surface, the occlusal outer surface contour forming a second arrangement of cusps, wherein the second arrangement of cusps of the occlusal outer surface contour does not align with the arrangement of cavities of the occlusal inner surface contour, and wherein a thickness between the occlusal outer surface contour and the occlusal inner surface contour varies across the shell body occlusal side.

Also described herein are dental aligner devices to be worn on a patient's teeth that include: a shell body having a lingual side, an occlusal side, a buccal side and a thickness, wherein the shell body comprises: an inner tooth-receiving region configured to fit over the patient's teeth, the inner tooth-receiving region comprising an occlusal inner surface contour comprising a plurality of cavities that conform to a plurality of cusps on an occlusal surface of the patient's teeth; and an occlusal outer surface contour that is on opposite from the inner occlusal surface contour, wherein the occlusal outer surface contour forms a second plurality of cusps, wherein at least some of the second plurality of cusps are laterally offset from the plurality of cavities of the occlusal inner surface contour, and wherein a thickness between the occlusal outer surface contour and the occlusal inner surface contour varies across the shell body occlusal side.

In any of these apparatuses (e.g., devices, systems, etc.), the occlusal outer surface may be configured to maximally intercuspate with an occlusal surface the patient's opposite jaw. For example, the occlusal outer surface may be configured to intercuspate with over more than 90% of the occlusal surface of the patient's opposite jaw. The occlusal surface on the patient's opposite jaw may be a dental appliance (e.g., an aligner, retainer, palatal expander, etc.) configured to be worn on teeth of the patient's opposite jaw. The occlusal surface on the patient's opposite jaw may be the occlusal surface of the patient's teeth in the opposite jaw.

The occlusal outer surface contour may correspond to the final or near-final configuration of the occlusal surface that is to be achieved by the aligner (or a series of aligners including the aligner). The second arrangement of cusps of the outer surface contour may correspond to a target final arrangement of an occlusal surface of a treatment plan.

The occlusal inner surface contour may be configured to apply force to move one or more of a patient's teeth while wearing the dental aligner.

In any of these variations described herein, one or more regions of the occlusal outer surface contour may be laterally offset in an occlusal plane relative to the occlusal inner surface.

Any of these apparatuses may include one or more occlusal surface features protruding from the occlusal outer surface in a direction away from the inner tooth-receiving region, wherein the occlusal surface feature is positioned to be apply a force to a first tooth received by the inner tooth-receiving region and to a second tooth opposite the inner tooth-receiving region in the patient's mouth.

Also described herein are systems including a series of aligners to be worn to align a patient's teeth in which the intercuspation of the aligners is controlled or modified, e.g., to maximize intercuspation and/or to mimic the final intercuspation at or near the end of the treatment to align the teeth, even during earlier stages of the treatment plan.

For example, a dental aligner system to be worn on a patient's teeth as part of a treatment plan to align the patient's teeth may include: a plurality of dental aligners configured to be worn in a sequence defined by the treatment plan; wherein each dental aligner comprises a shell body having an inner tooth-receiving region configured to fit over the patient's teeth and apply force to move one or more of the patients teeth when worn, wherein the inner tooth-receiving region comprises an occlusal inner surface contour, and wherein each dental aligner further comprises an occlusal outer surface contour that is opposite the occlusal inner surface contour; wherein all of the dental aligners in the plurality of dental aligners have different occlusal inner surface contours, but two or more of the dental aligners in the plurality of dental aligners have identical occlusal outer surface contours.

The two or more of the dental aligners in the plurality of dental aligners that have identical occlusal outer surface contours may be configured so that the occlusal outer surfaces maximally intercuspate with an occlusal surface the patient's opposite jaw. For example, the two or more dental aligners in the plurality of dental aligners that have identical occlusal outer surface contours may be configured so that the occlusal outer surfaces intercuspate with over more than 90% of the occlusal surface of the patient's opposite jaw. The two or more dental aligners in the plurality of dental aligners that have identical occlusal outer surface contours may correspond to a target final arrangement of an occlusal surface of a treatment plan. The two or more dental aligners in the plurality of dental aligners may comprise one or more regions of the occlusal outer surface contour that are laterally offset in an occlusal plane relative to the occlusal inner surface. In some variations, the two or more dental aligners in the plurality of dental aligners may further comprise an occlusal surface feature protruding from the occlusal outer surface in a direction away from the inner tooth-receiving region, wherein the occlusal surface feature is positioned to be apply a force to a first tooth received by the inner tooth-receiving region and to a second tooth opposite the inner tooth-receiving region in the patient's mouth.

In general, a dental aligner device may be configured to include a projection on the occlusal surface that is configured to apply force to move a tooth on the opposite dental arch (opposite from the arch over which the aligner is being worn). The projection may be referred to as an occlusal surface feature. The projection may be in addition to the cusps mimicking the cusps of the teeth over which the dental arch is being worn, and/or they may be modified forms of the cusps mimicking the teeth over which the dental arch is being worn. For example, the occlusal surface feature may be one or more cusps (and or cusps and nadir regions) that are shifted relative to the underlying cusp(s) or cusps and nadirs of the tooth/teeth underlying the aligner when it is worn. In some variations the occlusal surface feature is an enlarged cusp or a bump or protrusion extending from a cusp (or other region of the occlusal outer surface). In variations in which the occlusal surface feature is a bump or protrusion, it may be relatively small, so that it engages with the opposite teeth (or an aligner on the opposite teeth) only when the majority of the teeth are otherwise engaged (e.g., when the aligner intercuspates with over a x% of the of the occlusal surface of the opposite dental arch, X% may be 50%, 60%, 70%, 80%, 90%, etc.). For example, the occlusal surface feature may extend between about 0.1 mm and 3 mm (e.g., less than about 3 mm, less than about 2.5 mm, less than about 2 mm, less than about 1.8 mm, less than about 1.7 mm, less than about 1.5 mm, less than about 1.4 mm, less than about 1.3 mm, less than about 1.2 mm, less than about 1.1 mm, less than about 1.0 mm, less than about 0.9 mm, etc.) above the outer occlusal surface. The occlusal surface feature may have a maximum diameter of between about 0.1 mm and about 3 mm (e.g., less than about 3 mm, less than about 2.5 mm, less than about 2 mm, less than about 1.8 mm, less than about 1.7 mm, less than about 1.5 mm, less than about 1.4 mm, less than about 1.3 mm, less than about 1.2 mm, less than about 1.1 mm, less than about 1.0 mm, less than about 0.9 mm, etc.). The occlusal surface feature may be have an approximately hemispherical shape, a rectangular shape, a pyramidal shape, an oval shape, a cylindrical shape, etc. In some variations the occlusal surface feature is a rounded shape having smoothed edges extending from the outer occlusal surface. The occlusal surface feature may be in addition to the cusps (and nadirs) that are also present in the configuration of the inner occlusal surface.

For example, a dental aligner device to be worn on a patient's teeth over a first dental arch may include: a shell body having a lingual side, an occlusal side, and a buccal side, wherein the shell body comprises an inner tooth-receiving region to fit over the patient's teeth and apply a force to move one or more of the patient's teeth on an opposite dental arch to a predetermined configuration when the shell body is worn on the patient's teeth, the inner tooth-receiving region comprising: an occlusal inner surface contour in the inner tooth-receiving region, the occlusal inner surface having a first arrangement of cusps and nadirs configured to conform to an occlusal surface of the patient's teeth, an occlusal outer surface contour that is opposite the occlusal inner surface contour, the occlusal outer surface contour forming a second arrangement of cusps, wherein the first arrangement of cusps includes the same number and sequence order of cusps; and one or more occlusal surface feature extending from the outer occlusal surface, configured so that the occlusal surface feature of the dental aligner device produces a bite force to move the one or more of the patient's teeth on the opposite dental arch to the predetermined configuration when the dental aligner device is worn on the first dental arch.

Alternatively or additionally, a dental aligner device as described herein (e.g., a dental aligner to be worn on a patient's teeth over a first dental arch) may include: a shell body having a lingual side, an occlusal side, and a buccal side, wherein the shell body comprises an inner tooth-receiving region to fit over the patient's teeth and apply a force to move one or more of the patient's teeth on an opposite dental arch to a predetermined configuration when the shell body is worn on the patient's teeth, the inner tooth-receiving region comprising: an occlusal inner surface contour in the inner tooth-receiving region, the occlusal inner surface having a first arrangement of cusps and nadirs configured to conform to an occlusal surface of the patient's teeth, and an occlusal outer surface contour that is opposite the occlusal inner surface contour, the occlusal outer surface contour forming a second arrangement of cusps and nadirs, wherein the second arrangement of cusps and nadirs of the occlusal outer surface contour does not align with the first arrangement of cusps and nadirs, so that the dental aligner device produces a bite force to move the one or more of the patient's teeth on the opposite dental arch to the predetermined configuration when the dental aligner device is worn on the first dental arch.

One or more regions of the occlusal outer surface contour may be offset in an occlusal plane relative to the occlusal inner surface contour. The occlusal inner surface contour and the occlusal outer surface contour may have the same number and sequence order of cusps and nadirs, but the spacing between one or more adjacent cusps and nadirs are different between the occlusal inner surface contour and the occlusal outer surface contour. The second arrangement of cusps and nadirs of the occlusal outer surface contour may correspond to a target final arrangement of an occlusal surface of a treatment plan.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1C illustrates one example of a method of orthodontic treatment using a plurality of appliances;

FIG. 2 illustrates one example of a method for designing an orthodontic appliance;

FIGS. 7A and 7B illustrate how multiple favorable facet contacts can be used in conjunction to produce a net tooth-moving force;

FIG. 8A is an example of an aligner device including an occlusal outer surface contour that is not aligned with the occlusal inner surface contour. A section, including sections transverse to a line in the occlusal plane (dashed line) transverse B are indicated.

DETAILED DESCRIPTION

The methods and apparatus disclosed herein can be used in many ways to improve the treatment of teeth with occlusal forces. The methods and apparatus disclosed herein can be incorporated into and combined with many prior approaches to moving teeth, such as thin shell appliances ("aligners"), for example. Although reference is made to occlusal forces with shell appliances, the methods and apparatus disclosed herein can be combined with many prior approaches to moving teeth such as attachments, brackets and wires.

As used herein the terms "torque" and "moment" are treated synonymously, and encompass a force acting on an object such as a tooth at a distance from a center of resistance. The moment may be calculated with a vector cross product of a vector force applied to a location corresponding to a displacement vector from the center of resistance, for example. The moment may comprise a vector pointing in a direction. A moment opposing another moment may encompass one of the moment vectors oriented toward a first side of the object such as the tooth and the other moment vector oriented toward an opposite side of the object such as tooth, for example.

In many embodiments, one or more posterior teeth comprises one or more of a molar or a premolar or a canine, and one or more anterior teeth comprising one or more of a central incisor, a lateral incisor, a cusped, a first bicuspid or a second bicuspid.

The embodiments disclosed herein are well suited for combination with one or more known commercially available tooth moving components such as attachments and polymeric shell appliances. In many embodiments, the appliance and one or more attachments are configured to move one or more teeth along a tooth movement vector comprising six degrees of freedom, in which three degrees of freedom are rotational and three degrees of freedom are translation. Embodiments disclosed herein can provide differential moment vectors based on a moment and a counter moment to each of a plurality of teeth.

The present disclosure provides orthodontic systems and related methods for designing and providing improved or more effective tooth moving systems for eliciting a desired tooth movement and/or repositioning teeth into a desired arrangement.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. The appliance can be shaped in many ways, such as with thermoforming or direct fabrication. Alternatively or in combination, the appliance can be fabricated with machining such as an appliance fabricated from a block of material with computer numeric control machining.

Figure 1A:
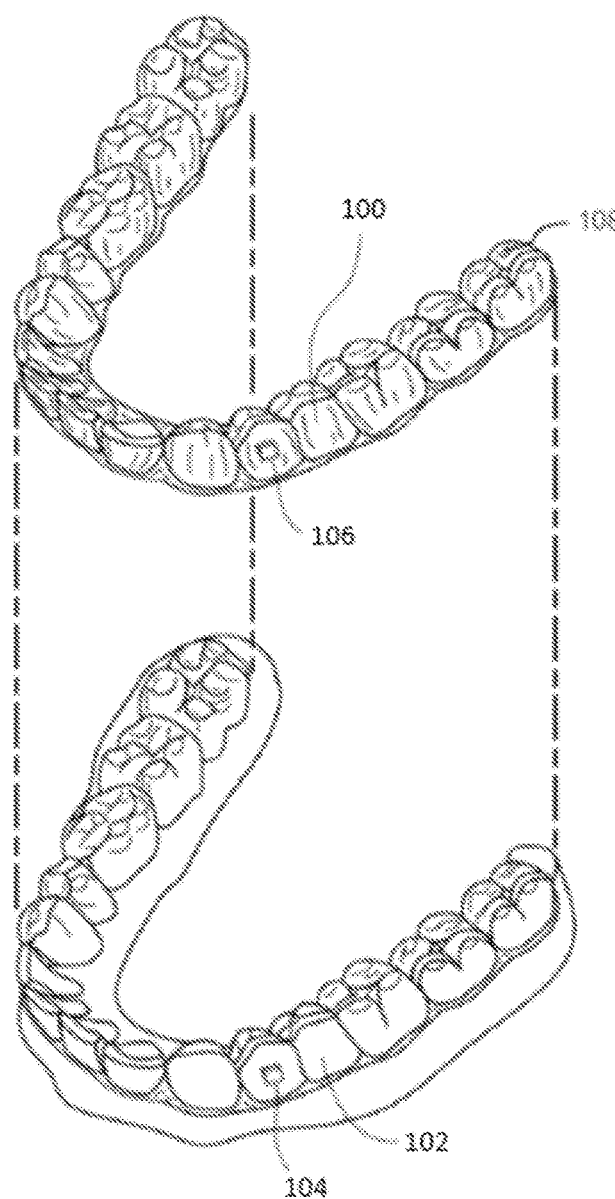
FIG. 1A illustrates a tooth repositioning appliance ("aligner" or "shell aligner")

Orthodontic systems of the present disclosure can include tooth attachments and one or more orthodontic appliances that engage the attachments when worn by a patient. Appliances having teeth receiving cavities that receive and reposition teeth, e.g., via application of force due to appliance resiliency, are generally illustrated with regard to FIG. 1A. FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth.

As described in detail herein, the appliance can include one or more modified occlusal surfaces 108. These modifications can include augmentation of desirable occlusal surfaces and/or reduction/removal of undesirable occlusal surfaces. For example, tooth facets can be augmented or reduced to alter occlusion between teeth of the upper and lower arches, thereby applying tooth moving forces based on the bite force supplied by the patient's jaws.

Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
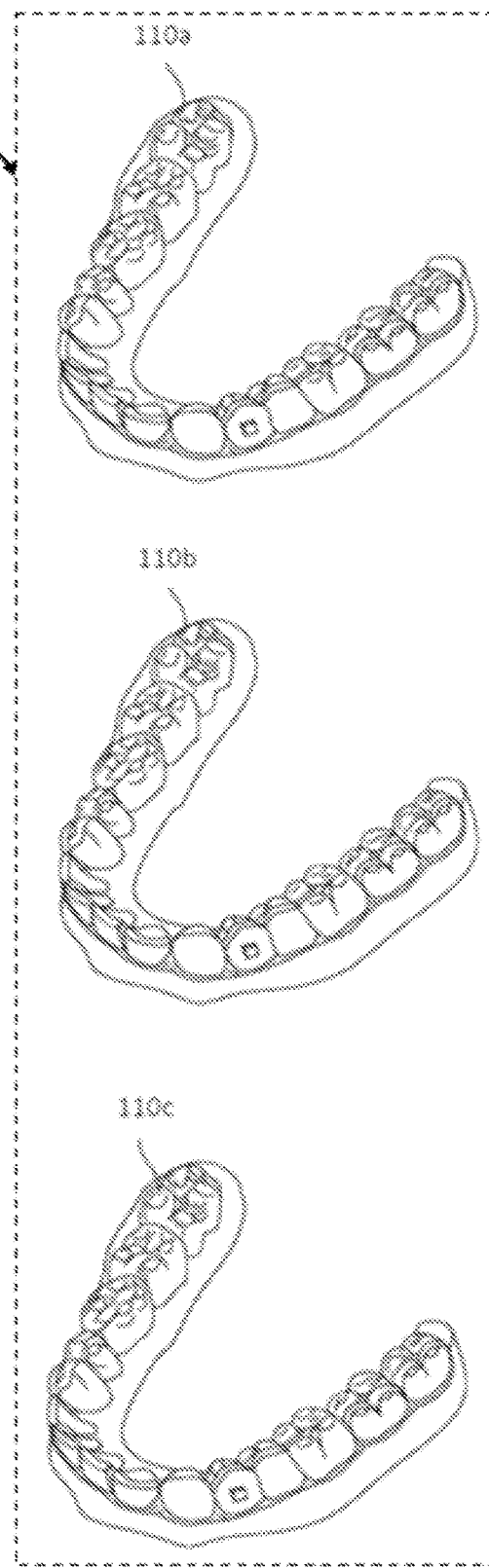
FIG. 1B illustrates one example of a tooth repositioning system.

FIG. 1B illustrates a tooth repositioning system 110 including a plurality of appliances 110a, 110b, 110c. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. Each appliance may also have occlusal surfaces modified to apply tooth-moving forces based on the bite force of a patient. The patient's teeth can be progressively repositioned from an initial tooth arrangement to a target tooth arrangement by placing a series of incremental position adjustment appliances over the patient's teeth. For example, the tooth repositioning system 110 can include a first appliance 110a corresponding to an initial tooth arrangement, one or more intermediate appliances 110b corresponding to one or more intermediate arrangements, and a final appliance 110c corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages Likewise, an initial tooth arrangement can be any initial arrangement for the patient's teeth that is followed by one or more incremental repositioning stages.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. As an example, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

Alternatively or in combination, some embodiments of the orthodontic appliances herein (or portions thereof) can be produced using direct fabrication, such as additive manufacturing or rapid prototyping techniques. For example, stereolithography can be used to fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be fabricated by fused deposition modeling. In some embodiments, fused deposition modeling involves melting and selectively depositing a thin filament of thermoplastic polymer in a layer-by-layer manner in order to form an object. In yet another example, 3D printing can be used to fabricate the appliances herein. In some embodiments, 3D printing involves jetting or extruding one or more materials onto a build surface in order to form successive layers of the object geometry. U.S. Patent Pub. No. 2017/0007365 (incorporated herein by reference) discloses various direct fabrication methods useful for the fabrication of the appliances described herein.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Orthodontic appliances, such as illustrated in FIG. 1A, impart forces to the crown of a tooth and/or an attachment positioned on the tooth at each point of contact between a tooth receiving cavity of the appliance and received tooth and/or attachment. The magnitude of each of these forces and their distribution on the surface of the tooth determines the type of orthodontic tooth movement which results. Types of tooth movements are conventionally delineated as extrusion, intrusion, rotation, tipping, translation and root movement. Tooth movement of the crown greater than the movement of the root is referred to as tipping. Equivalent movement of the crown and root is referred to as translation. Movement of the root greater than the crown is referred to as root movement. The appliances disclosed herein include structures that allow the adjustment of occlusive forces between surfaces (e.g., crowns) of teeth to better provide tooth-moving forces.

Tooth movements may be in any direction in any plane of space, and may comprise one or more of rotation or translation along one or more axes.

FIG. 2 illustrates a method 200 for designing an orthodontic appliance, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue. In any of these variations, a digital model of the patient's dentition, including all or some of the patient's teeth, including one or both of the upper and lower jaw. The digital model may be a literal model (e.g., models including relative surfaces and/or volumes), representative (from which actual surface may be derived within a desired level of precision) or some combination thereof.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. A target tooth arrangement engine may be used and may incorporate clinician input, prescription input and/or predefined (or adjustable) orthodontic principles to generate one or more final positions specific to the patient's teeth. The target tooth arrangement engine may be automated. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth. In some variations a system may include a movement path determination engine that may use the initial patient dentition/bite data (which may be held in an initial patient dentition/bite datastore accessible by the movement path determination engine) and the target tooth position from the target tooth arrangement engine, to determine one or more tooth movement paths. The movement path determination engine may use one or more rules (e.g., a ruleset) for clinically acceptable tooth movement, which may be stored in a data structure (e.g., a clinically acceptable tooth movement datastore) as well as the initial patient dentition/ bite data and the target tooth (target dentition) arrangement data to generate one or more movement paths.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. The force system for achieving the calculated movement path(s) may be calculated, in some variations, using a force system estimator engine. Biomechanical principles, modeling techniques, force calculation/measurement techniques, and the like, including knowledge and approaches commonly used in orthodontia, may be used to determine the appropriate force system to be applied to the tooth to accomplish the tooth movement, and may be used as part of a force system estimator engine. In determining the force system to be applied, sources may be considered including literature, force systems determined by experimentation or virtual modeling, computer-based modeling, clinical experience, minimization of unwanted forces, etc.

In steps 230, 240, and 250, an appliance geometry for an orthodontic appliance configured to produce the force system is determined. The steps of determining an appliance geometry can include determining an occlusal geometry of the patient's upper and lower teeth, including identifying facets of the teeth that occlude to produce occlusal forces. This may be performed in a system by a bite occlusion estimator (for facet determination). The forces of occlusion may be the result of contact between the occlusal surfaces of teeth in the opposing arch and the force applied by the facial musculature when the jaws are closed (occluded). While an initial appliance geometry may include a surface that closely mimics the shape of the occlusal surfaces of the teeth (e.g., providing a thin layer of material more-or-less uniform in width across the teeth's occlusal surfaces), these surfaces can be modified to adjust the occlusion of the patient's teeth when wearing the appliance, thereby modifying the bite forces in a way that benefits the orthodontic treatment.

In step 230, upper and lower facets of teeth that are favorable and unfavorable for producing the force system are identified. For example, the bite occlusion estimator may identify the upper and lower facets of the teeth that are favorable and unfavorable for producing the force system. Since a default appliance shape can include an occlusal surface that mimics the natural occlusal surfaces of the patient's teeth, it is possible to identify favorable and unfavorable facets without needing to generate a default appliance geometry. Accordingly, in some embodiments, this identification may be made based on the geometry of the teeth without first generating an appliance geometry. Alternatively, a first appliance geometry can be generated, and the resulting facets can be analyzed based on this geometry. This process may involve iteratively performing step 250 in conjunction with steps 230 and 240, in order to generate an appliance geometry that provides specific, desirable occlusal forces. Favorable and unfavorable facets can be determined by using a measurement of the occlusal characteristics of the patient's teeth and jaws to model the occlusal forces of the patient. This model can include the effects of one or more appliances worn by the patient. The model can determine bite forces applied when the patient bites, and forces specific to different facets can be identified. In some cases, forces that are oriented along a desired direction of movement can be identified as favorable, and forces opposing the movement can be identified as unfavorable. Additionally, forces of multiple facets may be combined (e.g., as a vector sum), to identify combined forces that may be favorable and unfavorable. Furthermore, identifying the favorable and unfavorable forces can comprise identifying favorable and unfavorable moments, e.g., by determining a force direction, magnitude, and position to calculate a moment about a center of mass of a tooth. Determining favorable and unfavorable facets can thus involve determining those facets that provide forces and/or moments that help (or hinder) the tooth to move along a desired path of movement and/or rotation.

In step 240, modifications to the occlusal surface are determined. In some variations of a system performing these methods, the system may include an occlusal surface modification engine that may determine the modifications to be made to the occlusal surface consistent with the estimated bite occlusion and force system estimates. These modifications can remove unfavorable contacts and/or augment favorable contacts. For example, the modifications can include changes to the occlusal surface along tooth facets by modifying the thickness and/or shape of an appliance shell. These changes can be used to alter the occlusal forces applied to one or more teeth of the patient, thereby increasing favorable tooth-moving forces (and/or moments) along a desired trajectory while decreasing unfavorable tooth-moving forces (and/or moments), such as those opposing a desired trajectory or otherwise deviating from the trajectory.

In step 250, a new appliance geometry is generated based on modifications in steps 230 and 240. An aligner fabrication engine may be used as part of a system in order to generate the one or more appliance(s). The new appliance geometry can include modifications to the occlusal surfaces such as augmentations of favorable facets and diminutions of unfavorable facets. The new appliance geometry can also include modified positions of tooth-moving cavities; for example, non-occlusal tooth-moving forces can be modified to account for the changed occlusal forces, so as to generate an overall force to urge teeth along a desired path of movement. Steps 230, 240, and 250 can be iterated multiple times when designing an appliance to adjust the overall force configuration of the appliance. Furthermore, as discussed above, step 250 can be performed before steps 230 and 240 to generate an initial appliance geometry (e.g., one that applies non-occlusal tooth-moving forces but lacks occlusal force optimization) that can be iteratively adjusted by modifying the occlusal surfaces as described herein to provide more favorable tooth-moving forces.

The appliance geometry may comprise one or more tooth engagement structures, and the tooth engagement structures may be configured to engage the surface of at least one tooth. In addition to the occlusal surfaces, further tooth surface(s) may be chosen for engagement, such as an interproximal surface, a buccal or lingual surface, or any other surface of the tooth, depending on the characteristics of the force on the tooth it is to elicit. The geometry may also comprise a specification of material as a function of location within the orthodontic appliance.

Determination of the appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, Calif. For creating finite element models and analyzing them, program products from a number of vendors can be used, including finite element analysis packages from ANSYS, Inc., of Canonsburg, Pa., and SIMULIA(Abaqus) software products from Dassault Systèmes of Waltham, Mass.

Optionally, one or more appliance geometries can be selected for testing or force modeling. As noted above, a desired tooth movement, as well as a force system required or desired for eliciting the desired tooth movement, can be identified. Using the simulation environment, a candidate appliance geometry can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 260, instructions for fabrication of the orthodontic appliance having the appliance geometry are generated. The instructions can be configured to control a fabrication system or device in order to produce the orthodontic appliance with the specified appliance geometry. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. The instructions can alternatively be configured for indirect fabrication of the appliance, e.g., by thermoforming. A mixture of thermoforming and direct fabrication techniques may also be used as needed.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired.

Any of the methods described herein may be embodied as a system for performing the method. For example, a system for use in orthodontic treatment may include one or more processor and a memory coupled to the one or more processors. The memory may be configured to store computer-program instructions, that, when executed by the one or more processors, perform a computer-implemented method comprising: obtaining a representation of a patient's dentition, said representation including bite information for a plurality of the patient's teeth; determining a movement path to move one or more teeth from an initial arrangement to a target arrangement; determining a first facet on a first tooth of a first arch and a second facet on a second tooth of a second arch, wherein said bite information indicates that said first tooth and second tooth come into occlusion when the patient bites; and determining an appliance geometry for an orthodontic appliance configured to move the one or more teeth along the movement path, wherein the appliance geometry includes a first shell including a first tooth-receiving cavity to receive the first tooth, said first tooth-receiving cavity comprising an occlusal surface feature at a location corresponding to the first facet of the first tooth and protruding away from the first tooth-receiving cavity.

Figure 10:
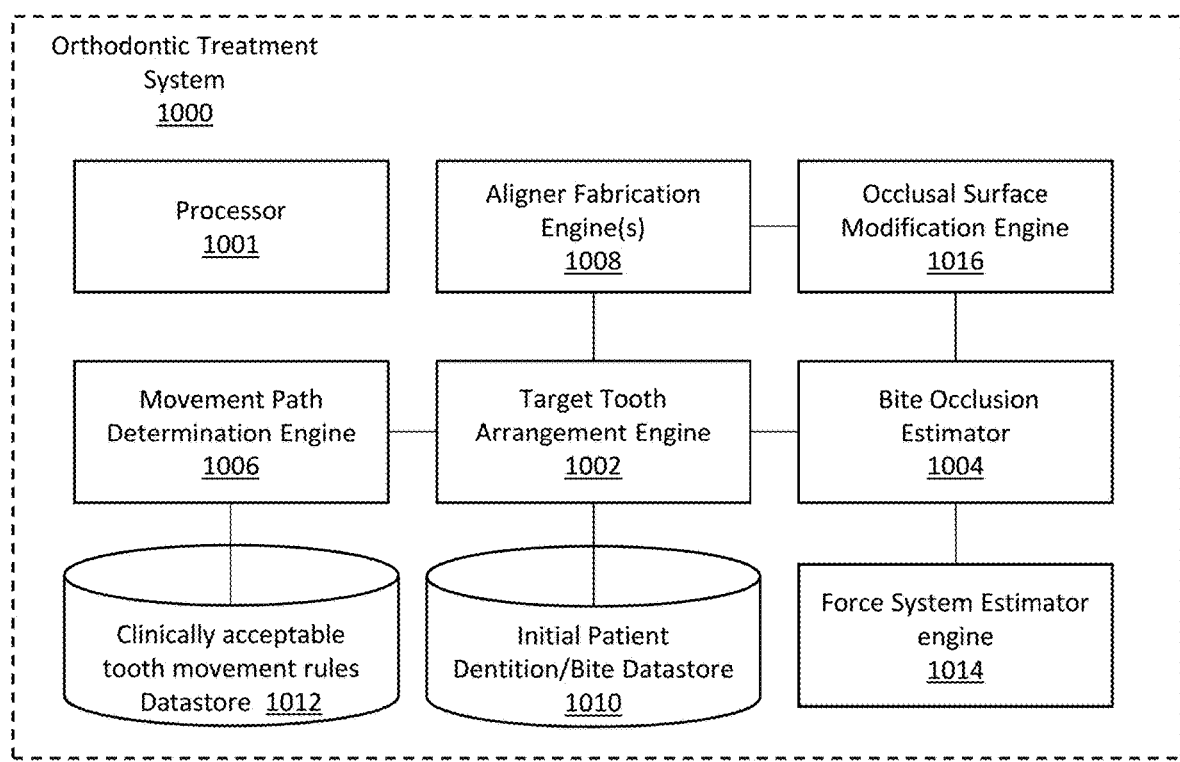
FIG. 10 illustrate a schematic of one example of a system for designing an orthodontic appliance as described herein.

The system may include one or more engines and/or data structures adapted to perform these methods. For example, FIG. 10 is a diagram showing an example of an orthodontic treatment system 1000. The modules of the orthodontic treatment system 1000 may include one or more engines and datastores. A computer system can be implemented as an engine, as part of an engine or through multiple engines. As used herein, an engine includes one or more processors 1001 or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The Orthodontic Treatment System 1000 may include a computer-readable medium, a target tooth arrangement engine 1002, a movement path determination engine 1006, a bit occlusion estimator 1004, a force system estimator engine 1014, an occlusal surface modification engine 1016, an aligner fabrication engine 1008, a clinically acceptable tooth movement rules datastore 1012 and an initial patient dentition/bite datastore 1010. One or more of the modules of the system 1000 may be coupled to one another (e.g., through the example couplings shown in FIG. 1) or to modules not explicitly shown in FIG. 10. The computer-readable medium may include any computer-readable medium, including without limitation a bus, a wired network, a wireless network, or some combination thereof.

The movement path determination engine 1006 may determine a movement path to move one or more teeth from an initial arrangement to a target arrangement. The movement path determination engine may use both the target tooth arrangement (determined by the target tooth arrangement engine 1002) and the information/data from the initial patient dentition/bite data store 1010. As mentioned, the initial arrangement data in the datastore 1010 can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. The datastore may store a digital data set that represents the initial (e.g., pretreatment) arrangement of the patient's teeth and other tissues. Optionally, the initial digital data set may be processed to segment the tissue constituents from each other. For example, data structures that digitally represent individual tooth crowns can be included. Digital models of entire teeth can be produced, including measured or extrapolated hidden surfaces and root structures, as well as surrounding bone and soft tissue; the digital model may include all or some of the patient's teeth, including one or both of the upper and lower jaw.

The target tooth arrangement engine 1002 may determine a desired target arrangement of the teeth (e.g., a desired and intended end result of orthodontic treatment) using the digital model of the patient's teeth (e.g., from the initial patient dentition/bite datastore) and may determine the final target tooth arrangement based on one the application of clinically acceptable tooth movement rules (e.g., from the datastore 1012) in reference to one or more of: a of a prescription, and/or direct physician/technician input. The target tooth arrangement engine 1002 may therefore incorporate clinician input, prescription input and/or predefined (or adjustable) orthodontic principles to generate one or more final positions specific to the patient's teeth. The target tooth arrangement engine (and indeed, any of these modules) may be automated. The target tooth arrangement engine may therefore generate one or more desired final positions of the teeth from a digital representation of the teeth, and the final position and surface geometry of each tooth can be specified to form a complete model of the tooth arrangement at the desired end of treatment.

The movement path determining engine 1006 may then use the initial position and a target position for each tooth, to define a motion of each tooth. In some embodiments, the movement paths are configured to move the teeth in the quickest fashion with the least amount of round-tripping to bring the teeth from their initial positions to their desired target positions. As mentioned, the tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth. The movement path determination engine 1006 may use the initial patient dentition/bite data (which may be held in an initial patient dentition/bite datastore 1010 accessible by the movement path determination engine 1006) and the target tooth position from the target tooth arrangement engine 1002, to determine one or more tooth movement paths. The movement path determination engine 1006 may use one or more rules (e.g., a ruleset) for clinically acceptable tooth movement, as stored in a clinically acceptable tooth movement datastore 1012, as well as the initial patient dentition/bite data and the target tooth (target dentition) arrangement data to generate one or more movement paths.

A force system estimator engine 1014 may estimate movement of the one or more teeth along the movement path is determined by the movement path determination engine 1006. The force system estimator engine may determine the force system(s) for achieving the calculated movement path(s), e.g., using a force system estimator engine. The force system estimator engine may apply biomechanical principles, modeling techniques, force calculation/measurement techniques, and the like, including knowledge and approaches commonly used in orthodontia, to determine the appropriate force system to be applied to the tooth to accomplish the tooth movement for the movement path(s) from the movement path determination engine. The force system estimator engine 1014 may include computer-based modeling, minimization of unwanted forces, etc.

The system may also include a bite occlusion estimator 1004 to determine (in conjunction with, or part of, the force system estimator engine 1014) an occlusal geometry of the patient's upper and lower teeth, including identifying facets of the teeth that occlude to produce occlusal forces. For example, the bite occlusion estimator 1004 may determine upper and lower facets of teeth that are favorable and unfavorable for producing the force system identified. In some embodiments, this identification may be made based on the geometry of the teeth without first generating an appliance geometry. Alternatively, a first appliance geometry can be generated, and the resulting facets can be analyzed based on this geometry. This system may iteratively generating an appliance geometry that provides specific, desirable occlusal forces. Favorable and unfavorable facets can be determined by using a measurement of the occlusal characteristics of the patient's teeth and jaws to model the occlusal forces of the patient. This model can include the effects of one or more appliances worn by the patient.

The occlusal surface modification engine 1016 may determine modifications to the occlusal surface. The occlusal surface modification engine may determine the modifications to be made to the occlusal surface consistent with the estimated bite occlusion and force system estimates. These modifications can remove unfavorable contacts and/or augment favorable contacts. For example, the modifications can include changes to the occlusal surface along tooth facets by modifying the thickness and/or shape of an appliance shell. These changes can be used to alter the occlusal forces applied to one or more teeth of the patient, thereby increasing favorable tooth-moving forces (and/or moments) along a desired trajectory while decreasing unfavorable tooth-moving forces (and/or moments), such as those opposing a desired trajectory or otherwise deviating from the trajectory.

An aligner fabrication engine 1008 may then be used to generate a new appliance geometry based on modifications from the occlusal surface modification engine 1016. The aligner fabrication engine 1008 may generate the one or more appliance(s). The new appliance geometry can include modifications to the occlusal surfaces such as augmentations of favorable facets and diminutions of unfavorable facets. The new appliance geometry can also include modified positions of tooth-moving cavities; for example, non-occlusal tooth-moving forces can be modified to account for the changed occlusal forces, so as to generate an overall force to urge teeth along a desired path of movement.

Figure 3:
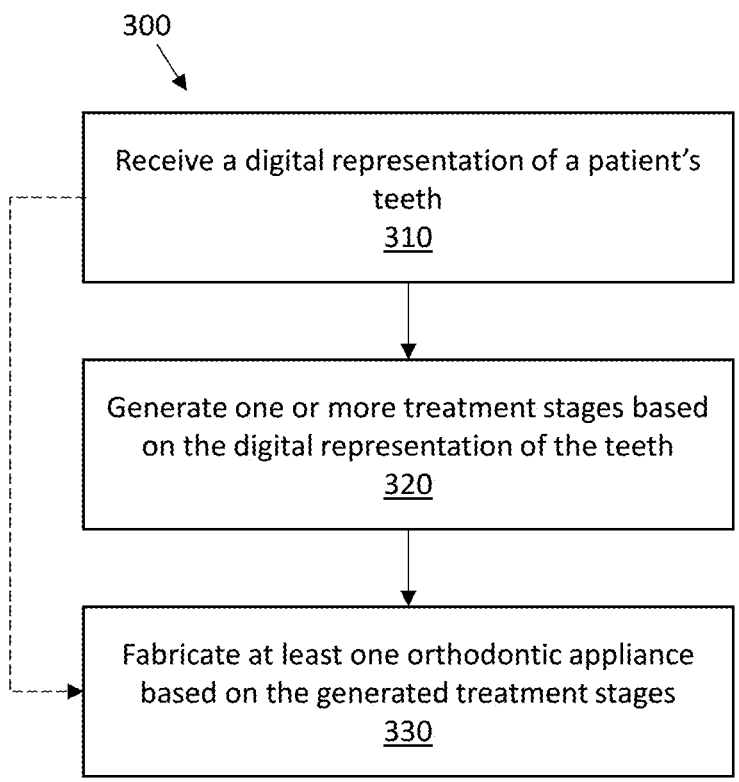
FIG. 3 illustrates one example of a method for digitally planning an orthodontic treatment.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

Figure 4:
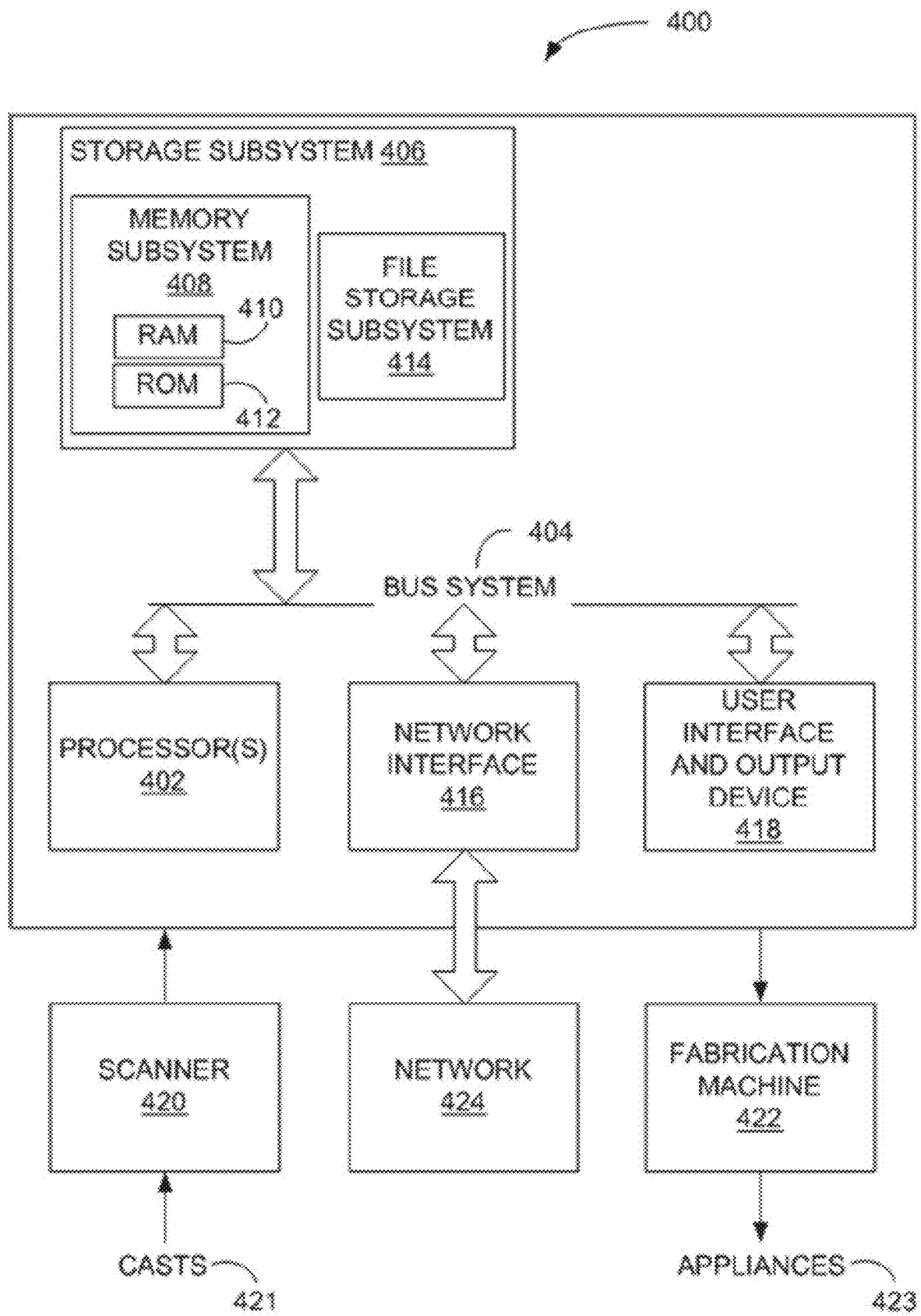
FIG. 4 is a simplified block diagram of an example of a data processing system.

FIG. 4 is a simplified block diagram of a data processing system 400 that may be used in executing methods and processes described herein. The data processing system 400 typically includes at least one processor 402 that communicates with one or more peripheral devices via bus subsystem 404. These peripheral devices typically include a storage subsystem 406 (memory subsystem 408 and file storage subsystem 414), a set of user interface input and output devices 418, and an interface to outside networks 416. This interface is shown schematically as "Network Interface" block 416, and is coupled to corresponding interface devices in other data processing systems via communication network interface 424. Data processing system 400 can include, for example, one or more computers, such as a personal computer, workstation, mainframe, laptop, and the like.

The user interface input devices 418 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 406 maintains the basic required programming, including computer readable media having instructions (e.g., operating instructions, etc.), and data constructs. The program modules discussed herein are typically stored in storage subsystem 406. Storage subsystem 406 typically includes memory subsystem 408 and file storage subsystem 414. Memory subsystem 408 typically includes a number of memories (e.g., RAM 410, ROM 412, etc.) including computer readable memory for storage of fixed instructions, instructions and data during program execution, basic input/output system, etc. File storage subsystem 414 provides persistent (non-volatile) storage for program and data files, and can include one or more removable or fixed drives or media, hard disk, floppy disk, CD-ROM, DVD, optical drives, and the like. One or more of the storage systems, drives, etc. may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 420 includes any means for obtaining a digital representation (e.g., images, surface topography data, etc.) of a patient's teeth (e.g., by scanning physical models of the teeth such as casts 421, by scanning impressions taken of the teeth, or by directly scanning the intraoral cavity), which can be obtained either from the patient or from treating professional, such as an orthodontist, and includes means of providing the digital representation to data processing system 400 for further processing. Scanner 420 may be located at a location remote with respect to other components of the system and can communicate image data and/or information to data processing system 400, for example, via a network interface 424. Fabrication system 422 fabricates appliances 423 based on a treatment plan, including data set information received from data processing system 400. Fabrication machine 422 can, for example, be located at a remote location and receive data set information from data processing system 400 via network interface 424.

The data processing aspects of the methods described herein can be implemented in digital electronic circuitry, or in computer hardware, firmware, software, or suitable combinations thereof. Data processing apparatus can be implemented in a computer program product tangibly embodied in a machine-readable storage device for execution by a programmable processor. Data processing steps can be performed by a programmable processor executing program instructions to perform functions by operating on input data and generating output. The data processing aspects can be implemented in one or more computer programs that are executable on a programmable system, the system including one or more programmable processors operably coupled to a data storage system. Generally, a processor will receive instructions and data from a read-only memory and/or a random access memory. Storage devices suitable for tangibly embodying computer program instructions and data include all forms of nonvolatile memory, such as: semiconductor memory devices, such as EPROM, EEPROM, and flash memory devices; magnetic disks such as internal hard disks and removable disks; magneto-optical disks; and CD-ROM disks.

Figure 5A:
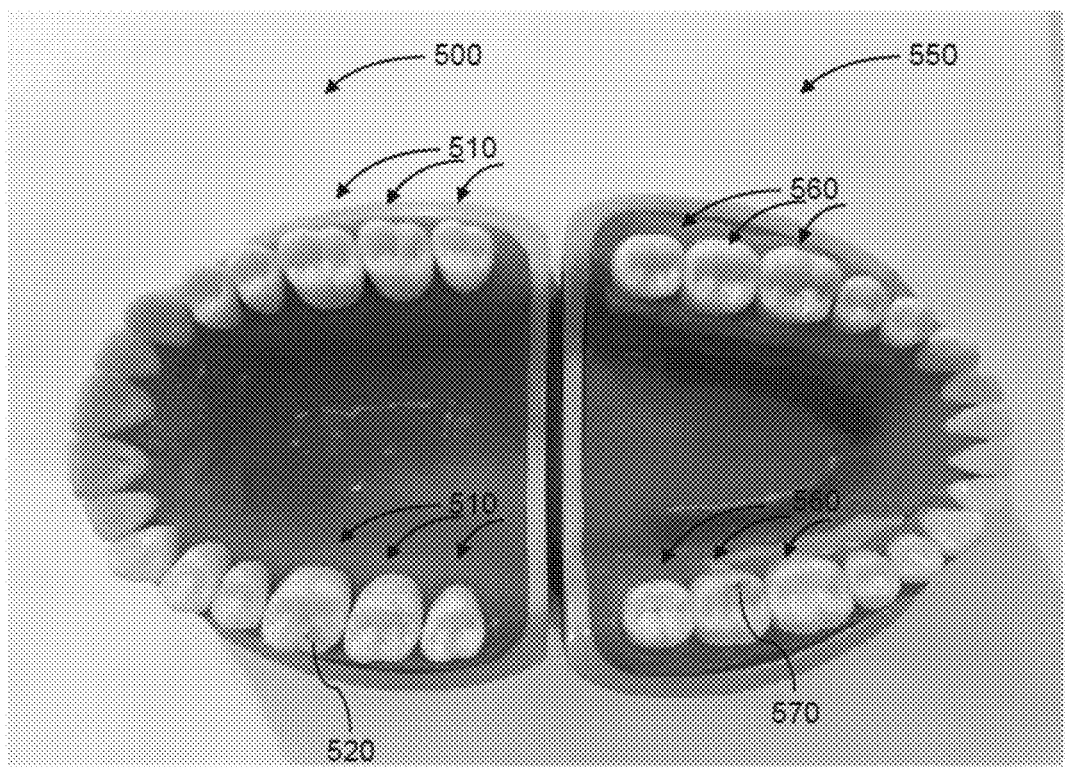
FIG. 5A illustrates the upper and lower arches of a patient, and exemplary location of occluding facets of teeth on the arches which can be adjusted to provide a tooth-moving force.

FIG. 5A illustrates the upper arch 500 and lower arch 550 of a patient. As can be seen in the illustration, the upper posterior teeth 510 and lower posterior teeth 560 of the patient comprise occlusal surfaces, including facets that interlock when the patient bites. Occlusal forces are distributed among the facets of the occlusal surface when the patient bites, collectively producing bite forces on each tooth. Ordinarily, these forces are uncontrolled, and provide essentially random forces to the upper and lower teeth. However, by selectively modifying the occlusal surfaces with an appropriate orthodontic appliance, the bite forces between the facets of specific teeth can be modified, resulting in a controlled bite force that can provide strong tooth-moving forces and moments in specific directions, urging the teeth along a desired path.

For example, FIG. 5A shows a pair of occluding facets 520 and 570 on opposite teeth of the upper and lower arches. The occluding facets 520 and 570 can be augmented, increasing the height of the appliance at each facet relative to the remaining facets of the tooth. When the patient bites down, this augmentation causes the two augmented facets 520 and 570 to come into contact before the remaining facets, thereby providing an enhanced occlusion force localized to the two augmented facets. This can produce a force and moment on each facet substantially perpendicular to the surface of the augmented appliance surface for that facet; for example, facet 520 can receive a force in a distal/buccal direction while facet 570 receives an opposite force in a mesial/lingual direction.

In some embodiments, distalization of maxillary molars can be accomplished by appropriately altering the facets of opposing teeth. Distalization can be useful to correct an Angle Class II molar relationship, for example. This can be accomplished by fabricating a feature in the aligner which produces contact between mesial lingual cusp 570 of the lower first molar and the distal buccal cusp 520 of the upper first molar. When the patient bites, the masseter muscle closes the jaws, and the bite forces are redirected to act between the two cusps 520 and 570. A distal force is applied to the upper molar to improve distalization of the tooth during treatment. In the lower arch, bite force is redirected (from essentially vertical) and the mesial component of the force tends to position the lower dentition forward. In this way, the contact between a facet of the tooth in the upper arch and a facet of the opposing tooth in the lower arch is enhanced by the feature placed in the aligner. The bite force is thus used to help accomplish tooth movements desirable for orthodontic treatment.

Alternatively, facets 520 and 570 can have their surfaces modified to reduce occlusion force if such forces are undesirable. For example, by fabricating appliances with the surface heights of facets 520 and 570 reduced relative to other facets' heights, bite force can be redirected away from facets 520 and 570. Alternatively, as illustrated below in FIG. 6B, a "bubble" can be formed between the inner surface of the appliance and the corresponding facet, allowing force to be directed away from the facets and redistributed to other parts of the appliance shell, thereby reducing occlusion forces at facets 520 and 570. Furthermore, by controlling the occlusion forces at each of a plurality of facets on upper and lower teeth, the occlusion forces of multiple teeth can be controlled simultaneously (or sequentially) to provide tooth moving forces, allowing orthodontic repositioning patient's teeth.

Figure 5B:
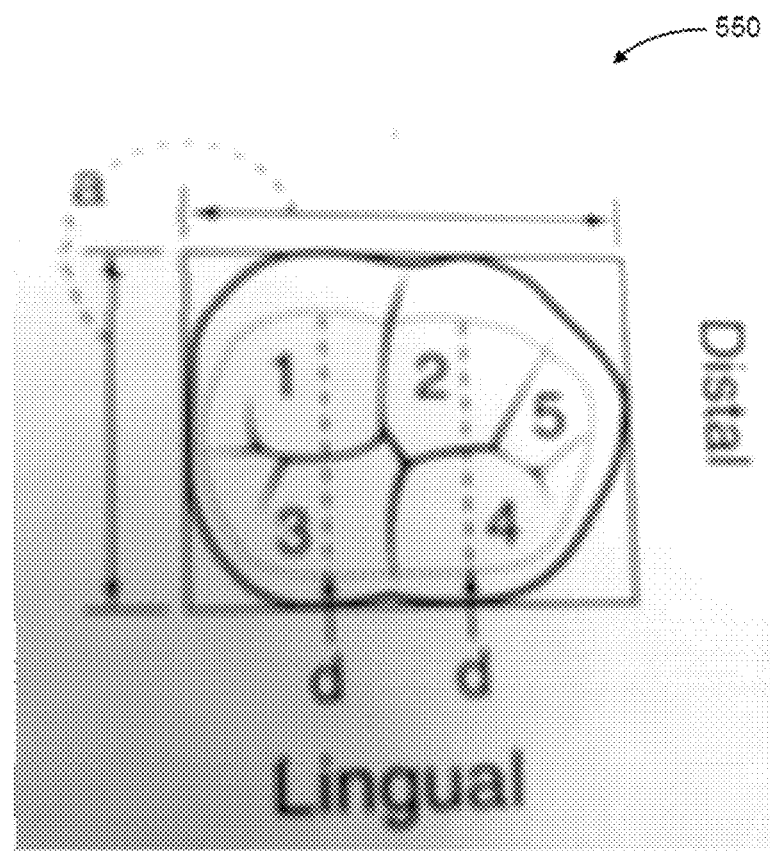
FIG. 5B illustrates one example of facets of a molar, which can have their occlusal surfaces altered by an appliance covering the occlusal surface in order to adjust occlusal forces.

FIG. 5B illustrates the facets of a molar 550, which can have their occlusal surfaces altered by an appliance covering the occlusal surface in order to adjust occlusal forces. The occlusal surface of a molar includes of several facets; for example, the molar 550 has 5 illustrated facets labeled 1, 2, 3, 4, and 5. Facets 3 and 4 are located on the lingual side of the molar, with facet 3 located mesial of facet 4. Facets 1 and 2 are located on the buccal side of the molar, with facet 1 located mesial of facet 2. A facet can also be located in a central location on one of the buccolingual and mesiodistal axes; for example, facet 5 is located near the center of the buccolingual axis, but on the distal part of molar 550. While these facets are provided In some embodiments, teeth that are tipped lingually (lingualversion) can be corrected using an augmentation contact feature that is fabricated between the buccal facing facades of the occlusal surface in one arch and the lingual occlusal facades of one arch to the buccal facing facades of the opposing arch. The resulting modified occlusion surface redirects the bite force, resulting in a component of the force aiding to upright the tooth.

FIGS. 6A-6D illustrate appliances with occlusal surface modifications to augment contact forces between favorable facets while removing or reducing contact forces between unfavorable facets of opposing teeth. These figures illustrate a configuration of occlusal contacts that exploits bite forces in a manner that can be useful in correcting teeth exhibiting a crossbite, for example.

Figure 6A:
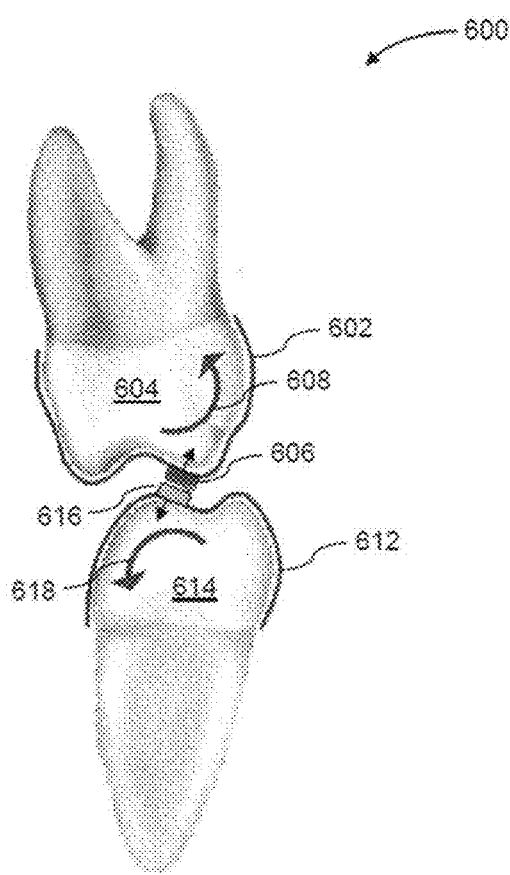
FIGS. 6A-6D illustrate examples of appliances with occlusal surface modifications to augment contact forces between favorable facets while removing or reducing contact forces between unfavorable facets of opposing teeth.

FIG. 6A shows an appliance system 600 comprising an orthodontic shell appliance 602 on an upper tooth 604. The shell appliance 602 comprises an occlusal contact feature 606, illustrated here as a rectangular solid. The occlusal contact feature 606 is designed to contact an occlusal contact feature 616 located on an orthodontic shell appliance 612 on a tooth 614 of the opposing arch. The occlusal contact features 606 and 616 are positioned to load specific facets of the teeth. The when the patient bites, the contact between the occlusal contact features produce equal and opposite bite forces acting on the opposing teeth, illustrated by small arrows pointing from each occlusal contact feature into the respective tooth. Furthermore, the forces can apply a moment to each tooth, illustrated by curved arrows 608 and 618.

Figure 6B:
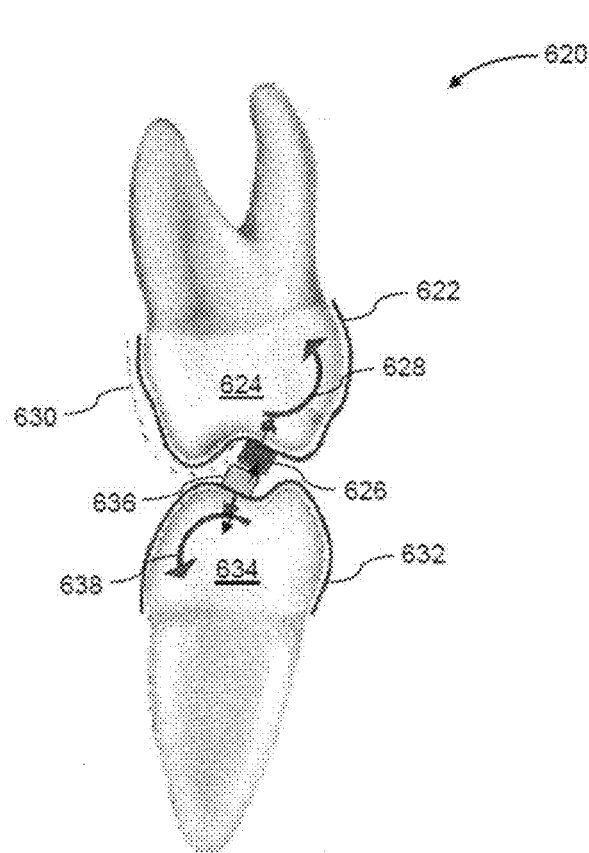

FIG. 6B illustrates an appliance system 620 comprising an orthodontic appliance 622 similar to that illustrated in FIG. 6A, but with an occlusal bubble 630 added to reduce undesirable loading on certain facets. The shell appliance 622 comprises an occlusal contact feature 626, configured to contact an occlusal contact feature 636 located on an appliance 632 on the opposing tooth. When the patient bites, a pair of equal and opposite contact forces are applied to teeth 624 and 634, illustrated by small arrows pointing from each occlusal contact feature into the respective tooth. The contact forces can also apply a moment to each tooth, illustrated by curved arrows 628 and 638. In order to reduce undesirable contact forces between other tooth facets, an occlusal bubble 630 is added to appliance 622, illustrated by a dotted line. The surface of the appliance 622 is adjusted to fall on the dotted line, such that there is a space between the appliance 622 and the tooth 624. This reduces the bite forces applied to the facets over which the bubble extends, allowing force to be concentrated on other facets to better direct the bite force in a desired direction. When the appliance is worn, bite forces applied along the surface of the bubble 630 by the opposing tooth may result in a deflection of the bubble toward the tooth 634, allowing such forces to be distributed along the surface of the tooth instead of concentrated at an undesirable contact location.

Figure 6C:
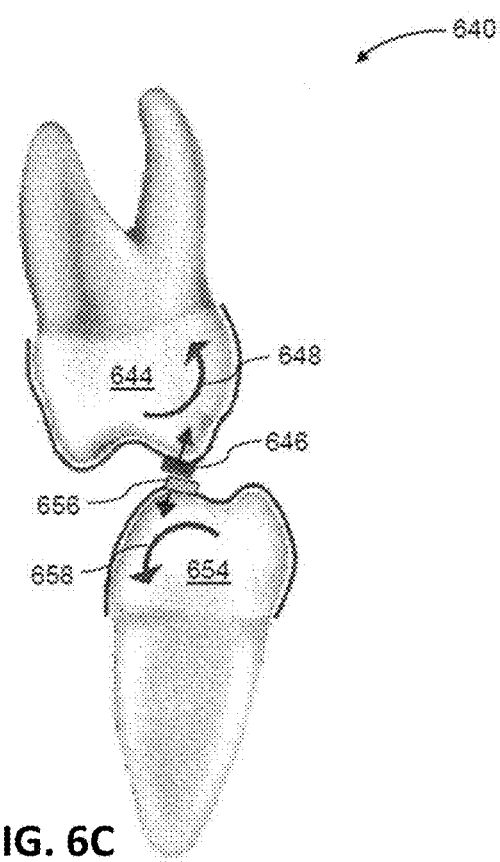
Figure 6D:
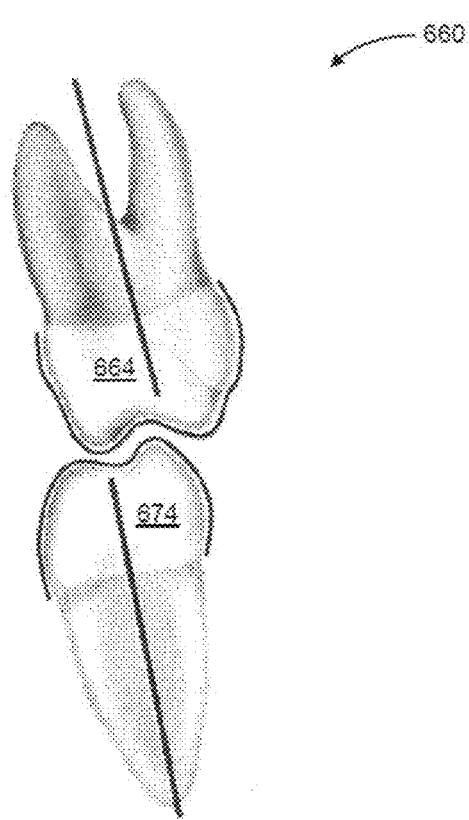

FIG. 6C shows how an appliance with occlusal surface features such as those shown in FIGS. 6A and 6B can be used to correct teeth in a crossbite configuration 640. As illustrated, teeth 644 and 654 exhibit a crossbite, such that the facets of the teeth fail to properly fit together when the patient bites. This malocclusion can be corrected by applying forces to each tooth using occlusal surface features 646 and 656. The contact forces generated by the occlusal surface features produce moments 648 and 658 that can tip the teeth into a more desirable orientation. The contact forces themselves can also be used directly to translate the teeth along a tooth movement path; for example, each contact force can be represented as a pair of force components—one in a vertical and one in a horizontal direction. The vertical forces may be used to intrude the teeth, or may produce no movement (e.g., if the force is small enough to neglect, or is countered by extrusion forces applied elsewhere by the appliance), while the horizontal forces may move the teeth along a desired path. As the teeth move, it may be desirable to include occlusal bubbles (such as those as illustrated in FIG. 6D) during at least some steps of treatment to relieve occlusion forces on specific facets. This can prevent unwanted contacts from resisting the desired movement of the teeth, for example.

FIG. 6D illustrates a dental configuration 660 which can be the result of treatment with appliances incorporating the features illustrated in FIGS. 6A-C. The teeth 664 and 674 have been moved to an alignment approximating an orthodontically ideal occlusion, and further appliances can provide additional orthodontic treatment without requiring occlusal surface features.

It will be understood by those skilled in the art that although illustrated as rectangular in shape, the occlusal surface features described herein can be varied in shape. For example, a contact feature can be more smoothly contoured to more closely resemble a natural tooth cusp. Additionally, the upper and lower contact features can differ in shape; for example, an upper feature may be substantially curved while the corresponding lower is substantially flat near the point of contact, or vice versa. The shape of the contact features can be modified as needed for the comfort of the patient, for example, while substantially maintaining the point of contact and direction of force between the upper and lower teeth.

Furthermore, although the occlusal contacts illustrated in FIGS. 6A-C show contact between an upper and lower occlusal surface feature, contact can also be made between one occlusal surface feature and the opposing tooth, or an opposing appliance surface without an occlusal surface feature. Thus, tooth-moving forces can be applied to teeth of an arch on which no appliance is worn, in addition to opposing forces on the arch on which an appliance is worn. Moreover, multiple surface features can be placed on a given tooth's facets to further customize the magnitude, location, and direction of bite forces, and multiple teeth in either or both arches can have their occlusion modified with these features, producing orthodontic correction to multiple teeth simultaneously, as well as sequentially, as desired. In addition to varying the number and locations of the occlusal surface features, the number and locations of occlusal bubbles may also be varied. For example, a plurality of bubbles can be placed over a plurality of facets on a tooth to reduce occlusal forces for each. In some cases, bubbles can be used on each of two opposing teeth to reduce unwanted forces on each. Furthermore, in some cases, occlusal bubbles can be employed without occlusal surface features; for example, when a patient's natural occlusion would produce desirable forces in the absence of force on particular facets, bubbles may be employed in conjunction with an ordinary, close-fitting appliance surface to produce a net force and/or moment on a tooth to move it along a desired trajectory.

FIGS. 7A and 7B illustrate how multiple favorable facet contacts can be used in conjunction to produce a net tooth-moving force, in accordance with embodiments. FIG. 7A illustrates a tooth 700 with a plurality of facets 710 and 720. An appliance may be used to apply bite forces selectively on facets 710 and 720. For example, an appliance can be worn on an opposing tooth (not shown) that includes surface features to contact facets 710 and 720. An appliance can also be worn on tooth 700, which can optionally have occlusal surface features on facets 710 and 720 to apply reaction forces through contact with an opposing tooth. The resulting forces on facets 710 and 720 are illustrated as F1 and F2, respectively. The forces can be represented as a 3-dimensional vector, and can be produced in a direction orthogonal to the surface at their respective points of contact. The magnitude of the forces can be adjusted by changing the size and position of the occlusal features, as well as by adjusting their material properties such as elasticity.

The two forces can be used to produce a net force on tooth 700 to urge it along a desired path from an initial position to a final position. FIG. 7B illustrates the direction of the resulting force on the tooth, which can be calculated as a vector sum of forces F1 and F2. The tooth may be moved from an initial to a final position over the course of multiple stages, which can include multiple appliances with different occlusal surface features (including omitting or adding features as needed, as well as modifying the shape and location of occlusal surface features and/or bubble features as needed to produce desired tooth movements). Furthermore, the final position of a first tooth movement path can be used as an initial position for a second movement path, allowing a tooth to be moved over a chain of trajectories to accomplish complex orthodontic movement (such as round-tripping, for example)

It will be understood by those skilled in the art that determining the amount of tooth-moving force produced by the occlusal surface modifications provided herein can involve determining the bite force experienced by each of one or more teeth when wearing the appliance(s). In contrast to ordinary orthodontic appliances, which provide a small but continuous force over a long span of time when worn, the bite forces applied by the appliances disclosed herein are large and intermittent. Accordingly, an effective average bite force can be computed by taking into account the bite force applied to each of the patient's teeth when biting (e.g., based on the force applied by the masseter muscle), as well as the relative amounts of time that the patient spends biting versus not biting. This calculation can take into account the periods of time during which the patient wears the appliance(s) (e.g., how many hours per day) as well as the expected bite characteristics for a patient during the time that the appliance(s) are worn. For example, the calculation can take into account whether the patient wears the appliance(s) when eating (when mastication can produce stronger, more frequent bite forces), as well as what the times of day in which the appliance(s) are worn (e.g., different average bite forces may be estimated for appliances worn during hours of the day versus when sleeping at night, based on expected or measured average bite forces during these times). Accounting for bite forces in this manner can produce more accurate force estimates, thereby allowing tooth movement to be more accurately controlled.

In some embodiments, the occlusal surface features can be produced as a feature that extends from the facet of an appliance. The occlusal surface features can be hollow (e.g., shaped as a pinched or folded portion of surface that protrudes away from the tooth, leaving a small gap between the center of the protrusion and the tooth surface), allowing straightforward production using thermoforming techniques. The occlusal surface features can also be solid. Such features can readily be produced using direct fabrication techniques, or by affixing additional material to the surface of a thermoformed appliance, for example. The occlusal bubbles described herein can be manufactured as a hollow cavity with a thin wall. In some cases, the cavity can be instead be filled with elastic material, which may be used to more precisely adjust the amount and distribution of force applied by occlusal contacts with the bubble.

As described herein an apparatus (e.g., device or system, including an orthodontic or dental apparatus, such as a dental aligner) may be configured to selectively intercuspate when worn. In some variations selective intercuspation, as described above in FIGS. 5A-7B, may provide an additional, selective, force, such as a bite force, when the patient is wearing the device and intercuspates, that may assist in moving one or more teeth in a desired way, for example to achieve a treatment plan for orthodontically aligning the patient's teeth.

Thus, any of the apparatuses described herein may include one or more dental aligner devices that are each configured as shell aligners having a shell body in which the inner occlusal surface (that substantially matches the patient's teeth occlusal surface) is not aligned with the outer occlusal surface of the shell aligner. FIG. 8A shows one example of a shell aligner having a different occlusal surfaces. In FIG. 8A, the dental aligner device 800 to be worn on a patient's teeth includes a shell body 804 having a lingual side, an occlusal side 806, and a buccal side, wherein the shell body comprises an inner tooth-receiving region 818 configured to fit over the patient's teeth and to apply a force to move one or more of the patient's teeth to a predetermined configuration when the shell body is worn on the patient's teeth. The aligner may include attachment engagement regions 809 for engaging with an attachment bonded to the patient's teeth.

Figure 8B:
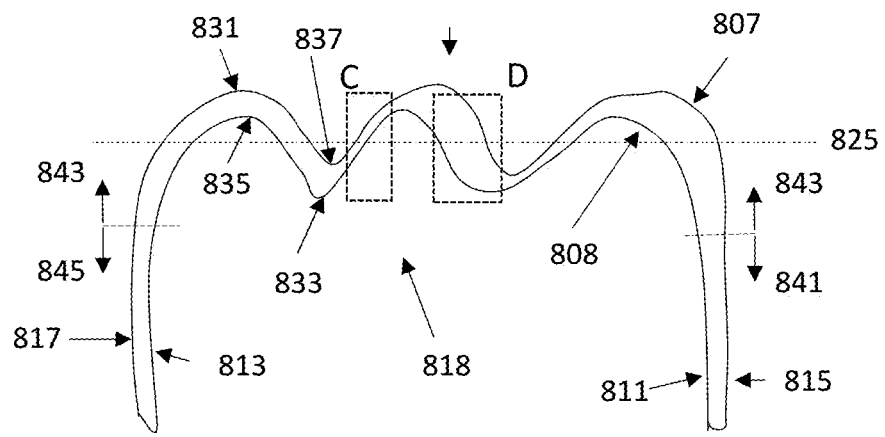
FIG. 8B shows a sectional view through an aligner device such as the one shown in FIG. 8B including an occlusal outer surface contour that is not aligned with the occlusal inner surface contour.

FIG. 8B shows a section through the aligner that include the the inner tooth-receiving region 818 and shows the occlusal inner surface contour 808 in the inner tooth-receiving region 818. The tooth-receiving region has an arrangement of chambers along its length that are configured to substantially conform to a first arrangement of cusps and nadirs corresponding to an occlusal surface of the patient's teeth. This inner region includes an occlusal inner surface 808 having a plurality of cusps and nadirs (e.g., high and low regions, which may be continuously connected on the surface). The aligner also includes a lingual inner surface 811 and lingual outer surface 815, as well as a buccal inner surface 813 and a buccal outer surface 817. The lingual outer and inner surfaces may be generally parallel (e.g., with small, e.g., <5%, <10%, <15%, <20%, <25%, <30%, etc.) deviation in thicknesses between them, as shown in FIG. 8B. Similarly, the buccal outer and inner surfaces may be generally parallel (e.g., with small, e.g., <5%, <10%, <15%, <20%, <25%, <30%, etc.) deviation in thicknesses between them. In contrast, the occlusal inner surface 808 may be opposite from the occlusal outer surface 807, and all or a portion of the occlusal inner surface may be offset (in the occlusal plane 825, perpendicular to the page and extending from the lingual to the buccal sides of the aligner device in FIG. 8B). Although the overall contours of the occlusal outer surface 807 and the occlusal inner surface 808 may have the same number and sequence order of cusps 831, 835 and nadirs 833, 837, the spacing between adjacent cusps and nadirs may be different. The sequence order may refer to the order of similarly shaped and/or sized cusps and nadirs in the occlusal surfaces (e.g., a first cusp having a first height, a first nadir having a first depth, a second cusp having a second height, a second nadir having a second depth, etc.). In FIG. 8B, the occlusal region 843'-843 is between the buccal 845 and lingual 841 regions.

As mentioned, the occlusal outer surface contour 807 is opposite the occlusal inner surface contour 808. The occlusal outer surface contour forms a second arrangement of cusps and nadirs that does not align with the first arrangement of cusps and nadirs when the occlusal inner surface is worn over the first arrangement of cusps. The intercuspation of the patient's teeth when wearing the dental aligner device therefore produces a bite force to move the one or more of the patient's teeth to the predetermined configuration.

Figure 8C:
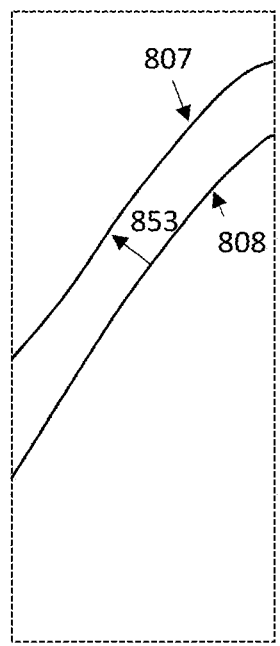
FIGS. 8C and 8D show enlarged views of different regions of the occlusal side of the aligner device of FIG. 8A showing different thickness regions between the occlusal inner surface contour and the occlusal outer surface contour.
Figure 8D:
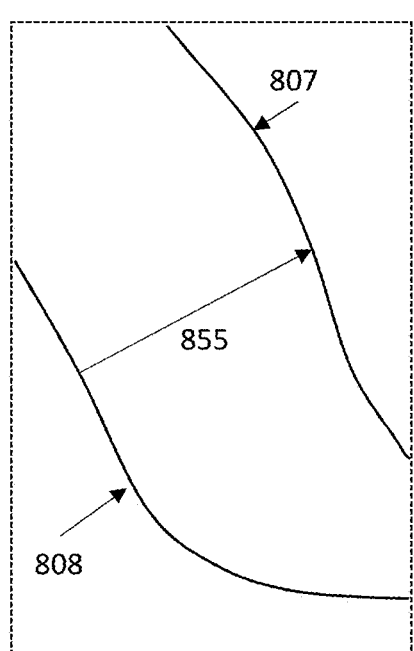

In FIG. 8B, the dental aligner device has a non-uniform occlusal thickness, e.g., the thickness between the occlusal inner surface 808 and the occlusal outer surface 807. As shown in the dashed regions (regions C and D) and FIGS. 8C and 8D, the thickness 853, 855 of these regions transverse to the inner or outer surfaces, typically varies by greater than 30% (e.g., greater than 35%, >40%, >45%, >50%, >55%, >60%, >70%, >80%, >90%, >100%, greater than 200%, etc.) along the occlusal surface. In FIG. 8C, the thickness 853 of the separation between the occlusal inner 808 and occlusal outer 807 surfaces is greater than 4× different (e.g., greater than 400%).

Thus, the methods and apparatuses described herein include dental apparatuses, and in particular orthodontic apparatuses, in which the appliance includes both a tooth-containing cavity that retains the patient's tooth/teeth and may apply force(s) to one or more of the retained teeth in order to change its position, e.g., to align the teeth. The apparatus may also include an occlusal surface on the opposite side from the cavity that is configured to selectively intercuspate to a target intercuspation with the patient's opposite jaw. This selective intercuspation may be with the patient's opposite jaw directly, in instances where the patient is not wearing an appliance on these opposite teeth, or it may be configured to intercuspate with an occlusive surface on an appliance that is worn on the opposite teeth.

In some variations the intercuspation provided by the outer contour of the aligner may be configured to mimic the final intercuspation of the treatment plan, so that the patient may experience the final intercuspation prior to the alignment of the teeth. These apparatuses and methods of using them may be helpful to provide the patient wearing these apparatuses with the feel of maxima intercuspation, even during an extended course of treatment in which the appliance is otherwise moving the patient's teeth. This may enhance comfort, and may also allow the patient to experience the feel proper intercuspation even as the patient's teeth would otherwise be unable to.

Figure 9:
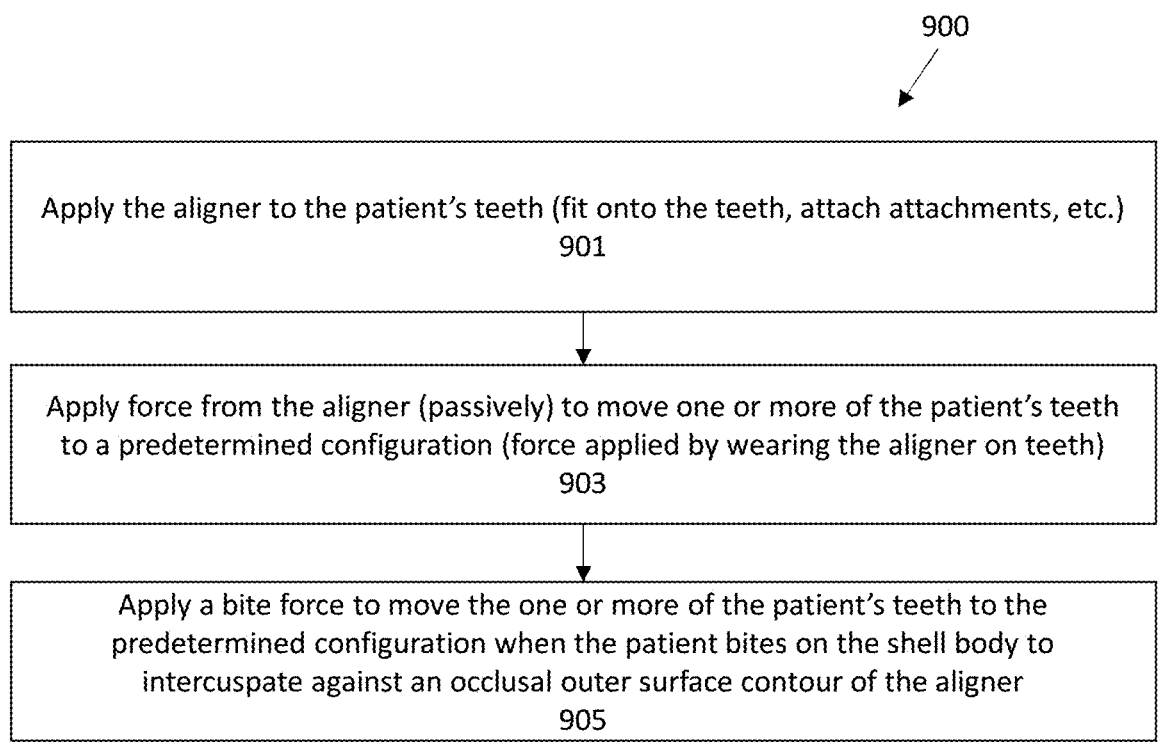
FIG. 9 illustrates one example of a method of orthodontically treating the patient's teeth (e.g., to align the teeth) including selective intercuspation.

As mentioned, the methods and apparatuses described herein may also be configured to modify or improve alignment by means to of selective intercuspation. A method of treating a patient's teeth (e.g., to align the teeth) 900 is shown in FIG. 9. In this example, the method may include applying a dental aligner (such as an aligner having a shell body having a lingual side, an occlusal side, and a buccal side, wherein the shell body comprises an inner tooth-receiving region) onto the patient's teeth 901. Once applied onto the teeth (e.g., including attaching to any attachments on the teeth), the aligner may apply force to move the teeth. The force from the aligner may be applied to one or more teeth to move the teeth, and may arise from a combination of contacts between the aligner and the teeth as well as spacing (voids) in the aligner that provide room for the teeth to move into. Force may be applied by the aligner to a region of the tooth, and may be counterbalanced by a distributed force on other teeth. Thus, a first force may be applied by the aligner (passively) to move one or more of the patient's teeth to a predetermined configuration from the shell body being worn on the patient's teeth, e.g., when the patient's teeth are received in an inner tooth-receiving region of the shell body 903.

Further, the method may also include applying a bite force due to the selective intercuspation. For example, applying a bite force to move the one or more of the patient's teeth to the predetermined configuration when the patient bites on the shell body to intercuspate against an occlusal outer surface contour that is opposite the occlusal inner surface contour 905. The occlusal outer surface contour may form a second arrangement of cusps that does not align with the first arrangement of cusps when the occlusal inner surface is worn over the first arrangement of cusps.

Any of the methods, and particularly the methods of making the treatment plan and/or aligners (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A dental aligner device to be worn on a patient's teeth over a first dental arch, the device comprising:
   a shell body having a lingual side, an occlusal side, and a buccal side, wherein the shell body comprises tooth-receiving cavities shaped to receive the patient's teeth, wherein inner surfaces of the shell body are shaped to resiliently apply a force to move one or more of the patient's teeth to a predetermined configuration in accordance with a stage of a treatment plan when the shell body is worn on the patient's teeth, wherein at least one of the tooth-receiving cavities comprises:
   an occlusal inner surface contour having a first arrangement of cusps configured to conform to an occlusal surface of the patient's teeth, and
   an occlusal outer surface contour that is opposite the occlusal inner surface contour, the occlusal outer surface contour forming a second arrangement of cusps thereby defining a wall between the first and second arrangement of cusps, wherein the wall comprises a first cusp region that is shaped to cover a first cusp of a tooth and a second cusp region that is shaped to cover a second cusp of the tooth,
   wherein the occlusal inner surface contour and the occlusal outer surface contour have a same number of cusps and nadirs,
   wherein the second arrangement of cusps of the occlusal outer surface contour is laterally offset with respect to the first arrangement of cusps, and the wall of each the first and second cusp regions has varied thicknesses, so that, when the patient bites on the dental aligner device, a bite force is created in a same or a complementary direction as the resiliently applied force to move the one or more of the patient's teeth to the predetermined configuration.

2. The dental aligner device of claim 1, wherein one or more regions of the occlusal outer surface contour is offset in an occlusal plane relative to the occlusal inner surface contour.

3. The dental aligner device of claim 1, wherein the occlusal inner surface contour and the occlusal outer surface contour have a same sequence order of cusps, but a spacing between one or more adjacent cusps are different between the occlusal inner surface contour and the occlusal outer surface contour.

4. The dental aligner device of claim 1, wherein a thickness between the occlusal outer surface contour and the occlusal inner surface contour varies across the occlusal side of the shell body transverse to the occlusal inner and outer surface contours.

5. The dental aligner device of claim 4, wherein the thickness of the occlusal surface varies by greater than 50% across the occlusal side of the shell body transverse to the occlusal inner and outer surface contours.

6. The dental aligner device of claim 1, wherein the bite force is oriented to urge the one or more of the patient's teeth along a vector with a vector component in a plane orthogonal to a second tooth's coronoapical axis, wherein the second tooth is opposite from the one or more of the patient's teeth and on a dental arch that is opposite from the dental arch of the one or more of the patient's teeth in the patient's mouth.

7. The dental aligner device of claim 1, wherein the occlusal outer surface contour is configured to maximally intercuspate with an occlusal surface of the opposite dental arch.

8. The dental aligner device of claim 1, wherein the occlusal outer surface contour is configured to intercuspate with over more than 90% of an occlusal surface of the opposite dental arch.

9. The dental aligner device of claim 1, wherein an occlusal surface on the opposite dental arch is a dental appliance configured to be worn on teeth of the opposite dental arch.

10. The dental aligner device of claim 1, wherein the shell body of the dental aligner device is configured to contact a second shell body of a second dental aligner device on an occlusal surface of the one or more of the patient's teeth on the opposite dental arch.

11. The dental aligner device of claim 1, wherein the bite force increases contact between cusps of the patient's upper jaw and lower jaw.

12. The dental aligner device of claim 1, wherein the bite force modifies condylar loading of a temporomandibular joint (TMJ).

13. The dental aligner device of claim 1, wherein spacing between adjacent cusps and nadirs of the occlusal inner surface contour is different than spacing between adjacent cusps and nadirs of the occlusal outer surface contour.

14. The dental aligner device of claim 1, wherein the occlusal outer surface contour is arranged to contact teeth of the patient's opposite jaw or to contact a second dental aligner device on the patient's opposite jaw.

15. A dental aligner device to be worn on a patient's teeth, the device comprising:
a shell body having a lingual side, an occlusal side, and a buccal side, wherein the occlusal side has a greater deviation in thickness compared to each of the lingual and buccal sides, wherein the shell body comprises tooth-receiving cavities shaped to receive the patient's teeth, wherein inner surfaces of the shell body are shaped to resiliently apply a force to move one or more of the patient's teeth to a predetermined configuration in accordance with a stage of a treatment plan when the shell body is worn on the patient's teeth, wherein at least one of the tooth-receiving cavities comprises:
an occlusal inner surface contour having a first arrangement of cusps configured to conform to an occlusal surface of the patient's teeth, and
an occlusal outer surface contour that is opposite the occlusal inner surface contour, the occlusal outer surface contour forming a second arrangement of cusps thereby defining a wall between the first and second arrangement of cusps, wherein the wall comprises a first cusp region that is shaped to cover a first cusp of a tooth and a second cusp region that is shaped to cover a second cusp of the tooth,
wherein the occlusal inner surface contour and the occlusal outer surface contour have a same number of cusps and nadirs,
wherein the second arrangement of cusps of the occlusal outer surface contour is laterally offset with respect to the first arrangement of cusps when the occlusal inner surface contour is worn over the first arrangement of cusps, and the wall of each the first and second cusp regions has varied thicknesses, so that, when the patient bites on the dental aligner device, a bite force is created to move the one or more of the patient's teeth in a same or a complementary direction as the resiliently applied force to the predetermined configuration.

16. The dental aligner device of claim 15, wherein the bite force is oriented to urge the one or more of the patient's teeth along a vector with a vector component in a plane orthogonal to a second tooth's coronoapical axis, wherein the second tooth is opposite from the one or more of the patient's teeth and on a dental arch that is opposite from the dental arch of the one or more of the patient's teeth in the patient's mouth.

17. The dental aligner device of claim 15, wherein the occlusal outer surface contour is configured to maximally intercuspate with an occlusal surface of the patient's teeth of the opposite jaw.

18. The dental aligner device of claim 17, wherein the occlusal outer surface contour is configured to intercuspate with over more than 90% of the occlusal surface of the patient's teeth of the opposite jaw.

19. The dental aligner device of claim 17, wherein the occlusal surface on the patient's opposite jaw is a dental appliance configured to be worn on teeth of the patient's teeth of the opposite jaw.

20. The dental aligner device of claim 17, wherein the occlusal surface on the patient's teeth of the opposite jaw comprises teeth of the patient's teeth of the opposite jaw.

21. The dental aligner device of claim 15, wherein one or more regions of the occlusal outer surface contour is laterally offset in an occlusal plane relative to the occlusal inner surface contour.

22. The dental aligner device of claim 15, wherein the dental aligner device increases contact between cusps of the patient's upper jaw and lower jaw.

23. The dental aligner device of claim 15, wherein the bite force modifies condylar loading of a temporomandibular joint (TMJ).

* * * * *